US012739905B2

(12) United States Patent
Patil et al.

(10) Patent No.: US 12,739,905 B2
(45) Date of Patent: Sep. 15, 2026

(54) DIRECT LINK COMMUNICATIONS IN MULTI-LINK OPERATIONS

(71) Applicant: QUALCOMM Incorporated, San Diego, CA (US)

(72) Inventors: Abhishek Pramod Patil, San Diego, CA (US); George Cherian, San Diego, CA (US); Sai Yiu Duncan Ho, San Diego, CA (US); Alfred Asterjadhi, San Diego, CA (US); Yanjun Sun, San Diego, CA (US); Vikram Phogat, Fremont, CA (US); Tushnim Bhattacharyya, San Diego, CA (US); Rajesh Chauhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 17/503,856

(22) Filed: Oct. 18, 2021

(65) Prior Publication Data

US 2022/0124857 A1 Apr. 21, 2022

Related U.S. Application Data

(60) Provisional application No. 63/094,684, filed on Oct. 21, 2020.

(51) Int. Cl.
*H04W 76/15* (2018.01)

(52) U.S. Cl.
CPC .................................. *H04W 76/15* (2018.02)

(58) Field of Classification Search
CPC ... H04W 76/15; H04W 12/03; H04W 12/041; H04W 76/11; H04W 76/12; H04W 76/23;
(Continued)

(56) References Cited

U.S. PATENT DOCUMENTS 10,555,143 B2 2/2020 Uchiyama
10,959,153 B2 3/2021 Patil et al.
(Continued)

FOREIGN PATENT DOCUMENTS

EP 3174323 B1 11/2018
WO 2019050704 A1 3/2019
WO 2021003181 A1 1/2021

OTHER PUBLICATIONS 802 11 Working Group of the LAN/MAN Standards Committee of the IEEE Computer Society: "Draft Standard for Information Technology—Tele-Communications and Information Exchange between Systems Local and Metropolitan Area Networks—Specific Requirements, Part 11: Wireless LAN Medium Access Control (MAC) and Physical Layer (PHY) Specifications, Amendment 8: Enhancements for Extremely High Throughput (EHT)", IEEE Draft, Draft P802.11BE_D0.1, IEEE-Sa, Piscataway, NJ, USA, vol. 802.11be drafts, No. D0.1, Sep. 30, 2020 (Sep. 30, 2020), pp. 1-299, XP068172141, Retrieved from the Internet: URL: http://www.ieee802.org/11/private/Draft_Standards/11be/Draft%20P802.11be_D0.1.pdf [retrieved on Sep. 30, 2020] cf. clauses 35.3.3, 35.3.4.1, 35.3.4.2-35.3.4.2, 35.3.5-35.3.5.3, 35.3.6.1.2 and 35.3.6.2.

(Continued)

*Primary Examiner* — Sudesh M. Patidar
(74) *Attorney, Agent, or Firm* — Patterson & Sheridan LLP

(57) ABSTRACT

Certain aspects of the present disclosure provide techniques for handling direct link communications in multi-link systems. An example method by a multi-link device (MLD) generally includes establishing a direct link between a first wireless station and a second wireless station affiliated with the MLD and communicating with the first wireless station via the direct link, wherein the direct link is inoperative for
(Continued)

the MLD while a third wireless station affiliated with the MLD is communicating.

29 Claims, 22 Drawing Sheets

(58) Field of Classification Search
CPC . H04W 76/14; H04W 48/16; H04W 52/0274; H04W 84/12; Y02D 30/70
See application file for complete search history.

(56) References Cited

U.S. PATENT DOCUMENTS 11,330,519 B1* 5/2022 Shukla .............. H04W 52/0209
11,337,263 B2 5/2022 Zhou et al.
2008/0013539 A1 1/2008 Poyhonen et al.
2010/0085922 A1 4/2010 Dhanapal et al.
2012/0051240 A1 3/2012 Dwivedi et al.
2012/0057501 A1 3/2012 Dwivedi et al.
2012/0113971 A1* 5/2012 Giaretta ................ H04W 48/20 370/338
2013/0266136 A1 10/2013 Chu et al.
2015/0245399 A1* 8/2015 Aoki ..................... H04W 76/14 370/329
2015/0319005 A1 11/2015 Seok
2015/0334745 A1* 11/2015 Zhao ..................... H04W 74/02 370/252
2015/0358226 A1 12/2015 Liu
2017/0156112 A1 6/2017 Seok
2017/0367131 A1 12/2017 Vesterinen et al.
2018/0063864 A1* 3/2018 Tayamon .......... H04W 74/0816
2018/0242251 A1 8/2018 Lin et al.
2019/0335454 A1 10/2019 Huang et al.
2020/0037152 A1 1/2020 Seok et al.
2020/0137626 A1 4/2020 Huang et al.
2020/0169918 A1 5/2020 Hwang et al.
2020/0196352 A1 6/2020 Huang et al.
2020/0259529 A1 8/2020 Wang et al.
2020/0383156 A1* 12/2020 Seok ..................... H04W 76/11
2020/0404496 A1* 12/2020 Chu .................. H04W 52/0216
2021/0076437 A1 3/2021 Kneckt et al.
2021/0084711 A1* 3/2021 Park .................. H04W 72/0453
2021/0211871 A1* 7/2021 Chu ...................... H04W 12/06
2022/0110123 A1* 4/2022 Adachi ................. H04W 76/14
2022/0124856 A1 4/2022 Patil et al.
2022/0286844 A1 9/2022 McCann et al.
2022/0287122 A1 9/2022 Wang et al.
2023/0083503 A1* 3/2023 Han .................. H04W 74/0816 370/328
2023/0088503 A1* 3/2023 Surendran ............. G06F 30/327 716/108
2023/0119901 A1* 4/2023 Viger .................... H04W 76/15 370/329
2023/0164857 A1 5/2023 Hwang et al.
2023/0180323 A1 6/2023 Sang et al.
2023/0199850 A1* 6/2023 Li ..................... H04W 74/0833 370/329
2023/0232315 A1 7/2023 Chitrakar et al.
2023/0319922 A1* 10/2023 Lu ......................... H04W 76/15 370/328
2024/0008113 A1 1/2024 Huang et al.
2024/0040639 A1 2/2024 Chitrakar et al.
2024/0323939 A1 9/2024 Adachi et al.

OTHER PUBLICATIONS

Fischer (Broadcom Inc) M., "MLO Synchronous Transmission", IEEE Draft, IEEE 802.11-20/0081r2, 11-20-0081-03-00BE-MLO-SYNCH-Transmission, IEEE-SA Mentor, Piscataway, NJ, USA, vol. 802.11 EHT, 802.11be, No. 3, Apr. 17, 2020 (Apr. 17, 2020), pp. 1-59, 20200110, XP068167521, Retrieved from the Internet: URL: https://mentor.ieee.org/802.11/dcn/20/11-20-0081-03-00be-mlo-synch-transmission.pptx [retrieved on Apr. 17, 2020] Slides 3, 6-7, 13, 23-24 and 28-45.

International Search Report and Written Opinion—PCT/US2021/055643—ISA/EPO—Feb. 9, 2022.

Patil A., (Qualcomm): "CC34 Resolution for CIDs Related to TDLS Handling", IEEE Draft, 11-21-0240-04-00BE-CC34-Resolution-for-CIDs-Related-to-TDLS-Handling, IEEE-SA Mentor, Piscataway, NJ USA vol. 802.11 EHT, 802.11be, No. 4, Apr. 7, 2021 (Apr. 7, 2021), pp. 1-10, XP068179647, Sections 9.4.2.61, 9.4.2.259b4, 12.7.8.2 and 12.7.8.4.3.

Patil A., (Qualcomm): "MAC-PDT-MLO-ML-IE-Structure", IEEE Draft, 11-20-1274-00-00BE-MAC-PDT-MLO-ML-IE-Structure, IEEE-SA Mentor, Piscataway, NJ USA vol. 802.11 EHT, 802.11be, Aug. 25, 2020 (Aug. 25, 2020), pp. 1-11, XP068172227, Retrieved from the Internet: URL: https://mentor.ieee.org/802.11/dcn/20/11-20-1274-00-00be-mac-pdt-mlo-ml-ie-structure.docx. [Retrieved on Aug. 25, 2020] Sections 9.4.2.x, 33-33.x.y.z.1 and 9.4.2.61.

Patil (Qualcomm) A., "TDLS Handling in MLO", IEEE Draft, 11-20-1692-02-00BE-TDLS-Handling-in-MLO, IEEE-SA Mentor, Piscataway, NJ, USA, vol. 802.11 EHT, 802.11be, No. 2, Dec. 3, 2020 (Dec. 3, 2020), pp. 1-25, XP068175375, Retrieved from the Internet: URL: https://mentor.ieee.org/802.11/dcn/20/11-20-1692-02-00be-tdls-handling-in-mlo.pptx [Retrieved on Dec. 3, 2020] Slides 2-25.

Fischer M(Broadcom): "MLO Synchronous Transmission", IEEE 802.11-20/0081r2, pp. 1-59, Jan. 10, 2020, pp. 2-8.

Patil A., et al., "11be Spec Text for ML Element", IEEE 802.11-20/1274r9, Aug. 20, 2020, pp. 1-15.

Patil A., et al., "11be Spec Text for ML Element", IEEE 802.11-20/1274r0, Aug. 20, 2020, pp. 1-14.

Patil A., et al.(Qualcomm Inc)., "Resolution for CIDs Related to TDLS (CC34)", IEEE P802.11 Wireless LANs, Feb. 11, 2021, IEEE 802.11-21/0240r7, pp. 1-7.

Wang H., et al., "MLD Address Management Discussion", IEEE 802.11-20/0512r3, Jun. 4, 2020, pp. 1-16.

Fischer (Broadcom Inc) M., "MLO Synchronous Transmission", IEEE 802.11-20/0081r2, pp. 1-59, Jan. 10, 2020, pp. 3, 6, 13, 16, 23 to 24, 28 to 29 and 40.

Fischer M(Broadcom Inc)., "MLO Synchronous Transmission", IEEE 802.11-20/0081r2, IEEE, Jan. 10, 2020, pp. 1-59.

Taiwan Search Report—TW110138851—TIPO—Aug. 25, 2025.

Taiwan Search Report TW110138692 TIPO Oct. 8, 2025.

* cited by examiner

| | Element ID | Length | BSSID | TDLS initiator STA Address | TDLS responder STA Address |
|---|---|---|---|---|---|
| Octets: | 1 | 1 | 6 | 6 | 6 |

FIG. 6

DIRECT LINK COMMUNICATIONS IN MULTI-LINK OPERATIONS

CROSS-REFERENCE TO RELATED APPLICATION(S)

The present application for patent claims priority to U.S. Provisional Application No. 63/094,684, filed Oct. 21, 2020, which is hereby expressly incorporated by reference herein in its entirety.

BACKGROUND

Field of the Disclosure

Certain aspects of the present disclosure generally relate to wireless communications and, more particularly, various techniques and apparatus for handling direct link communications in multi-link systems.

Description of Related Art

In order to address the issue of increasing bandwidth requirements demanded for wireless communications systems, various schemes are being developed to allow multiple wireless stations to communicate with a single access point by sharing the channel resources while achieving high data throughputs.

Multiple Input Multiple Output (MIMO) technology represents one such approach that has emerged as a popular technique for communication systems. MIMO technology has been adopted in several wireless communications standards such as the IEEE 802.11 standard (including amendments thereto such as 802.11ax, 802.11ay and 802.11be). Certain wireless communications standards, such as the Institute of Electrical and Electronics Engineers (IEEE) 802.11 standard (including amendments thereto such as 802.11ax, 802.11ay and 802.11be), denotes a set of Wireless Local Area Network (WLAN) air interface standards developed by the IEEE 802.11 committee for short-range communications (e.g., tens of meters to a few hundred meters).

Some wireless networks, such as 802.11be networks (also referred to as Extremely High Throughput (EHT) networks), enable certain wireless communication devices (which may be referred to as multi-link devices (MLDs)) to communicate via two or more wireless communication links across the available bands (2.4, 5, and 6 GHz bands) simultaneously, for example, using multi-link operation (MLO) and/or multi-link aggregation (MLA).

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that provide desirable latencies and/or throughputs due to multi-link operations.

Certain aspects of the present disclosure provide a method of wireless communications by a multi-link device (MLD). The method generally includes transmitting, to a first wireless station via a direct link between the first wireless station and one or more second wireless stations associated with the MLD, a data frame comprising a transmitter address field set to an address of the MLD, which is one of a plurality of addresses associated with the MLD and the second wireless stations being associated with the MLD for multi-link operations. The method also includes communicating with the first wireless station via the direct link.

Certain aspects of the present disclosure provide a method of wireless communications by an MLD. The method generally includes communicating with a first wireless station via a direct link between the first wireless station and a second wireless station, the second wireless station being associated with the MLD, wherein the direct link is inoperative for the MLD while a third wireless station associated with the MLD is communicating. The method further includes receiving, from an access point, a request-to-send (RTS) frame requesting to send data to the third wireless station associated with the MLD, and taking one or more actions in response to the RTS frame.

Certain aspects of the present disclosure provide a method of wireless communications by an access point. The method generally includes receiving, from an MLD, a first indication to enable transmission of an RTS frame before a transmission from the access point to the MLD. The method further includes transmitting, to the MLD, the RTS frame requesting to send data to one or more wireless stations associated with the MLD based on the first indication. The method also includes transmitting, to the one or more wireless stations, the data if a clear-to-send (CTS) frame is received by the access point from the MLD.

Certain aspects of the present disclosure provide a method of wireless communications by an MLD. The method generally includes transmitting, to an access point, a first indication that a first wireless station associated with the MLD is in power save mode. The method also includes communicating, after transmission of the first indication, with a second wireless station via a direct link between the second wireless station and a third wireless station, the third wireless station being associated with the MLD, wherein the direct link is inoperative for the MLD while the first wireless station is communicating.

Certain aspects of the present disclosure provide a method of wireless communications by an MLD. The method generally includes transmitting, to an access point, an indication to disable a link to a first wireless station associated with the MLD. The method also includes communicating, after the transmission of the indication, with a second wireless station via a direct link between the second wireless station and a third wireless station, the third wireless station being associated with the MLD, wherein the direct link is inoperative for the MLD while the first wireless station is communicating.

Certain aspects of the present disclosure provide a method of wireless communications by a first MLD. The method generally includes communicating, with a second MLD, via a dynamic link set comprising a plurality of links between first access points associated with the second MLD and first wireless stations associated with the first MLD. The method further includes transmitting, to one or more of the first access points, a first indication to remove a link in the dynamic link set between the one or more of the first access points and one or more of the first wireless stations. The method also includes communicating, after the transmission of the first indication, with a second wireless station via a direct link between the second wireless station and a third wireless station associated with the first MLD, wherein the direct link is inoperative for the first MLD while the one or more of the first wireless stations are communicating.

Certain aspects of the present disclosure provide a method of wireless communications by a first MLD. The method generally includes receiving, from a second MLD via a first access point associated with the first MLD, one or more first frames related to establishing a direct link between the second MLD and a first wireless station, wherein the first wireless station does not support multi-link operations. The method further includes relaying, to the first wireless station via the first access point, the one or more first frames, wherein the one or more first frames include a source address field set to an address of a second wireless station associated with the second MLD.

Certain aspects of the present disclosure provide a method of wireless communications by a first wireless station. The method generally includes transmitting, to a second wireless station via an access point, a request to discover the second wireless station for direct link communications between the first wireless station and the second wireless station, wherein the request indicates a link for communications between the first wireless station and the second wireless station. The method also includes communicating directly with the second wireless station via the link indicated in the request.

Certain aspects of the present disclosure provide a first multi-link device (MLD). The MLD generally includes a memory and a processor coupled to the memory. The processor and the memory are configured to transmit, to a first wireless station via a direct link between the first wireless station and at least one of a plurality of second wireless stations affiliated with the first MLD, a data frame comprising a transmitter address field set to an address of the first MLD, which is one of a plurality of addresses associated with the first MLD and the second wireless stations being affiliated with the first MLD for multi-link operations, and communicate with the first wireless station via the direct link.

Certain aspects of the present disclosure provide a method of wireless communication by a first multi-link device (MLD). The method generally includes transmitting, to a first wireless station via a direct link between the first wireless station and at least one of a plurality of second wireless stations affiliated with the first MLD, a data frame comprising a transmitter address field set to an address of the first MLD, which is one of a plurality of addresses associated with the first MLD and the second wireless stations being affiliated with the first MLD for multi-link operations, and communicating with the first wireless station via the direct link.

Certain aspects of the present disclosure provide a multi-link device (MLD). The MLD generally includes a memory and a processor coupled to the memory. The processor and the memory are configured to establish a direct link between a first wireless station and a second wireless station affiliated with the MLD; and communicate with the first wireless station via the direct link, wherein the direct link is inoperative for the MLD while a third wireless station affiliated with the MLD is communicating.

Certain aspects of the present disclosure provide an access point. The access point generally includes a memory and a processor coupled to the memory. The processor and the memory are configured to receive, from a multi-link device (MLD), an indication of a state associated with the MLD or one or more wireless stations affiliated with the MLD, transmit, to the MLD, a first frame requesting to send data to the one or more wireless stations affiliated with the MLD based on the state, and transmit, to the one or more wireless stations, the data if a second frame granting permission to send the data is received by the access point from the MLD.

Certain aspects of the present disclosure provide a multi-link device (MLD). The MLD generally includes a memory and a processor coupled to the memory. The processor and the memory are configured to transmit, to an access point or an access point (AP) MLD, a first indication associated with a first wireless station affiliated with the MLD, and communicate, after transmission of the first indication, with a second wireless station via a direct link between the second wireless station and a third wireless station, the third wireless station being affiliated with the MLD, wherein the direct link is inoperative for the MLD while the first wireless station is communicating.

Certain aspects of the present disclosure provide a method of wireless communication by a first multi-link device (MLD). The method generally includes establishing a direct link between a first wireless station and a second wireless station affiliated with the MLD; and communicating with the first wireless station via the direct link, wherein the direct link is inoperative for the MLD while a third wireless station affiliated with the MLD is communicating.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 6 is a diagram illustrating an example link identifier information element format, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
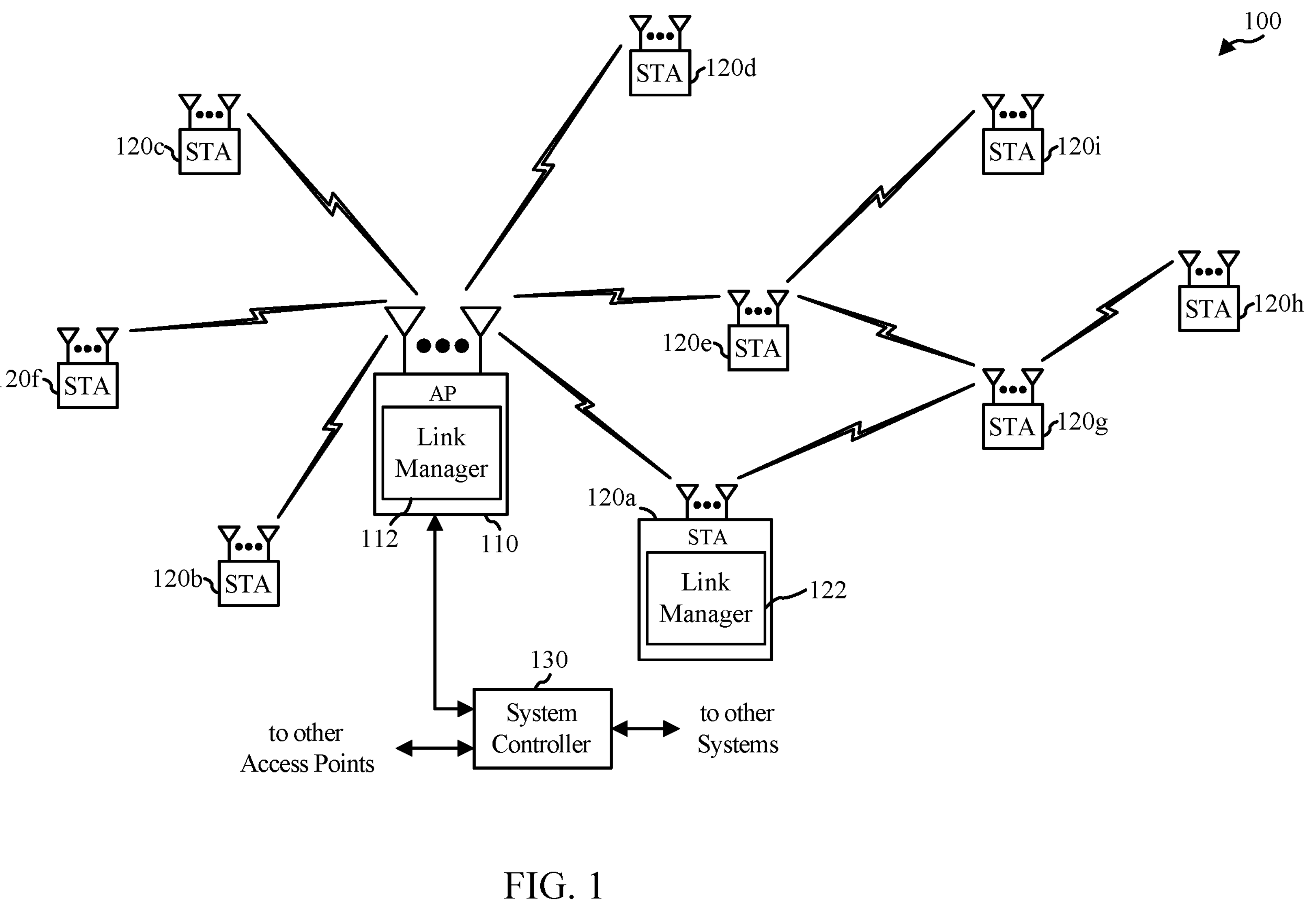
FIG. 1 is a diagram illustrating an example wireless communication network, in accordance with certain aspects of the present disclosure.

Aspects of the present disclosure provide apparatus, methods, processing systems, and computer readable mediums for handling direct link communications in multi-link operations (MLO).

In certain cases, wireless stations (STAs) may communicate with each other via a direct wireless link, such as a Tunneled Direct Link Setup (TDLS) link. While establishing the direct link, the STAs may exchange messages (for example, TDLS frames) through an access point (AP). When an AP relays frames on behalf of one associated STA to another associated STA, the AP may set the A3 field (e.g., the source address (SA) field) to the MAC address of the initiator STA. In the case of a non-AP multi-link device (MLD), the AP sets the SA field to the MAC address of the non-AP MLD. That is, in MLO, the SA field is the MLD MAC address for a frame relayed by the AP from a non-AP MLD. In TDLS, discovery and setup frames may be sent through the AP while frames sent, after setup is successful and TDLS direct link is established, are exchanged directly between the STAs. The AP may treat TDLS discovery and setup frames as data without assistance to setup the TDLS between STAs. For frames sent directly between the STAs, the receiver address (RA) or transmitter address (TA) fields in a frame may be set to the link address (e.g., the MAC address of a STA entity (e.g., the STA entity 310, 312) affiliated with an MLD). A STA, which does not support MLO, may not be able to make the association between MLD MAC address and the link MAC address, resulting in a TDLS link failure. Further, under certain 802.11 standards (e.g., 802.11be), there may be ambiguity as to the value of the TA field when a STA of a non-AP MLD sends a TDLS Discovery Response frame.

Aspects of the present disclosure provide various techniques and apparatus for handling direct link communication in MLO. For example, a STA of a non-AP MLD, which is participating in a TDLS connection, may set the TA field to the non-AP MLD's MAC address for frames sent directly to a TDLS peer STA. The STA of the non-AP MLD may set the TDLS initiator STA Address to the non-AP MLD MAC address in a Link Identifier—information element (IE)—in TDLS (Discovery/Setup) Request frames. The STA of the non-AP MLD may set the TDLS Responder STA Address to the non-AP MLD MAC address in the Link Identifier information element (IE) in TDLS (Discovery/Setup) Response frames sent in response to a TDLS (Discovery/Setup) Request frame received from the TDLS peer STA. The STA of the non-AP MLD may have the ability to process frames with the RA field set to the MLD MAC. The STA of the non-AP MLD may use the MLD MAC address during the Tunneled Peer Key (TPK) handshake and encryption key generation for the TDLS session. In certain cases, other STAs of the non-AP MLD may not be allowed to transmit a frame directed towards the peer STA with which another STA of the non-AP MLD has performed TDLS setup. As used herein, a legacy STA or legacy station may refer to a wireless station that does not support MLO or that is not capable of MLO, such as a wireless station that supports 802.11 standards defined before 802.11be.

The various techniques and apparatus for handling direct link communication in MLO may enable direct link communications between an MLD and a legacy STA or another MLD. The direct link communications may enable desirable latencies and/or throughputs, for example, due to the communications without an intermediary device (e.g., an access point).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. The techniques described herein may be utilized in any type of applied to Single Carrier (SC) and SC—Multiple Input Multiple Output (MIMO) systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Wireless Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 is a diagram illustrating an example wireless communication system 100 with access points and wireless stations. As shown in FIG. 1, an access point (AP) 110 includes a link manager 112 that may perform a RTS/CTS exchange and/or setting the SA fields when relaying frames between a legacy STA and a non-AP MLD, in accordance with aspects of the present disclosure. The wireless station (STA) 120*a* includes a link manager 122 that sets the TA field to specific address to enable direct link communications between the wireless station 120*a* and a legacy station (e.g., the wireless station 120*g*) and that takes various actions to prevent or mitigate a simultaneous transmit-receive (STR) state for specific STA entities, in accordance with aspects of the present disclosure. In aspects, the wireless station 120*a* may be a multi-link device (MLD) as further described herein with respect to FIG. 3.

For simplicity, only one access point 110 is shown in FIG. 1. An access point is generally a fixed station that communicates with the wireless stations and may also be referred to as a base station or some other terminology. A wireless station may be fixed or mobile and may also be referred to as a mobile station, a wireless device or some other terminology. Access point 110 may communicate with one or more wireless stations 120 at any given moment on the downlink and uplink. The downlink (i.e., forward link) is the communication link from the access point to the wireless stations, and the uplink (i.e., reverse link) is the communication link from the wireless stations to the access point. A wireless station may also communicate peer-to-peer with another wireless station, for example, via direct link such as a tunneled direct link setup (TDLS). A system controller 130 may be in communication with and provide coordination and control for the access points.

While portions of the following disclosure will describe wireless stations 120 capable of communicating via Spatial Division Multiple Access (SDMA), for certain aspects, the wireless stations 120 may also include some wireless stations that do not support SDMA. Thus, for such aspects, an access point (AP) 110 may be configured to communicate with both SDMA and non-SDMA wireless stations. This approach may conveniently allow older versions of wireless stations ("legacy" stations) to remain deployed in an enterprise, extending their useful lifetime, while allowing newer SDMA wireless stations to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected wireless stations 120 collectively represents the multiple-output for downlink transmissions and the multiple-input for uplink transmissions. For pure SDMA, it is desired to have $N_{ap} \geq K \geq 1$ if the data symbol streams for the K wireless stations are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected wireless station transmits user-specific data to and/or receives user-specific data from the access point. In general, each selected wireless station may be equipped with one or multiple antennas (i.e., $N_{sta} \geq 1$). The K selected wireless stations can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each wireless station may be equipped with a single antenna or multiple antennas. The system 100 may also be a TDMA system if the wireless stations 120 share the same frequency channel by dividing transmission/reception into different time slots, each time slot being assigned to different wireless station 120.

Figure 2:
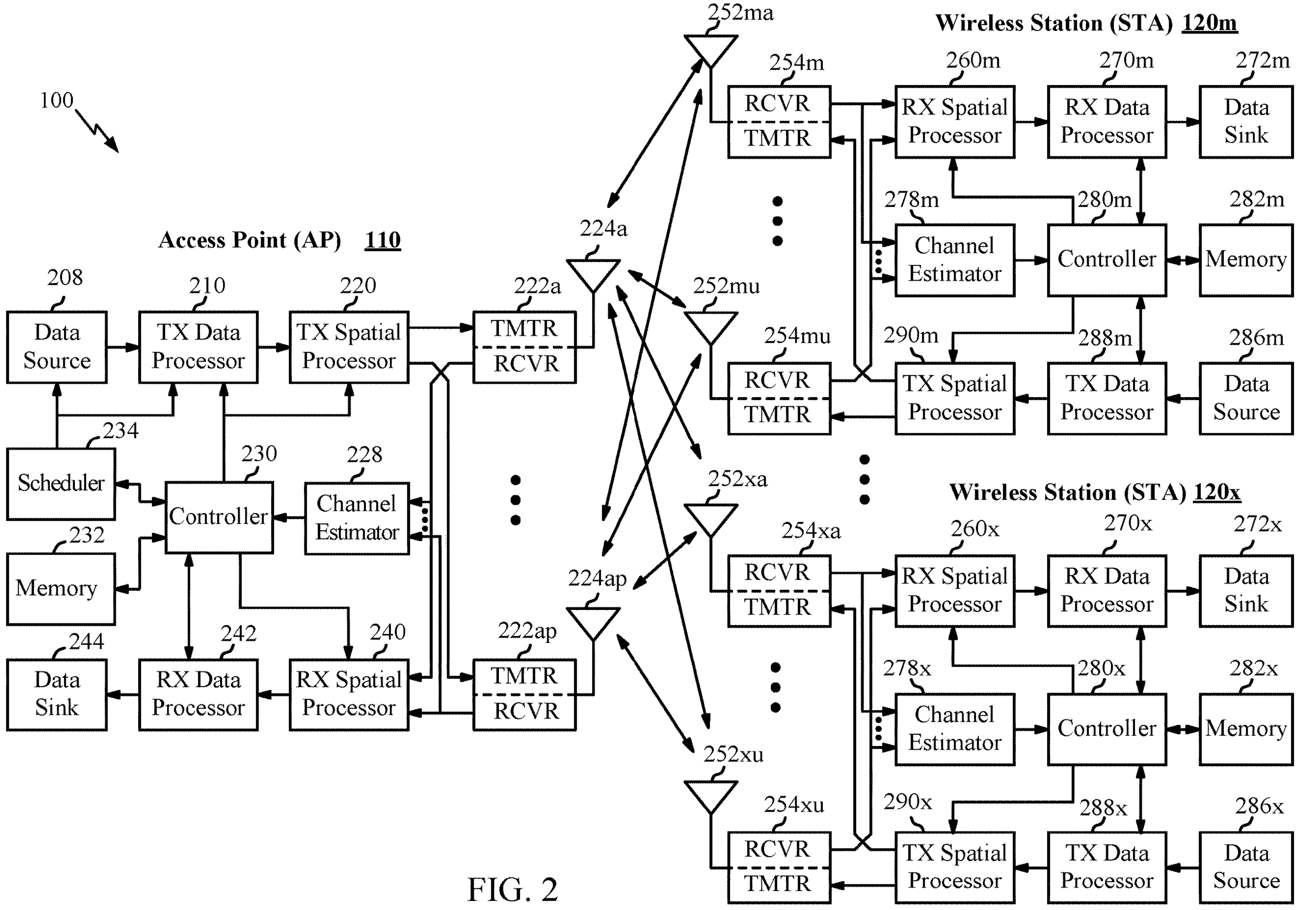
FIG. 2 is a block diagram conceptually illustrating a design of an example access point (AP) and wireless stations (STAs), in accordance with certain aspects of the present disclosure.

FIG. 2 illustrates a block diagram of access point 110 and two wireless stations 120*m* and 120*x* in a MIMO/MLO system 100. In certain aspects, the access point 110 and/or the wireless stations 120*m* and 120*x* may perform various techniques for handling direct link communications between wireless stations in MLO systems, for example, as further described herein with respect to FIGS. 4-20. For example, the access point 110 and/or the wireless stations 120*m* and 120*x* may include a respective link manager as described herein with respect to FIG. 1.

The access point 110 is equipped with $N_{ap}$ antennas 224*a* through 224*t*. Wireless station 120*m* is equipped with $N_{sta,m}$ antennas 252*ma* through 252*mu*, and wireless station 120*x* is equipped with $N_{sta,x}$ antennas 252*xa* through 252*xu*. The access point 110 is a transmitting entity for the downlink and a receiving entity for the uplink. Each wireless station 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "DL" denotes the downlink, the subscript "UL" denotes the uplink, $N_{UL}$, wireless stations are selected for simultaneous transmission on the uplink, $N_{DL}$ wireless stations are selected for simultaneous transmission on the downlink, $N_{UL}$ may or may not be equal to $N_{DL}$, and $N_{UL}$ and $N_{DL}$ may be static values or can change for each scheduling interval. The beam-steering or some other spatial processing technique may be used at the access point and wireless station.

On the uplink, at each wireless station 120 selected for uplink transmission, a TX data processor 288 receives traffic data from a data source 286 and control data from a controller 280. TX data processor 288 processes (e.g., encodes, interleaves, and modulates) the traffic data for the wireless station based on the coding and modulation schemes associated with the rate selected for the wireless station and provides a data symbol stream. A TX spatial processor 290 performs spatial processing on the data symbol stream and provides $N_{sta,m}$ transmit symbol streams for the $N_{sta,m}$ antennas. Each transceiver (TMTR) 254 receives and processes (e.g., converts to analog, amplifies, filters, and frequency upconverts) a respective transmit symbol stream to generate an uplink signal. $N_{sta,m}$ transceivers 254 provide $N_{sta,m}$ uplink signals for transmission from $N_{sta,m}$ antennas 252 to the access point.

$N_{UL}$ wireless stations may be scheduled for simultaneous transmission on the uplink. Each of these wireless stations performs spatial processing on its data symbol stream and transmits its set of transmit symbol streams on the uplink to the access point.

At access point 110, $N_{ap}$ antennas 224*a* through 224*ap* receive the uplink signals from all $N_{UL}$ wireless stations transmitting on the uplink. Each antenna 224 provides a received signal to a respective transceiver (RCVR) 222. Each transceiver 222 performs processing complementary to that performed by transceiver 254 and provides a received symbol stream. An RX spatial processor 240 performs receiver spatial processing on the $N_{ap}$ received symbol streams from $N_{ap}$ transceiver 222 and provides $N_{UL}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective wireless station. An RX data processor 242 processes (e.g., demodulates, deinterleaves, and decodes) each recovered uplink data symbol stream in accordance with the rate used for that stream to obtain decoded data. The decoded data for each wireless station may be provided to a data sink 244 for storage and/or a controller 230 for further processing.

On the downlink, at access point 110, a TX data processor 210 receives traffic data from a data source 208 for $N_{DL}$ wireless stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless station based on the rate selected for that wireless station. TX data processor 210 provides $N_{DL}$ downlink data symbol streams for the $N_{DL}$ wireless stations. A TX spatial processor 220 performs spatial processing (such as a precoding or beamforming, as described in the present disclosure) on the $N_{DL}$ downlink data symbol streams, and provides $N_{ap}$ transmit symbol streams for the $N_{ap}$ antennas. Each transceiver 222 receives and processes a respective transmit symbol stream to generate a downlink signal. $N_{ap}$ transceivers 222 providing $N_{ap}$ downlink signals for transmission from $N_{ap}$ antennas 224 to the wireless stations.

At each wireless station 120, $N_{sta,m}$ antennas 252 receive the $N_{ap}$ downlink signals from access point 110. Each transceiver 254 processes a received signal from an associated antenna 252 and provides a received symbol stream. An RX spatial processor 260 performs receiver spatial processing on $N_{sta,m}$ received symbol streams from $N_{sta,m}$ transceiver 254 and provides a recovered downlink data symbol stream for the wireless station. The receiver spatial processing is performed in accordance with the CCMI, MMSE or some other technique. An RX data processor 270 processes (e.g., demodulates, deinterleaves and decodes) the recovered downlink data symbol stream to obtain decoded data for the wireless station.

At each wireless station 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each wireless station typically derives the spatial filter matrix for the wireless station based on the downlink channel response matrix $H_{dn,m}$ for that wireless station. Controller 230 derives the spatial filter matrix for the access point based on the effective uplink channel response matrix $H_{up,eff}$. Controller 280 for each wireless station may send feedback information (e.g., the downlink and/or uplink eigenvectors, eigenvalues, SNR estimates, and so on) to the access point. Controllers 230 and 280 also control the operation of various processing units at access point 110 and wireless station 120, respectively.

In certain wireless communication networks (e.g., 802.11be networks), a multi-link device (MLD) may be a wireless communication device with multiple affiliated APs or STAs. The MLD may have a single medium access control (MAC) service access point (SAP) to a logical link control (LLC) layer. The MLD may also have a MAC address that uniquely identifies the MLD management entity. An MLD may support various multi-link operations (MLO). In aspects, MLO may include multi-band aggregation, where two or more channels at different bands (e.g., 2.4, 5, and 6 GHz bands) are combined to achieve higher transmission rates. In aspects, the 6 GHz band may include a frequency range of 5.925-7.125 GHz. For example, a single frame may be split and transmitted simultaneously through the different channels at the different bands, reducing the frames transmission time or facilitating transmission of larger aggregated frames. MLO may include multi-band and multi-channel full duplex communications, which is achieved through transmitting and receiving on different channels (in the same or different bands) at the same time. MLO may include data and control plane separation on to different channels (in the same or different bands). In certain aspects, MLO may be implemented with a multi-link single radio (MLSR) architecture, where the multiple affiliated APs or STAs of an MLD may be logical devices under a single radio.

Figure 3:
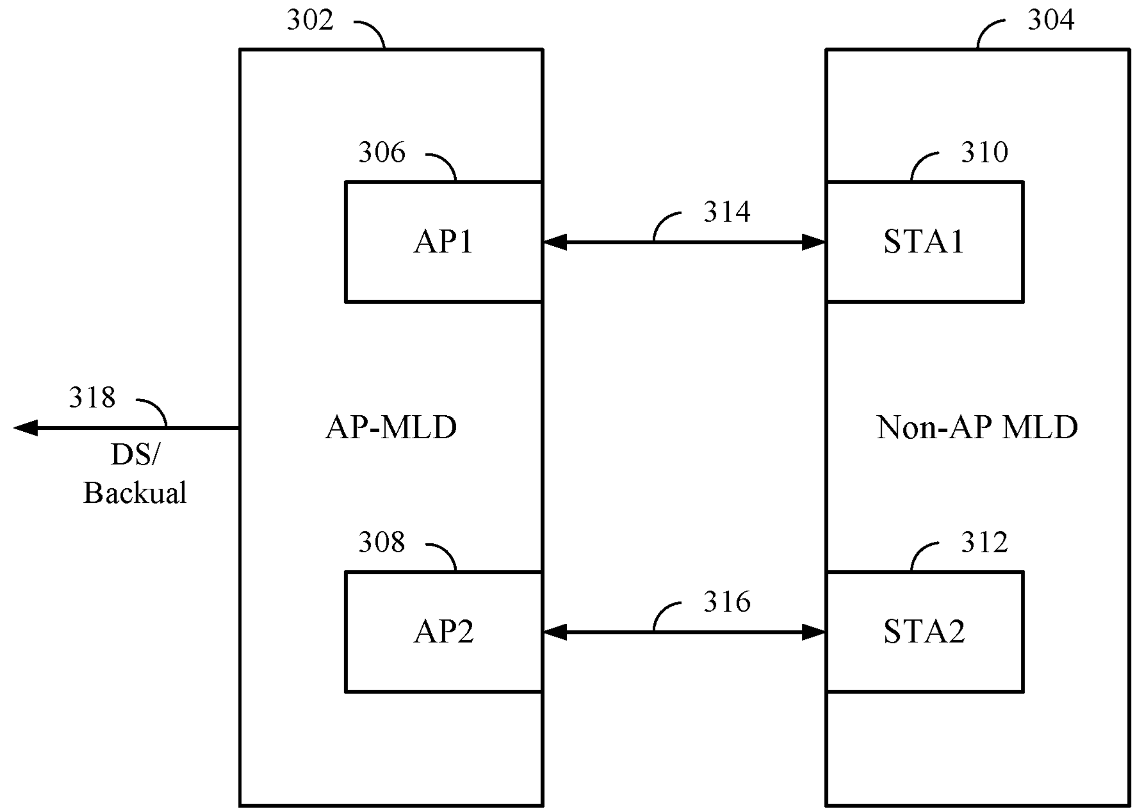
FIG. 3 is a block diagram illustrating an example of multi-link operations between multi-link devices (MLDs), in accordance with certain aspects of the present disclosure.

FIG. 3 is a block diagram illustrating example multi-link operations between MLDs, in accordance with certain aspects of the present disclosure. As shown, an AP MLD 302 may communicate with a non-AP MLD 304 via multi-link communications, such as multi-band aggregation. The AP MLD 302 may also be in communication with other systems (e.g., a distribution system (DS) such as a local area network and/or a wide area network) via an interface 318, such as a backhaul interface. The AP MLD 302 may include at least two STA entities 306, 308 (sometimes referred to as STA instances and also referred to herein simply as STAs) that may communicate with associated STA entities 310, 312 of the non-AP MLD 304. A STA entity (or instance) of an AP MLD are generally APs (which may be referred to as AP-STAs or STAs serving as APs), and a STA entity of a non-AP MLD are generally non-AP STAs (which may be referred to simply as a STA). MLDs may use multi-link operations, such as multi-link aggregation (MLA) (which includes packet level aggregation), where MAC protocol data units (MPDUs) from a same traffic ID (TID) can be sent via two or more links 314, 316.

In aspects, each of the STA entities 306, 308 may communicate on separate bands (e.g., 2.4, 5, and 6 GHz bands), and similarly, each of the STA entities 310, 312 may communicate on separate bands (2.4, 5, and 6 GHz bands). For example, the STA entities 306, 310 may communicate with each other on a first link 314 via a first band (e.g., 5 GHz band), and the STA entities 308, 312 may communicate with each other on a second link 316 via a second band (e.g., 6 GHz band). The aggregated links 314, 316 may enable desirable throughputs and latencies between the AP MLD 302 and the non-AP MLD 304. In aspects, the STA entities (306, 308 or 310, 312) of an MLD may be implemented as separate devices or RF transceiver chips of the MLD, or the STA entities may be integrated into the same device or RF transceiver chip. In certain aspects, a link may refer to a physical path having one traversal of the wireless medium (WM) that is usable to transfer various packets, messages, or frames (such as MAC service data units (MSDUs)) between two stations (STAs).

Example Direct Link Communications in Multi-Link Operations

In certain cases, STAs may communicate with each other via a direct wireless link, such as a Tunneled Direct Link Setup (TDLS) link. While establishing the direct link, the STAs may exchange messages (for example, TDLS frames) through an AP. When an AP relays frames on behalf of one associated STA to another associated STA, the AP may set the A3 field (e.g., the source address (SA) field) to the MAC address of the initiator STA. In the case of a non-AP MLD, the AP sets the SA field to the MAC address of the non-AP MLD. That is, in MLO, the SA field is the MLD MAC address for a frame relayed by the AP from a non-AP MLD. In TDLS, discovery and setup frames may be sent thru the AP while frames sent after setup are exchanged directly between the STAs. For frames sent directly between the STAs, the receiver address (RA) or transmitter address (TA) fields in a frame may be set to the link address (e.g., the MAC address of a STA entity (e.g., the STA entity 310, 312) affiliated with an MLD). A STA, which does not support MLO, may not be able to make the association between MLD MAC address and the link MAC address, resulting in a TDLS link failure. Further, under certain 802.11 standards (e.g., 802.11be), there may be ambiguity as to the value of the TA field when a STA of a non-AP MLD sends a TDLS Discovery Response frame.

Aspects of the present disclosure provide various techniques and apparatus for handling direct link communication in MLO. For example, a STA of a non-AP MLD, which is participating in a TDLS connection, may set the TA field to the non-AP MLD's MAC address for frames sent directly to a TDLS peer STA. The STA of the non-AP MLD may set the TDLS initiator STA Address to the non-AP MLD MAC address in a Link Identifier—information element (IE)—in TDLS (Discovery/Setup) Request frames. The STA of the non-AP MLD may set the TDLS Responder STA Address to the non-AP MLD MAC address in the Link Identifier information element (IE) in TDLS (Discovery/Setup) Response frames sent in response to a TDLS (Discovery/Setup) Request frame received from the TDLS peer STA. The STA of the non-AP MLD may have the ability to process frames with the RA field set to the MLD MAC. The STA of the non-AP MLD may use the MLD MAC address during the Tunneled Peer Key (TPK) handshake and encryption key generation for the TDLS session. In certain cases, other STAs of the non-AP MLD may not be allowed to transmit a frame directed towards the peer STA with which another STA of the non-AP MLD has performed TDLS setup. The various techniques and apparatus for handling direct link communication in MLO may enable direct link communications between an MLD and a STA, which does not support MLO.

Figure 4:
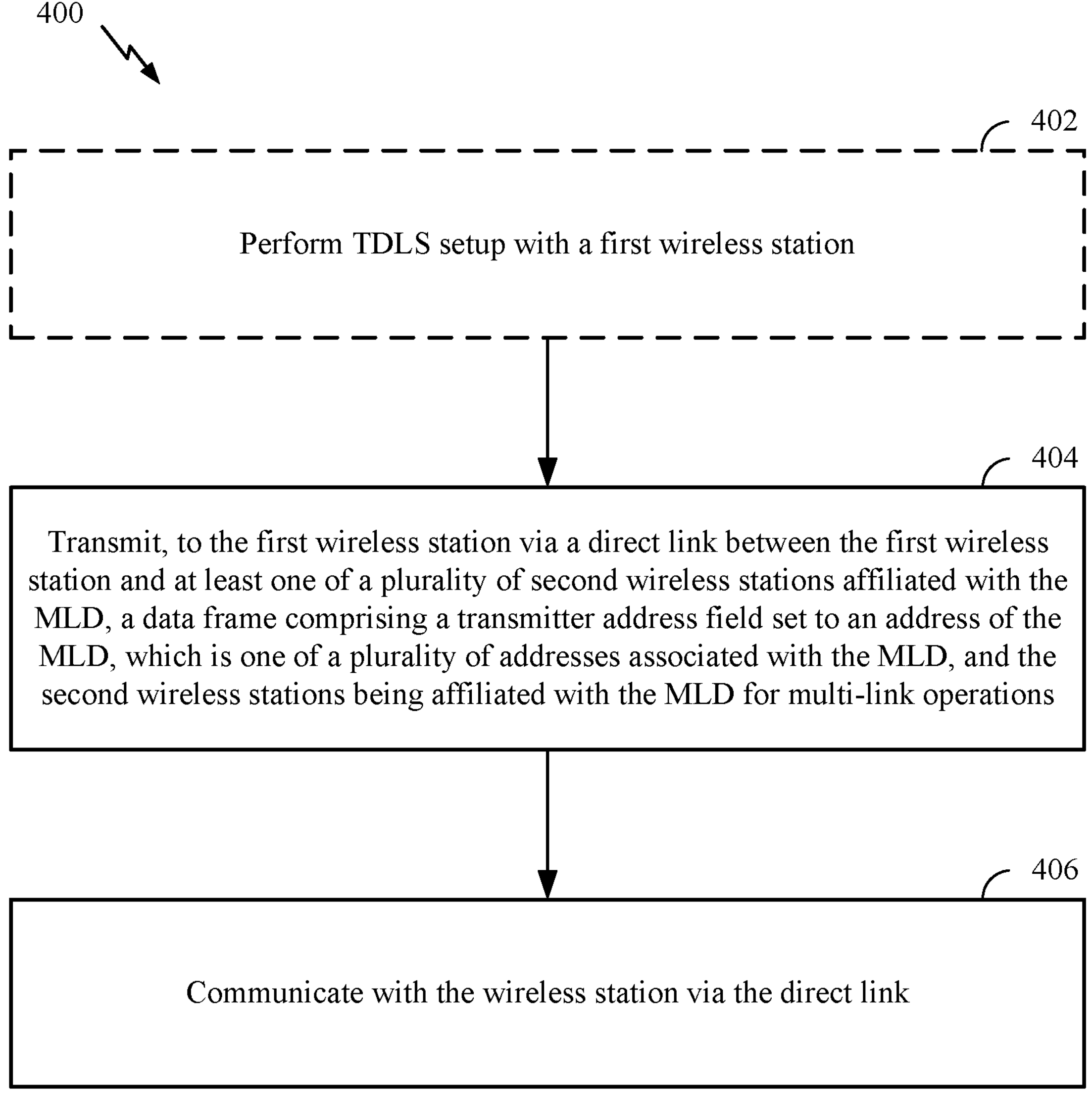
FIG. 4 is a flow diagram illustrating example operations for wireless communication by an MLD, in accordance with certain aspects of the present disclosure.

FIG. 4 illustrates example operations 400 of wireless communications, in accordance with certain aspects of the present disclosure. The operations 400 may be performed, for example, by an MLD (e.g., the STA 120*a* or the non-AP MLD 304). The operations 400 may be implemented as software components that are executed and run on one or more processors (e.g., controller 280 of FIG. 2). In certain aspects, the transmission and/or reception of signals by the MLD may be implemented via a bus interface of one or more processors (e.g., controller 280) that obtains and/or outputs signals. Further, the transmission and reception of signals by the MLD may be enabled, for example, by one or more antennas and/or transceivers (e.g., antenna(s) 252 or transceiver(s) 254 of FIG. 2).

Figures 5A, 5B:
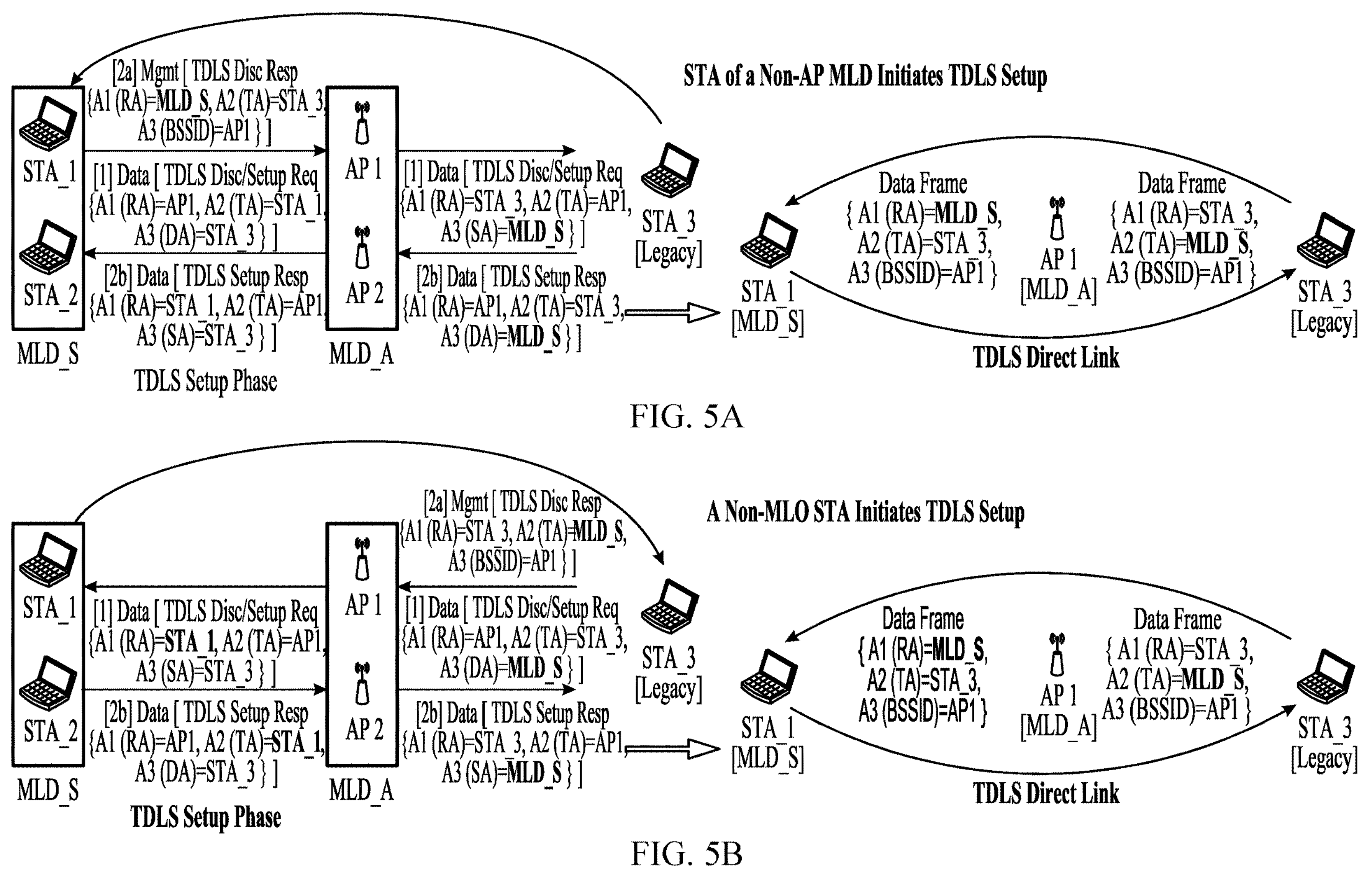
FIG. 5A is a diagram illustrating an MLD initiating a direct link setup with a legacy STA and communicating via the direct link with the legacy STA, in accordance with certain aspects of the present disclosure.
FIG. 5B is a diagram illustrating a legacy STA initiating a direct link setup with an MLD and communicating via the direct link with the MLD, in accordance with certain aspects of the present disclosure.

The operations 400 may begin at 402, where a first MLD performs TDLS setup with a first wireless station (e.g., the STA 120*g*), for example, as further described herein with respect to FIGS. 5A and 5B. At 404, the first MLD may transmit, to the first wireless station via a direct link between the first wireless station and at least one of a plurality of second wireless stations (e.g., the STA 310, 312) associated with (e.g., affiliated with) the first MLD, a data frame comprising a transmitter address (TS) field set to an address of the first MLD, which is one of a plurality of addresses associated with the first MLD, and the second wireless stations being associated with (affiliated with) the first MLD for MLO. At 406, the first MLD may communicate with the wireless station via the direct link. As used herein, a wireless station associated with an MLD may refer to a wireless station affiliated with the MLD.

In certain aspects, the transmission at 404 may be a transmission sent directly to a TDLS peer STA (e.g., the first wireless station) without an AP relaying the data frame to the TDLS peer STA. At 404, the first MLD may have a TDLS link established with the first wireless station, and the transmission at 404 may be via the TDLS link. In other words, the direct link may include a tunneled direct link such as a TDLS link. In aspects, the first MLD may communicate with the TDLS peer STA via one or more of the STA entities (e.g., the STA entities 310, 312) on the direct link. For example, the first MLD may communicate with the TDLS peer STA via the second wireless station(s), which may be affiliated with the first MLD. In aspects, the address of the first MLD may include a MAC address, such as a multi-link logical MAC address. The multi-link logical MAC address of the first MLD may be a MAC address that uniquely identifies the MLD entity (e.g., the MLD 302), which manages the STA entities (e.g., the STA entities 310, 312). In aspects, the multi-link logical MAC address of the first MLD may be referred to as an MLD MAC address, which may be a non-AP MLD MAC address. The MLD MAC address may be a globally unique MAC address or a MAC address that is the same as one of the per-link MAC addresses (e.g., per-STA or per-AP of the MLD). In other words, the TA field at 404 may be set to the multi-link logical MAC address of the first MLD. The plurality of addresses associated with the first MLD may include the multi-link logical MAC address and MAC addresses associated with (each of) the second wireless stations (e.g., the STA entities 310, 312), where the second wireless stations are affiliated with the first MLD for multi-link operations. For example, the second wireless stations may enable the first MLD to communicate with another MLD (e.g., the AP MLD 302) via separate bands (e.g., 5 and 6 GHz bands) simultaneously.

In certain aspects, the first MLD may set the initiator or responder address in a link identifier element of specific TDLS frames (e.g., TDLS discovery or setup frames) to the MLD MAC address. An example link identifier IE format is further described herein with respect to FIG. 6. At 402, performing TDLS setup may include the first MLD exchanging TDLS discovery or setup frames with the first wireless station, for example, as further described herein with respect to FIGS. 5A and 5B.

In aspects, the initiator address of the link identifier IE may be set to the MLD MAC address in TDLS request frames (such as a TDLS Discovery Request frame and/or a TDLS Setup Request frame from a TDLS initiator station). For certain aspects, a request, request frame, or initiator frame associated with the direct link (e.g., TDLS) may include a TDLS Discovery Request frame and/or a TDLS Setup Request frame. For example, the first MLD may transmit (at 402), to the first wireless station via an access point (e.g., the AP 110 or AP MLD 302), a request to discover a peer wireless station (such as the first wireless station) for the direct link. In other words, the first MLD may transmit the request to the AP, which relays the request to the first wireless station. The request may include a link identifier element having a direct link initiator address (e.g., a TDLS initiator STA address) set as the address of the first MLD (e.g., the MLD MAC address). In aspects, the request may include a TDLS Discovery Request frame in accordance with the 802.11 standards. As an example, the first MLD may transmit (at 402), to the first wireless station via the access point, a request to setup the direct link, and the request may include a link identifier element having a direct link initiator address set as the address of the first MLD (e.g., the MLD MAC address). In aspects, the request may include a TDLS Setup Request frame in accordance with the 802.11 standards.

In aspects, the responder address of the link identifier IE may be set to the MLD MAC address in TDLS response frames (such as a TDLS Discovery Response frame and/or a TDLS Setup Response frame from a TDLS responder station). For certain aspects, a response, response frame, or responder frame associated with the direct link may include a TDLS Discovery Response frame and/or a TDLS Setup Response frame. For example, the first MLD may transmit, to the first wireless station (at 402), a response responsive to a request to discover a peer wireless station (such as the first MLD) for the direct link, and the response may include a link identifier element having a direct link responder address set as the address of the first MLD (e.g., the MLD MAC address). In aspects, the first MLD may transmit the response directly to the first wireless station. The response may include a TDLS Discovery Response frame in accordance with the 802.11 standards. As an example, the first MLD may transmit, to the first wireless station via an access point (at 402), a response responsive to a request to setup the direct link, and the response may include a link identifier element having a direct link responder address set as the address of the first MLD (e.g., the MLD MAC address). The response may include a TDLS Setup Request frame in accordance with the 802.11 standards.

In certain aspects, the first MLD may set the TA field to the MLD MAC address for a discovery response sent to the first wireless station. Performing TDLS setup at 402 may involve the first wireless station initiating discovery of a peer wireless station (such as the first MLD), for example, where the first wireless station sends a TDLS Discovery Request frame to the first MLD via an AP. In such a case, the first MLD may respond to the TDLS Discovery Request frame with a TDLS Discovery Response frame, which is sent directly to the first wireless station. The first MLD may set the TA field to the MLD MAC address in the TDLS Discovery Response frame. For example, the first MLD may receive, from the first wireless station via an access point, a request to discover a peer wireless station (such as the first MLD) for the direct link. In aspects, the request may include a TDLS Discovery Request frame. The first MLD may transmit, to the first wireless station (at 402), a discovery response comprising the TA field set to the address of the first MLD (e.g., the MLD MAC address), where the transmission of the discovery response may be responsive to the request.

At 406, the first MLD may support receiving frames directly from the TDLS peer STA with a receiver address (RA) field set to the MLD MAC address. For example, at 406, the communication with the first wireless station via the direct link may include the first MLD receiving, from the first wireless station via the direct link, a frame comprising a receiver address field set to the address of the first MLD (e.g., the MLD MAC address).

In certain aspects, a header of a frame may include the TA/RA fields as described herein. For example, a MAC header of a data frame or TDLS frame may include the TA/RA fields. With respect to the operations 400, the data frame may include a MAC header including the TA field, and the data frames received at 406 may include a MAC header including the RA field.

In aspects, a STA entity of the first MLD may use the MLD MAC address during the TPK handshake (such as a 4-way handshake) and encryption key generation for the TDLS session. For example, the first MLD may generate a security key for the TDLS session using the MLD MAC address. At 402, the first MLD may generate the encryption key based at least in part on the address of the first MLD and transmit, to the first wireless station, an indication of the encryption key (e.g., a parameter used to generate the encryption key at the first wireless station). For certain aspects, encryption key generation may be further based on an AP MLD MAC address and/or an AP MAC address. In certain cases, when both wireless stations, involved in TDLS setup, include the TDLS variant Multi-Link element, carrying the AP MLD MAC Address field, in the frames exchanged during TDLS setup phase, the TDLS TPK generation may include the AP MLD MAC address in addition to the MAC address of the affiliated AP where the TDLS direct link is being established. The AP MLD MAC address may be used to generate the encryption key when the MLDs in the TDLS are non-AP MLDs for a single link or multi-link TDLS between the MLDs. The communications with the first wireless station at 406 may include the first MLD communicating encrypted frames with the first wireless station based on the encryption key.

In certain aspects, other STA entities of the first MLD may not be allowed to transmit a frame directed towards the TDLS peer STA. For example, one of the second wireless stations (e.g., the STA 310) of the first MLD may communicate with the TDLS peer STA via the direct link, and the other second wireless stations (e.g., the STA 312) of the first MLD may transmit frames to an access point without directing the frames to the TDLS peer STA. After a TDLS direct link is successfully established between the TDLS STA affiliated with a non-AP MLD and a TDLS peer STA at the other end of the TDLS direct link, STAs affiliated with the non-AP MLD may cease transmitting packets to the TDLS peer, at the other end, through their associated AP that is affiliated with the AP MLD to which the non-AP MLD has performed multi-link setup. In certain cases, the first MLD may cease transmission to the first wireless station via the second wireless stations, except for one of the second wireless stations associated with the direct link, based on the direct link being operative.

In aspects, the access point, which assists in relaying TDLS Discovery and Setup frames, may be an MLD. For example, at 402, the first MLD may exchange TDLS Discovery and Setup frames with an access point that is an MLD (e.g., the AP MLD 302).

FIG. 5A is a diagram illustrating an MLD (MLD_S) initiating a TDLS setup with a legacy STA (STA_3) and communicating via the TDLS link with the legacy STA, in accordance with certain aspects of the present disclosure. As shown, STA1 of the MLD_S may transmit, to AP1 of the MLD_A, a TDLS Discovery Request frame with the TA field set to the STA_1 MAC address. The AP1 relays, to the STA_3, the TDLS Discovery Request frame with the SA field set to the MLD_S MAC address (e.g., the MAC address of the MLD entity). From the STA_3 perspective, the STA_3 is not aware of the STA entities (STA_1 and STA_2) of the MLD_S. As such, the STA_3 transmits directly, to the STA_1 of the MLD_S, a TDLS Discovery Response frame with the RA field set to the MLD_S MAC address. The STA_1 of the MLD_S may support receiving a frame with the RA field set to the MLD_S MAC address.

The STA_1 of the MLD_S may transmit, to the AP1, a TDLS Setup Request frame with the TA field set to the STA_1 MAC address, and the AP1 may relay, to the STA_3, the TDLS Setup Request frame with the SA field set to the MLD_S MAC address. The STA_3 may transmit, to the AP1, a TDLS Setup Response frame with the destination address (DA) field set to the MLD_S MAC address, and the AP1 may relay, to the STA_1 of the MLD_S, the TDLS Setup Response frame with the RA field set to the STA_1 MAC address. Upon completion of the TDLS process, the STA_1 of the MLD_S and the STA_3 may communicate with each other via a TDLS link. The STA_1 of the MLD_S may transmit directly, to the STA_3, a data frame with a TA field set to the MLD_S MAC address, which will enable the STA_3 to receive the data frame and communicate with the STA_1 due to the STA_3 not knowing about the STA_1 MAC address. The STA_3 may transmit directly, to the STA_1 of the MLD_S, a data frame with the RA field set to the MLD_S MAC address. As previously described, the STA_1 of the MLD_S may support receiving a frame with the RA field set to the MLD_S MAC address, which enables the STA_1 of the MLD_S to receive TDLS data frames from the STA_3 due to the STA_3 not knowing about the STA_1 MAC address.

FIG. 5B is a diagram illustrating a legacy STA (STA_3) initiating a TDLS setup with an MLD (MLD_S) and communicating via the TDLS link with the MLD, in accordance with certain aspects of the present disclosure. As shown, the signaling exchange between the STA_3 and MLD_S follows a similar signaling flow as described herein with respect to FIG. 5A. For example, the TDLS frame(s) relayed from the AP1 to the STA_3 have the SA field set to the MLD_S MAC address, and the TDLS frame(s) relayed from the AP1 to the STA_1 have the RA field set to the STA_1 MAC address. In this example, the STA1 of the MLD_S transmits directly, to the STA_3, a TDLS Discover Response frame with the TA field set to the MLD_S MAC address, which will enable the STA_3 to communicate with the STA_1 due to the STA_3 not knowing about the STA_1 MAC address. After completion of the TDLS process, the STA_1 and STA_3 may transmit data frames with the RA/TA fields set as described herein with respect to FIG. 5A.

Figure 6:
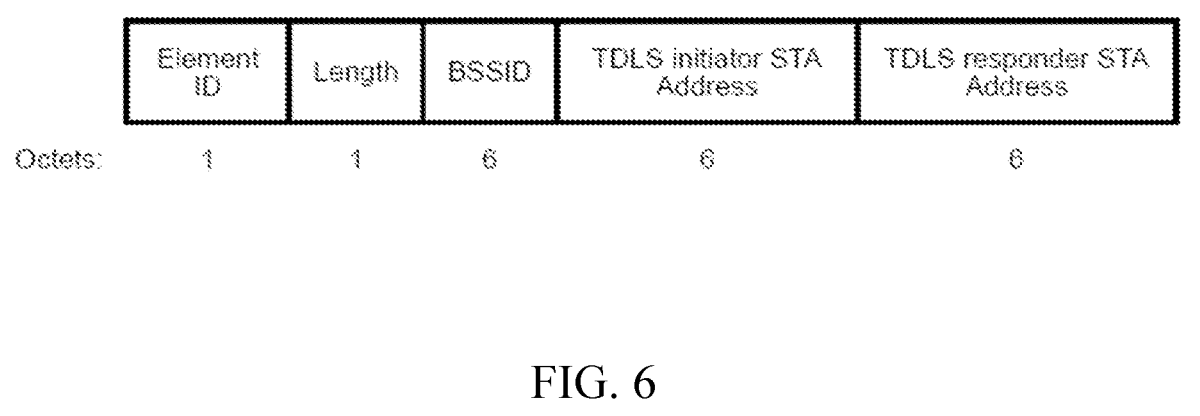

FIG. 6 is a diagram illustrating an example link identifier IE format, in accordance with certain aspects of the present disclosure. As shown, the link identifier IE format may have an element identifier (ID) field (which identifies the element as a link identifier), a length field, a basic service set identifier (BSSID) field, a TDLS initiator STA address field, and a TDLS responder STA address field. The initiator STA may be the STA that sends a TDLS Discovery/Setup Request frame, and the responder STA may be the STA requested to respond (or responding) to the TDLS Discovery/Setup Request frame. As described herein with respect to the operations 400, the first MLD may set the TDLS initiator STA address field to the MLD MAC address for TDLS request frames (e.g., the TDLS Discovery/Setup Request frames), and the first MLD may set the TDLS responder STA address field to the MLD MAC address for the TDLS response frames (e.g., the TDLS Discovery/Setup Response frames).

Aspects of the present disclosure provide various techniques for handling direct link communications between MLDs. In certain cases, the MLDs may setup and communicate with each other via separate TDLS sessions on multiple links via multiple STA entities. That is, a separate TDLS session may be established for each STA entity pair between TDLS MLO STA peers. In certain aspects, the MLDs may setup and communicate with each other via a single TDLS session on multiple links via multiple STA entities. That is, a single TDLS session may be established between TDLS MLO STA peers, and the TDLS MLO STA peers may communicate with each other via multiple STA entities at each TDLS peer. A single TDLS session may enable a common block acknowledgement session where packets can be sent on any of the links between STA entities, which may help with duplicate detection. To setup one or more multi-link TDLS sessions, multi-link support or a request for multi-link TDLS may be indicated by a BSSID field in Link Identifier element set to a wildcard value or a specific value, by including a multi-link element during the TDLS Discovery and/or Setup exchange, by identifying the link associated with a STA entity via a Link identifier (ID) field in per-STA Profile subfield, by providing provide an MLD's multi-link capabilities and/or constraints (such as n-STR links/STAs) for each link associated with a STA entity. The MLDs may coordinate transmissions on n-STR links that are part of a TDLS session.

The various techniques for handling direct link communication between MLDs may enable direct link communications with desirable latencies and data throughputs, for example, due to the multi-band aggregation and/or other features of MLO.

In certain aspects, the TDLS peer STA of the direct link in the operations 400 may also be part of an MLD. For example, the first wireless station may be associated with a second MLD for multi-link communications with the first MLD, and the second MLD further has two or more third wireless stations being associated therewith for multi-link communications with the first MLD.

With respect to the operations 400, the direct link may include a plurality of tunneled direct link sessions, and each of the plurality of tunneled direct link sessions is associated with a separate link between one of the second wireless stations and one of the third wireless stations. In certain aspects, the direct link may include a single tunneled direct link session, and the plurality of links between the second wireless stations and the third wireless stations are associated with the single tunneled direct link session.

In certain aspects, the first MLD may indicate to setup a direct link with multi-link capabilities (such as MLO/MLA capabilities). In aspects, the first MLD may transmit the indication to setup a direct link with multi-link capabilities to a legacy STA or another MLD. For example, the first MLD may transmit, to the first wireless station, an indication to setup the direct link as a multi-link direct link. The communication with the first wireless station via the direct link at 406 may include the first MLD communicating with the first wireless station via one or more links of the multi-link direct link based on the indication. The indication may include at least one of a BSSID field including a value indicating to setup the direct link as the multi-link direct link or a multi-link element in a direct link discovery frame or a direct link setup frame. An example multi-link IE format is further described herein with respect to FIG. 19. The value may be set to a link identifier associated with the link(s). The multi-link element may include a first indication having an identifier of the direct link in a station profile sub-element associated with at least one of the second wireless stations, or a second indication of one or more capabilities of the second wireless stations associated with links between the second wireless stations and the third wireless stations. As an example, the capabilities may indicate whether the wireless stations are STR or n-STR. Capability information may include as one or more fields in the per-STA profile sub-element.

Figures 7A, 7B:
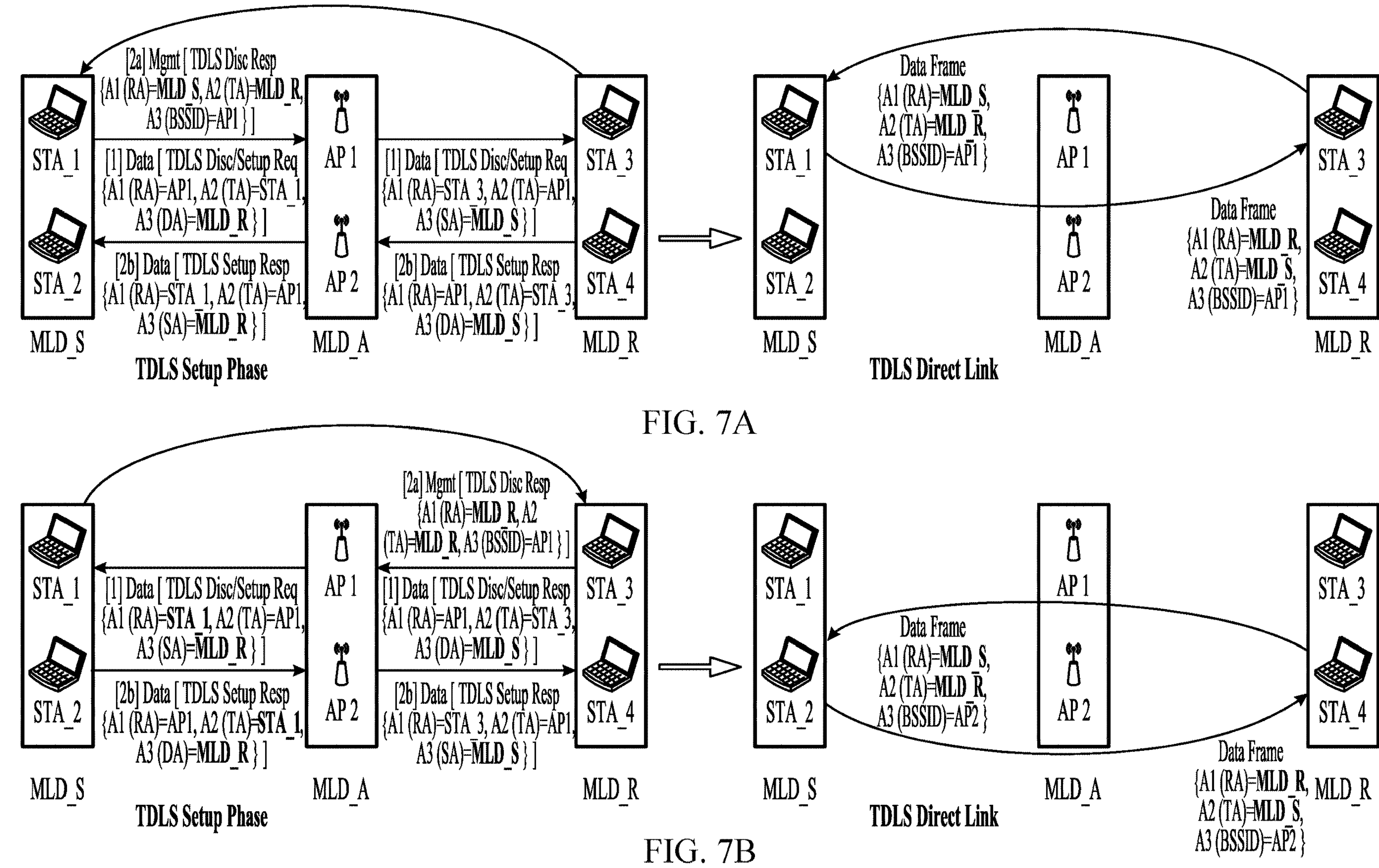
FIG. 7A is a diagram illustrating a first MLD initiating a direct link setup with a second MLD and communicating via the direct link with the second MLD, in accordance with certain aspects of the present disclosure.
FIG. 7B is a diagram illustrating the second MLD initiating a direct link setup with the first MLD and communicating via the direct link with the first MLD, in accordance with certain aspects of the present disclosure.

FIG. 7A is a diagram illustrating MLD_S initiating a TDLS setup with MLD_R and communicating via the TDLS link with MLD_R, in accordance with certain aspects of the present disclosure. As shown, the signaling exchange between the MLD_R and MLD_S follows a similar signaling flow as described herein with respect to FIG. 5A. In certain aspects, the RA, TA, SA, DA fields may be set to the respective MLD MAC addresses (e.g., the MLD_S MAC address or the MLD_R MAC address). For example, after establishing one or more TDLS links, the MLD_S may transmit directly, to the MLD_R, a data frame with the RA field set to the MLD_R MAC address and with the TA field set to the MLD_S MAC address. In aspects, the TDLS Discovery Response frame may also use the MLD MAC addresses. For example, the MLD_R may transmit directly, to the MLD_S, the TDLS Discovery Response frame with the RA field set to the MLD_S MAC address and with the TA field set to the MLD_R MAC address.

FIG. 7B is a diagram illustrating MLD_R initiating a TDLS setup with MLD_S and communicating via the TDLS link with MLD_S, in accordance with certain aspects of the present disclosure. As shown, the signaling exchange between the MLD_R and MLD_S follows a similar signaling flow as described herein with respect to FIG. 5A. In certain aspects, the RA, TA, SA, DA fields may be set to the respective MLD MAC addresses (e.g., the MLD_S MAC address or the MLD_R MAC address), for example, as described herein with respect to FIG. 7A.

Certain aspects of the present disclosure provide techniques for enabling the AP to map the addresses of a non-AP MLD when relaying messages between a legacy STA and a non-AP MLD. For example, when an AP of an AP MLD relays a frame initiated by any STA of a non-AP MLD to a legacy non-AP STA on a particular link, the AP may set the SA field to the MAC address of the non-AP STA, which is affiliated with the non-AP MLD, on that link, instead of the MAC address of the non-AP MLD. The MAC address of the STA affiliated with the non-AP MLD may enable the legacy STA to communicate with the non-AP MLD via a direct link. Advantages of certain aspects may be that the client-side (e.g., non-AP wireless stations) do not require any changes, such that the multi-link TDLS exchange is handled at the AP to facilitate mapping the correct MAC address (e.g., the MAC address of a STA affiliated with non-AP MLD) to a legacy STA.

Figure 8:
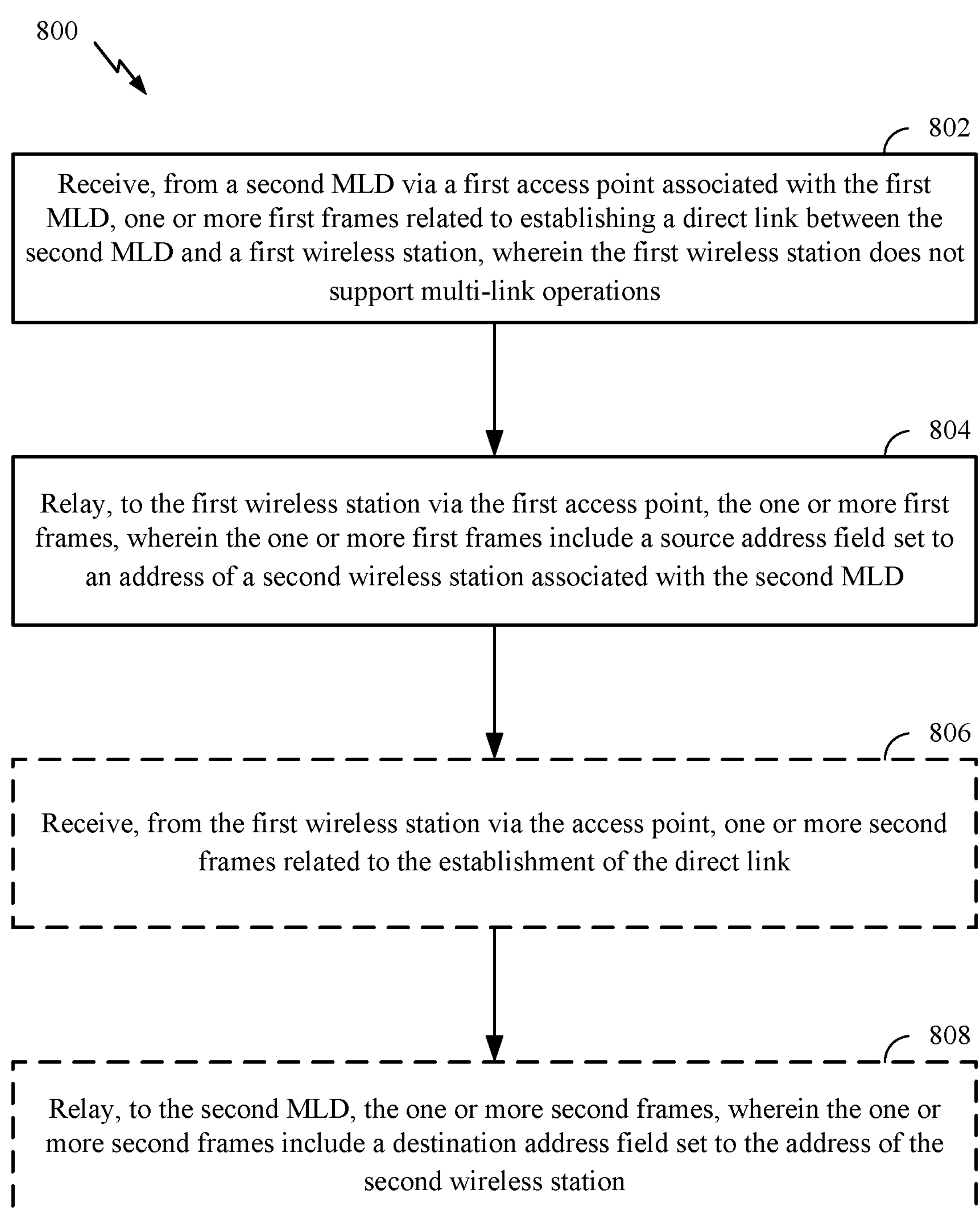
FIG. 8 is a flow diagram illustrating example operations for wireless communication by an MLD (e.g., an AP MLD), in accordance with certain aspects of the present disclosure.

FIG. 8 illustrates example operations 800 of wireless communications, in accordance with certain aspects of the present disclosure. The operations 800 may be performed, for example, by an MLD (e.g., the AP MLD 302). The operations 800 may be implemented as software components that are executed and run on one or more processors (e.g., controller 230 of FIG. 2). In certain aspects, the transmission and/or reception of signals by the MLD may be implemented via a bus interface of one or more processors (e.g., controller 230) that obtains and/or outputs signals. Further, the transmission and reception of signals by the MLD may be enabled, for example, by one or more antennas and/or transceivers (e.g., antenna(s) 224 or transceiver(s) 222 of FIG. 2).

The operations 800 may begin at 802, where a first MLD (e.g., the AP MLD 302 in FIG. 3 or MLD_A in FIGS. 5A and 5B) receives, from a second MLD (e.g., the non-AP MLD 304 in FIG. 3 or MLD_S in FIGS. 5A and 5B) via a first access point (e.g., the AP 306) associated with the first MLD, one or more first frames related to establishing a direct link between the second MLD and a first wireless station (e.g., STA3 in FIGS. 5A and 5B), where the first wireless station does not support multi-link operations. At 804, the first MLD may relay, to the first wireless station via the first access point, the one or more first frames, where the first frames include a source address (SA) field set to an address of a second wireless station associated with the second MLD. At 806, the first MLD may receive, from the first wireless station via the access point, one or more second frames related to the establishment of the direct link. At 808, the first MLD may relay, to the second MLD, the second frames, where the second frames include a destination address (DA) field set to the address of the second wireless station.

In aspects, frames related to establishing a direct link may include TDLS Discovery/Setup frames. For example, the first MLD may receive a TDLS Discovery Request frame and/or a TDLS Setup Request/Response frame as the first frames. The first MLD may receive a TDLS Discovery Request frame and/or a TDLS Setup Request/Response frame as the third frames. At 804 and 808, the first MLD may relay the first frames and/or the second frames to the first wireless station or the second MLD. In other words, the relayed frames may be copies or duplicates of the received frames with changes to the MAC header fields, such as the RA field and/or the SA field.

Figure 9A:
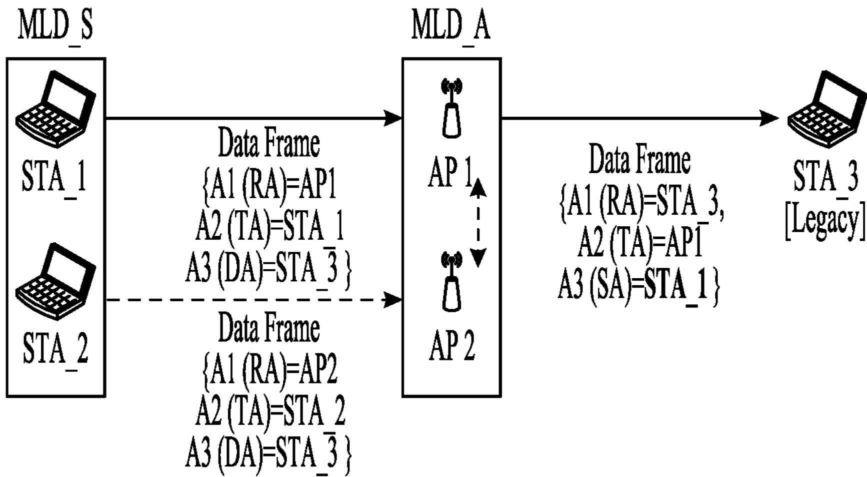
FIG. 9A is a diagram illustrating an AP MLD relaying direct link messages from a non-AP MLD to a legacy STA, in accordance with certain aspects of the present disclosure.
Figure 9B:
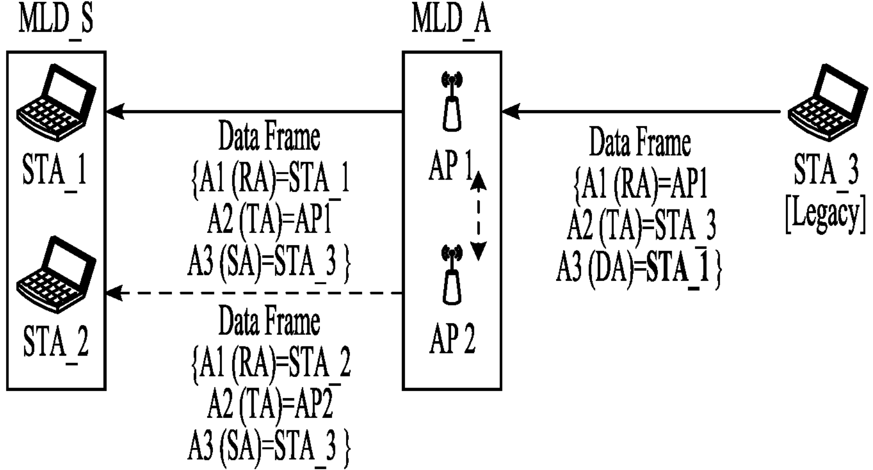
FIG. 9B is a diagram illustrating an AP MLD relaying direct link messages from a legacy STA to a non-AP MLD, in accordance with certain aspects of the present disclosure.

In aspects, the first MLD may map the address of the second MLD (e.g., the MLD MAC address of the second MLD) or addresses of the STA entities of the second MLD to the address of the second wireless station based on the first wireless station not supporting MLO, for example, as described herein with respect to FIGS. 9A and 9B. For example, the first frames may include a TA field set to the address of the second wireless station. As the first MLD may default to setting to the SA field to the MLD MAC address when relaying frames between wireless stations, the first MLD may identify that the second MLD supports MLO, while the first wireless station does not support MLO, and in such a case, the first MLD may relay the frames with the SA field set to the address of the second wireless station instead of the address of the second MLD based on the mapping between the address of the second MLD and the address of the second wireless station.

In certain aspects, the address of the second wireless station may be a MAC address of the second wireless station. The MAC address of the second wireless station may be a separate address from the address of the second MLD, such as the MLD MAC address of the second MLD, or the MAC address of the second wireless station may be the same as the MAC address of the second MLD.

FIG. 9A is a diagram illustrating an AP MLD (MLD_A) relaying TDLS messages from a non-AP MLD (MLD_S) to a legacy STA (STA_3), in accordance with certain aspects of the present disclosure. As shown, the MLD_A may receive frame(s) from the STA entities (e.g., STA_1 and/or STA_2) of the MLD_S, where the TA field is set to the respective MAC address of the STA entity. The MLD_A may relay these frames to the STA_3, where instead of using the MLD MAC address as the SA field, the MLD_A transmit the relayed frames with the SA field set to the STA_1 MAC address. With the SA field set to the STA_1 MAC address, the STA_3 may be able to directly communicate with the STA_1 without the MLD MAC address of the MLD_S.

FIG. 9B is a diagram illustrating an AP MLD (MLD_A) relaying TDLS messages from a legacy STA (STA_3) to a non-AP MLD (MLD_S), in accordance with certain aspects of the present disclosure. As shown, the MLD_A may receive frame(s) from the STA_3, where the DA field is set to MAC address of one of the STA entities of the MLD_S. The MLD_A may relay these frames to the STA_1 or STA_2 with the RA field set to the MAC address of the STA_1 or STA_2.

In certain cases, a non-AP MLD may not support simultaneous transmit and receive (STR) via two or more of the STA entities. Such a STA of an MLD may be referred to as a non-STR (n-STR) STA or link. That is, the non-AP MLD may not be able to simultaneously transmit and receive on two or more links in separate bands (e.g., 5 and 6 GHz bands). For example, the non-AP MLD 304 may not support simultaneous transmission via the STA 310 while the STA 312 is receiving data from the AP MLD 302, or vice versa (e.g., the STA 310 cannot receive while the STA 312 transmits). The non-AP MLD may be able to transmit simultaneously (Tx/Tx) via the STA entities or receive simultaneously (Rx/Rx) via the STA entities on separate bands (e.g., 5 and 6 GHz bands). In cases where the non-AP MLD has established a TDLS on one of the n-STR links, the non-AP MLD may encounter interference when an STR state arises on an n-STR link. For example, the non-AP MLD may encounter undesirable interference when an AP of an AP MLD transmits downlink data to the non-AP MLD on a link, which is n-STR to a TDLS link of the non-AP MLD, when the TDLS link is busy.

Aspects of the present disclosure provide various techniques to prevent or mitigate an STR state between n-STR links of an MLD. In aspects, the various techniques to prevent or mitigate an STR state between n-STR links of an MLD may be specific to one or more links between one or more STA entities and one or more AP entities in a multi-link context (i.e., MLO/MLA). The non-AP MLD may indicate to temporarily stop communications between a STA entity and an AP entity on a link that is n-STR with the TDLS link. In certain aspects, a transmission on a TDLS link may be considered a factor in causing deafness on other links of the non-AP MLD. Various deaf recovery rules may apply to reception of a frame from a peer TDLS STA. In certain cases, DL transmissions may be allowed on the TDLS link and any other link(s) of the non-AP MLD with which the TDLS link is STR. The various techniques to prevent or mitigate an STR state may enable communications at an MLD with desirable latencies and data throughputs due to desirable signal qualities achieved while preventing or mitigating an STR state.

In certain aspects, the AP and non-AP MLD may exchange Request-to-Send (RTS) and Clear-to-Send (CTS) frames before any DL transmission on the link(s), which are n-STR with the TDLS link, to prevent or mitigate an STR state. For example, an AP MLD may have two or more APs operating on separate channels/bands (e.g., in the 5 GHz band and 6 GHz band). The STAs (e.g., STA1 and STA2) of a non-AP MLD may form a link with each of the APs affiliated with the AP MLD. When STA1 of the non-AP MLD forms a TDLS connection on a first link with another wireless station, the non-AP MLD may send a request to the AP MLD that when AP MLD transmits a frame to STA2 affiliated with the non-AP MLD on a second link, the AP is to send an RTS on the second link and send the DL frame only if the AP MLD receives a CTS response from the non-AP MLD.

Figure 10A:
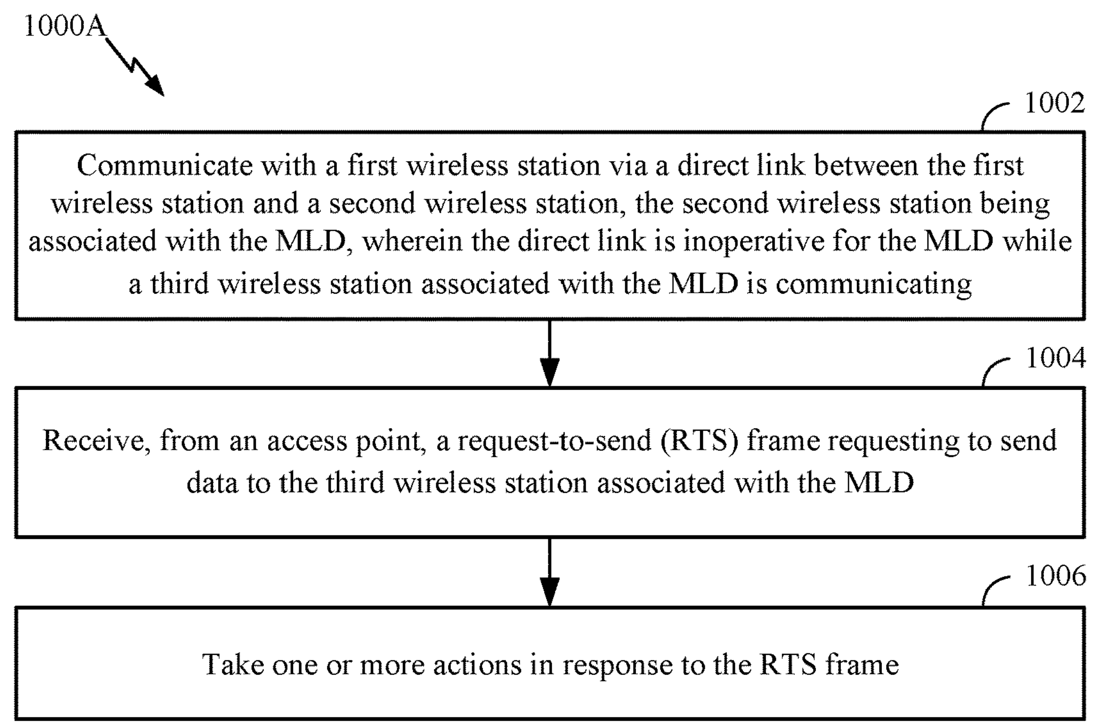
FIGS. 10A and 10B are flow diagrams illustrating example operations for wireless communication by an MLD (e.g., a non-AP MLD), in accordance with certain aspects of the present disclosure.

FIG. 10A illustrates example operations 1000A of wireless communications, in accordance with certain aspects of the present disclosure. The operations 1000A may be performed, for example, by an MLD (e.g., the non-AP MLD 304).

The operations 1000A may begin at 1002, where the MLD may communicate with a first wireless station (e.g., STA 120*g* in FIG. 1, STA_3 in FIGS. 5A and 5B, or MLD_R in FIGS. 7A and 7B) via a direct link between the first wireless station and a second wireless station (e.g., the STA 310), the second wireless station being associated with the MLD, where the direct link is inoperative for the MLD while a third wireless station (e.g., the STA 312) associated with the MLD is communicating, or another link associated with the third wireless station is inoperative, while the second wireless station is communicating over the direct link. The inoperative state of the direct link or the other link may refer to the n-STR capabilities of the MLD. At 1004, the MLD may receive, from an access point (e.g., the AP 110 or MLD_A in FIG. 5A, 5B, 7A or 7B), an RTS frame requesting to send data to the third wireless station. At 1006, the MLD may take one or more actions in response to the RTS frame.

In aspects, the second wireless station may communicate on a separate band (e.g., 5 GHz band) from the band (e.g., 6 GHz band) on which the third wireless station communicates. In aspects, an inoperative direct link may refer to when there are no communications between the TDLS peers on the direct link or when the direct link is no longer setup between the TDLS peers (e.g., a TDLS teardown process has completed).

At 1006, the MLD may either respond to the RTS frame from the access point or not respond to the RTS frame. For example, taking one or more actions at 1006 may include the MLD transmitting, to the access point, a CTS frame indicating the access point is free to transmit data to the MLD. The MLD may receive, from the access point, data via the third wireless station based on the transmission of the CTS frame. In certain cases, the MLD may ignore the RTS frame if the second wireless station is communicating with the first wireless station.

In certain aspects, the RTS/CTS exchange may be specific to one or more links between one or more STA entities and one or more AP entities in a multi-link context. For example, the RTS/CTS exchange may be performed for a link that is n-STR with the TDLS link. With respect to the operations 1000A, the third wireless station may be n-STR with the second wireless station.

In aspects, the MLD may transmit, to the access point, indications to enable or disable the RTS/CTS exchange for n-STR links. As an example, the indication to enable or disable the RTS/CTS exchange for n-STR links may be indicated via a state associated with the MLD and/or a wireless station at the MLD. In certain cases, the state may include that the MLD has a constraint on the wireless station (e.g., n-STR link(s)), that the wireless station is temporarily unavailable for receiving frames, or that the MLD has setup a direct link with another wireless station. For example, the MLD may transmit, to the access point, a first indication to enable transmission of the RTS frame before a transmission from the access point to the MLD. The MLD may transmit, to the access point, a second indication to disable transmission of the RTS frame before a transmission from the access point to the MLD, for example, when the TDLS session is inactive. In aspects, the second indication may be an update to the state associated with the wireless station. For example, the updated state may include that the wireless station can receive frames or that the direct link has been disabled or torn down. The first or second indication may be transmitted via a control field of a MAC frame, such as an aggregate control field (A-Control), for example, defined in 802.11ax standards. The control field may be a separate control field (e.g., RTS-Required or RTS-Enablement) dedicated to enabling or disabling RTS/CTS exchange between the AP and an MLD. One or more A-Control fields may be carried in the (High Efficiency) (HE) Control variant of High Throughput (HT) Control field in the MAC header. In certain aspects, the MAC frame, which carries the first or second indication, may include a public action frame. The first or second indication may be transmitted via a control field of a MAC header of a frame, a management frame, or a control frame.

Figure 10B:
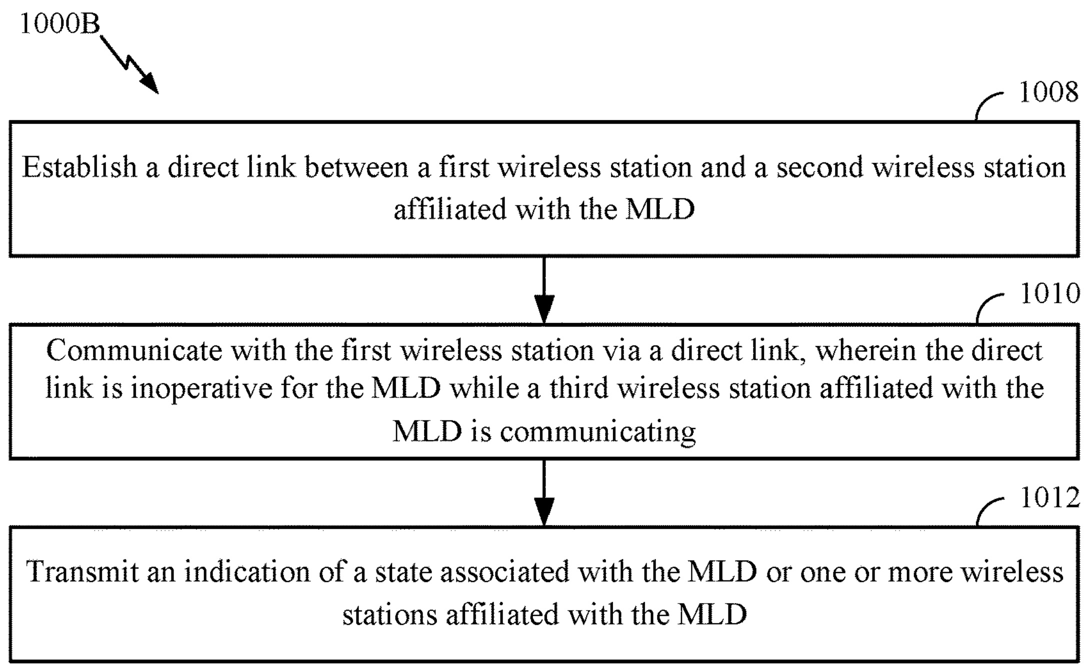

FIG. 10B illustrates example operations 1000B of wireless communications, in accordance with certain aspects of the present disclosure. The operations 1000B may be performed, for example, by an MLD (e.g., the non-AP MLD 304).

The operations 1000B may begin at 1008, where the MLD establishes a direct link between a first wireless station and a second wireless station affiliated with the MLD, for example, as described herein with respect to FIG. 4. At 1010, the MLD may communicate with the first wireless station (which may be affiliated with another MLD) via the direct link, wherein the direct link is inoperative for the MLD while a third wireless station affiliated with the MLD is communicating. At 1012, the MLD may transmit, to an AP MLD (or an access point affiliated with the AP MLD) with which the MLD has performed an association, an indication of a state associated with the MLD or one or more wireless stations affiliated with the MLD, for example, as described herein with respect to the operations 1000A. In certain aspects, the operations 1000B may continue where the MLD may receive, from the access point affiliated with the AP MLD, a first frame (e.g., a RTS frame) requesting to send data to the third wireless station affiliated with the MLD in response to the indication of the state and take one or more actions in response to the first frame, for example, as described herein with respect to the operations 1000A.

The MLD may receive the first frame via the third wireless station on a channel in which the access point affiliated with the AP MLD is communicating with the third wireless station. The MLD may transmit, to the access point affiliated with the AP MLD, a second frame (e.g., a CTS frame) indicating the access point affiliated with an AP MLD is free to transmit data to the MLD. The MLD may receive, from the access point affiliated with an AP MLD, data via the third wireless station based on the transmission of the second frame. The MLD may transmit, to the access point or the AP MLD, an update to the state indicating to disable transmission of the first frame before a transmission from the AP MLD to the third wireless station affiliated with the MLD.

Figure 11:
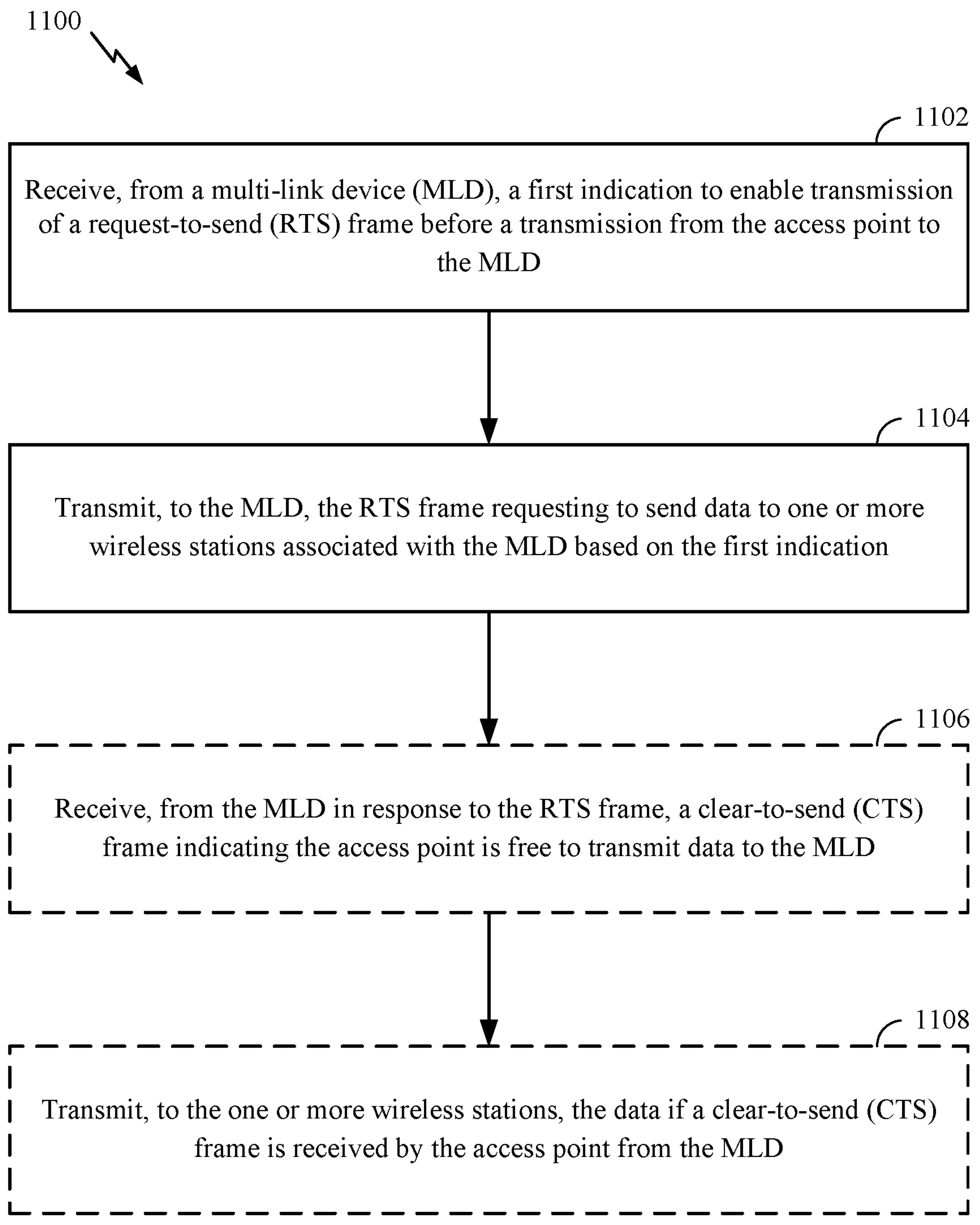
FIG. 11 is a flow diagram illustrating example operations for wireless communication by an MLD (e.g., an AP MLD), in accordance with certain aspects of the present disclosure.

FIG. 11 illustrates example operations 1100 of wireless communications, in accordance with certain aspects of the present disclosure. The operations 1100 may be performed, for example, by an access point (e.g., the AP 110 in FIG. 1, the AP 306 affiliated with the AP MLD 302, or the AP MLD 302 in FIG. 3). The operations 1100 may be complimentary to the operations 1000A and/or 1000B performed by the non-AP MLD.

The operations 1100 may begin, at 1102, where the access point may receive, from an MLD (e.g., the non-AP MLD 304), a first indication to enable transmission of an RTS frame before a transmission from the access point to the MLD. For example, the first indication may include a state associated with the MLD and/or a wireless station at the MLD, such as a state indicating that the MLD has setup a direct link with another wireless station. At 1104, the access point may transmit, to the MLD, the RTS frame requesting to send data to one or more wireless stations (e.g., the STAs 310, 312) associated with the MLD based on the first indication. At 1106, the access point may receive, from the MLD in response to the RTS frame, a CTS frame indicating the access point is free to transmit data to the MLD. At 1108, the access point may transmit, to the one or more wireless stations, the data if the CTS frame is received by the access point from the MLD.

In aspects, the access point may receive, from the MLD, a second indication to disable transmission of the RTS frame before a transmission from the access point to the MLD. For example, the second indication may include an update to the state associated with the wireless station, such as that the direct link at the MLD has been disabled or torn down. The first or second indication may be transmitted via a control field of a MAC frame, for example, as described herein with respect to the operations 1000.

Figure 12:
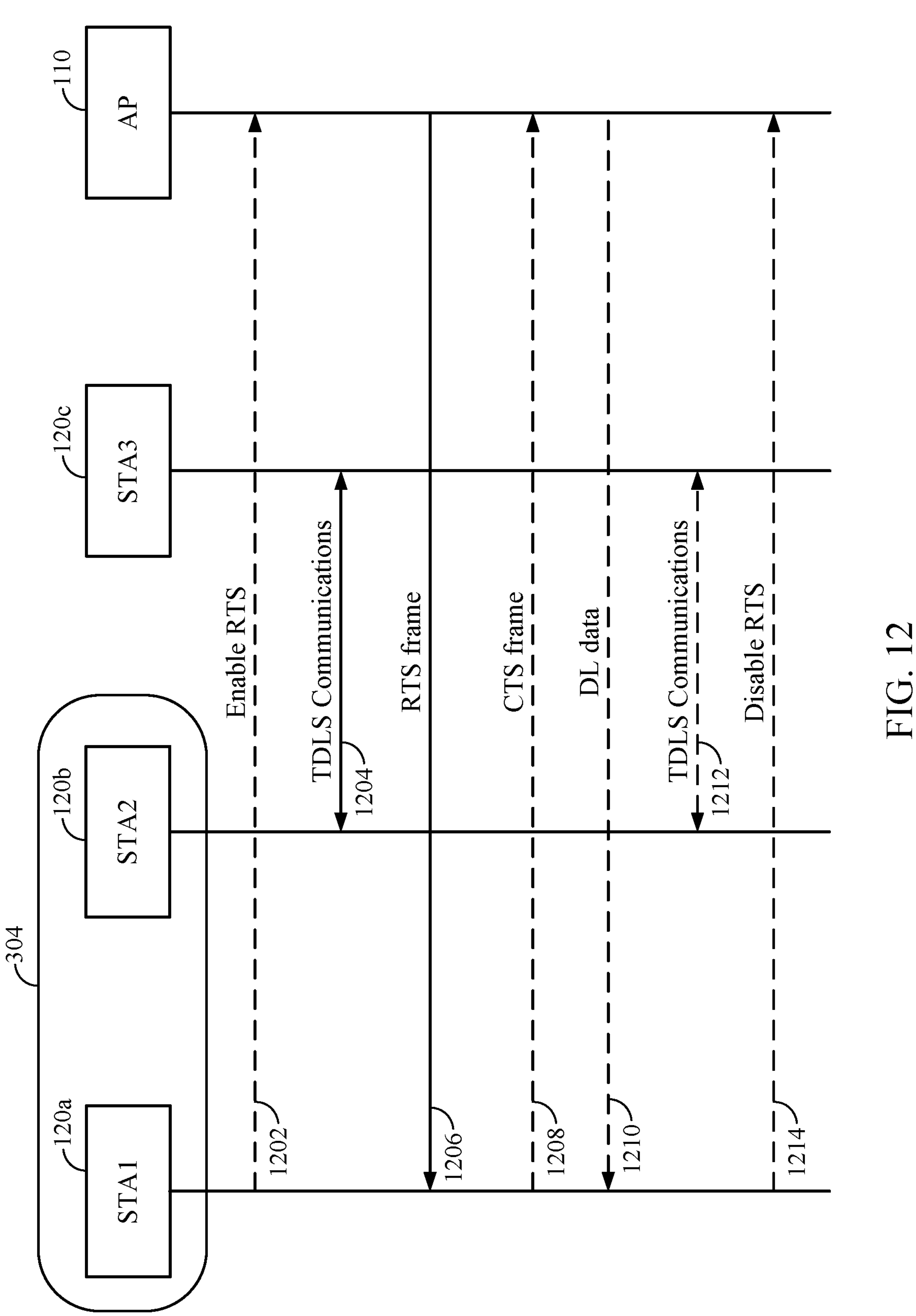
FIG. 12 is a signaling flow diagram illustrating example signaling of Ready-To-Send/Clear-To-Send frames, in accordance with aspects of the present disclosure.

FIG. 12 is a signaling flow diagram illustrating example signaling of RTS/CTS frames to prevent or mitigate an STR state, in accordance with aspects of the present disclosure. As shown, at 1202, a first wireless station 120*a* affiliated with a non-AP MLD 304 may transmit, to an access point 110, a first indication to enable transmission of an RTS frame before a transmission from the access point 110 to the first wireless station 120*a*. At 1204, a second wireless station 120*b* affiliated with the non-AP MLD 304 may communicate with a third wireless station 120*c* (which may be affiliated with a non-AP MLD or be a legacy STA) via a direct link, such as a TDLS link. At 1206, the first wireless station 120*a* may receive an RTS frame from the access point 110. At 1208, the first wireless station 120*a* may transmit a CTS frame to the access point 110, if the direct link is inactive or inoperative. At 1210, the first wireless station 120*a* may receive DL data from the access point 110 based on the CTS frame. In certain aspects, the direct link may be busy, and the non-AP MLD 304 may ignore the RTS frame, and the second wireless station 120*b* may communicate with the third wireless station 120*c* via the direct link at 1212. At 1214, the first wireless station 120*a* may transmit, to the access point 110, a second indication to disable transmission of the RTS frame before a transmission from the access point 110 to the first wireless station 120*a*.

In certain aspects, the non-AP MLD may indicate to the AP MLD that the non-AP MLD has entered a power save (PS) mode on n-STR links when a TDLS session is active to prevent or mitigate an STR state.

Figure 13A:
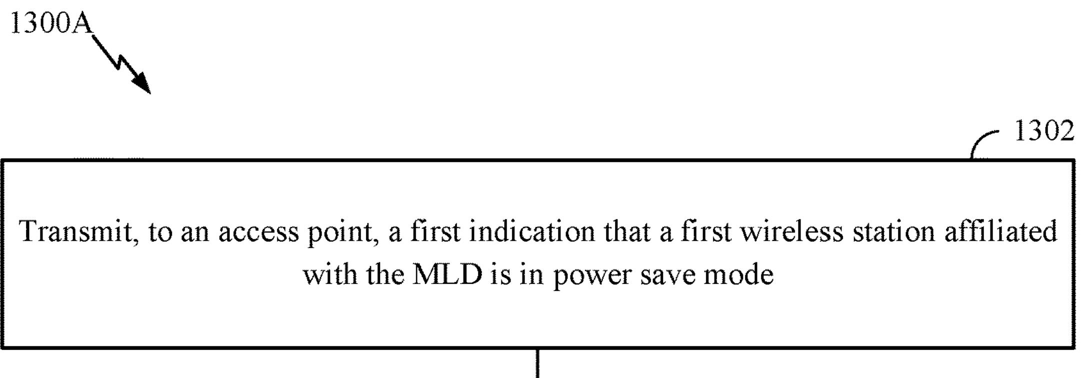
FIGS. 13A and 13B are flow diagrams illustrating example operations for wireless communication by an MLD (e.g., a non-AP MLD), in accordance with certain aspects of the present disclosure.

FIG. 13A illustrates example operations 1300A of wireless communications, in accordance with certain aspects of the present disclosure. The operations 1300A may be performed, for example, by an MLD (e.g., the non-AP MLD 304).

The operations 1300A may begin, at 1302, where the MLD may transmit, to an access point (e.g., the AP 110 or MLD_A in FIG. 5A, 5B, 7A, or 7B), a first indication that a first wireless station (e.g., the STA 310) affiliated with the MLD is in power save mode. At 1304, the MLD may communicate, after transmission of the first indication, with a second wireless station (e.g., STA 120*g* in FIG. 1, STA_3 in FIGS. 5A and 5B, or MLD_R in FIGS. 7A and 7B) via a direct link between the second wireless station and a third wireless station (e.g., the STA 312), the third wireless station being affiliated with the MLD, where the direct link is inoperative for the MLD while the first wireless station is communicating, or the first wireless station is inoperative while the direct link is operative.

In aspects, the MLD may re-enable communications with the access point. For example, the MLD may transmit, to the access point, a second indication that the first wireless station is in an active mode (e.g., out of power save mode and able to communicate) after ending the communication with the second wireless station, and in certain cases, the MLD may communicate, with the access point, via the first wireless station after the transmission of the second indication.

In certain aspects, the power save mode may be specific to one or more links between one or more STA entities and one or more AP entities in a multi-link context. For example, at 1302, the power save mode indication may be associated with a link that is n-STR with the TDLS link. With respect to the operations 1300A, the first wireless station may be n-STR with the third wireless station.

The communication with the second wireless station via the third wireless station may occur when the first wireless station is not communicating. The communication with the access point via the first wireless station may occur when the third wireless station is not communicating.

Figure 13B:
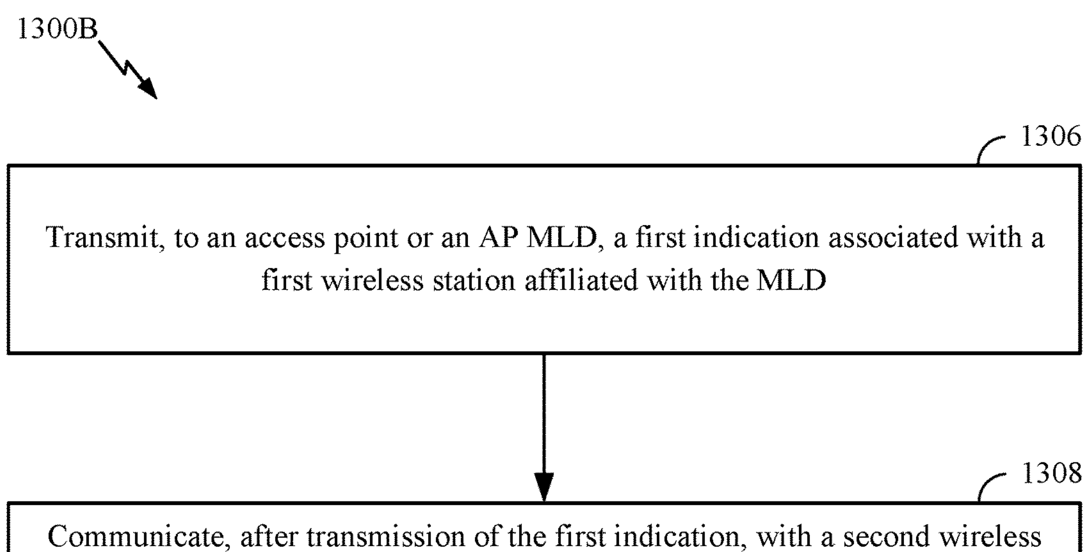

FIG. 13B illustrates example operations 1300B of wireless communications, in accordance with certain aspects of the present disclosure. The operations 1300B may be performed, for example, by an MLD (e.g., the non-AP MLD 304).

The operations 1300B may begin at 1306, where the MLD may transmit, to an access point or an AP MLD, a first indication associated with a first wireless station affiliated with the MLD. At 1308, the MLD may communicate, after transmission of the first indication, with a second wireless station via a direct link between the second wireless station and a third wireless station, the third wireless station being affiliated with the MLD, wherein the direct link is inoperative for the MLD while the first wireless station is communicating.

The first indication may include at least one of an indication that the first wireless station is in power save mode, for example, as described herein with respect to the operations 1300A; an indication to disable a first link to the first wireless station, for example, as further described herein with respect to the operations 1500; or an indication to remove a second link in a dynamic link set to the first wireless station, for example, as further described herein with respect to the operations 1600. In cases where the first indication indicates the first wireless station is in power save mode, the MLD may transmit, to the access point or the AP MLD, a second indication that the first wireless station is in active mode after ending the communication with the second wireless station, for example, as described herein with respect to the operations 1300A. The first indication may be transmitted via a control field of a MAC header of a frame, a management frame, or a control frame, for example, as described herein with respect to the operations 1000A.

Figure 14:
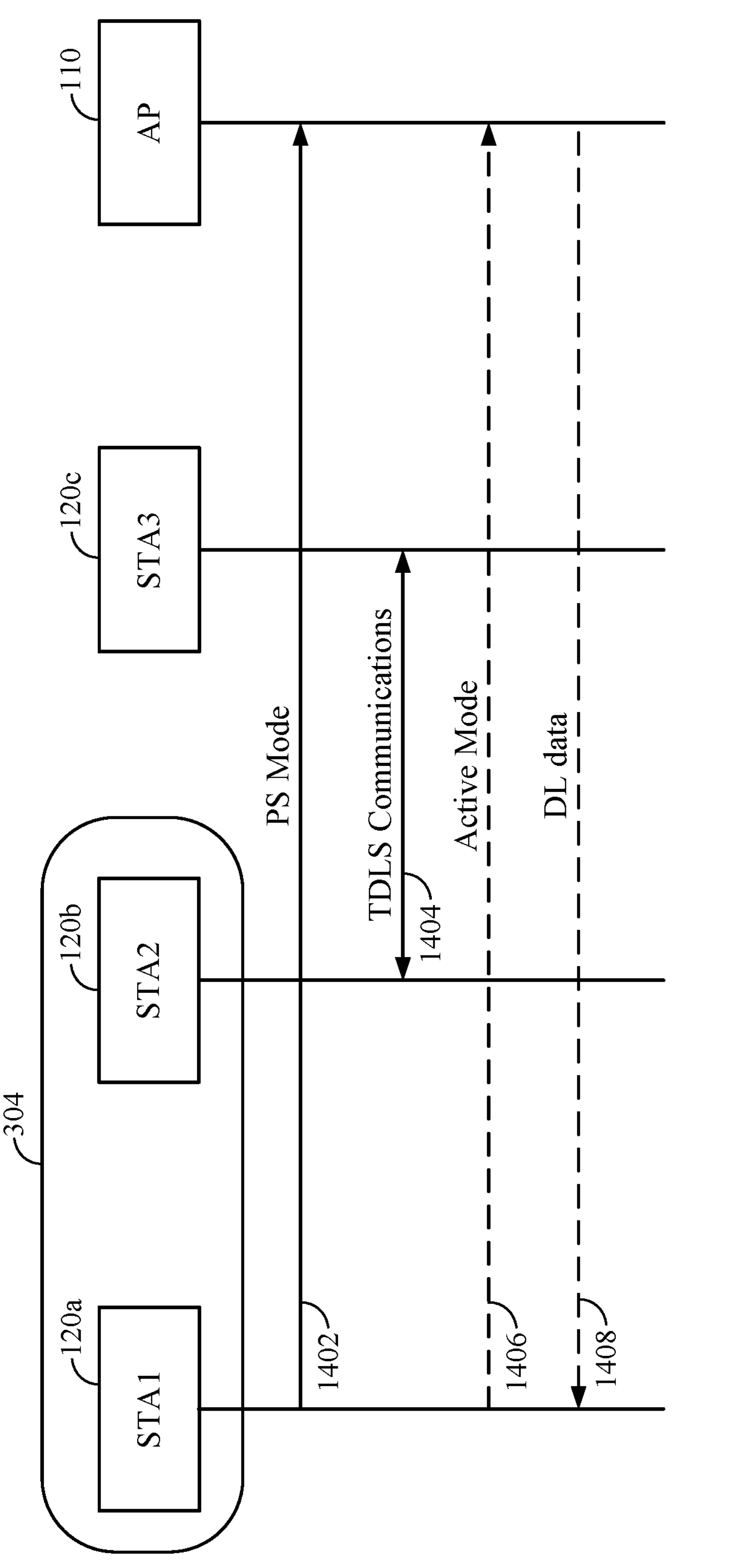
FIG. 14 is a signaling flow diagram illustrating example signaling of power save mode, in accordance with aspects of the present disclosure.

FIG. 14 is a signaling flow diagram illustrating example signaling of power save mode to prevent or mitigate an STR state, in accordance with aspects of the present disclosure. As shown, at 1402, the first wireless station *120a* may transmit, to the access point 110, a first indication that the first wireless station *120a* is in power save mode. At 1404, the second wireless station *120b* may communicate with the third wireless station *120c* (which may be affiliated with a non-AP MLD or be a legacy STA) via a direct link. At 1406, the first wireless station *120a* may transmit, to the access point 110, a second indication that the first wireless station is in an active mode after ending the communication between the second wireless station *120b* and the third wireless station *120c*. At 1408, the first wireless station *120a* may receive DL data from the access point 110 after transmission of the second indication.

In certain aspects, the non-AP MLD may disable DL aggregation (sync-PPDU operation) on n-STR link(s) when TDLS is established on one of the n-STR links to prevent or mitigate an STR state.

Figure 15:
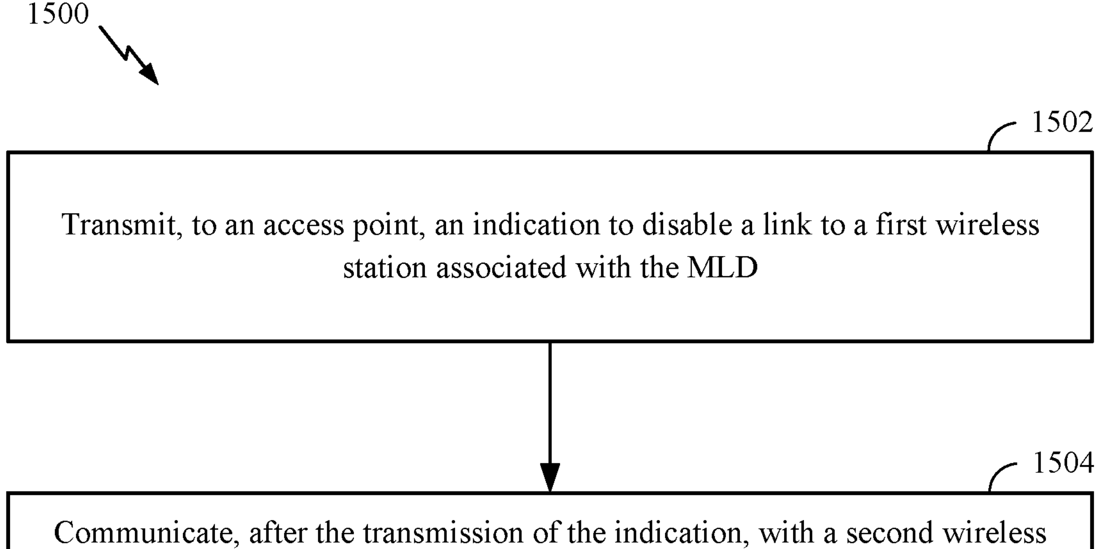
FIG. 15 is a flow diagram illustrating example operations for wireless communication by an MLD (e.g., a non-AP MLD), in accordance with certain aspects of the present disclosure.

FIG. 15 illustrates example operations 1500 of wireless communications, in accordance with certain aspects of the present disclosure. The operations 1500 may be performed, for example, by an MLD (e.g., the non-AP MLD 304).

The operations 1500 may begin at 1502, where the MLD may transmit, to an access point (e.g., the AP 110 or MLD_A in FIG. 5A, 5B, 7A or 7B), an indication to disable a link to a first wireless station (e.g., the STA 310) associated with the MLD. At 1504, the MLD may communicate, after the transmission of the indication, with a second wireless station (e.g., STA *120g* in FIG. 1, STA_3 in FIGS. 5A and 5B, or MLD_R in FIGS. 7A and 7B) via a direct link between the second wireless station and a third wireless station (e.g., the STA 312), the third wireless station being associated with the MLD, where the direct link is inoperative for the MLD while the first wireless station is communicating, or the first wireless station is inoperative while the direct link is operative. The communication with the second wireless station via the third wireless station may occur when the first wireless station is not communicating.

In aspects, the indication may be transmitted via a control field of a MAC frame, for example, as described herein with respect to the operations 1000A. The control field may be a separate control field dedicated to enabling or disabling a link in a multi-link context between the AP and an MLD.

In certain aspects, the non-AP MLD may remove the link(s) in a dynamic link set that are n-STR with the TDLS link to prevent or mitigate an STR state.

Figure 16:
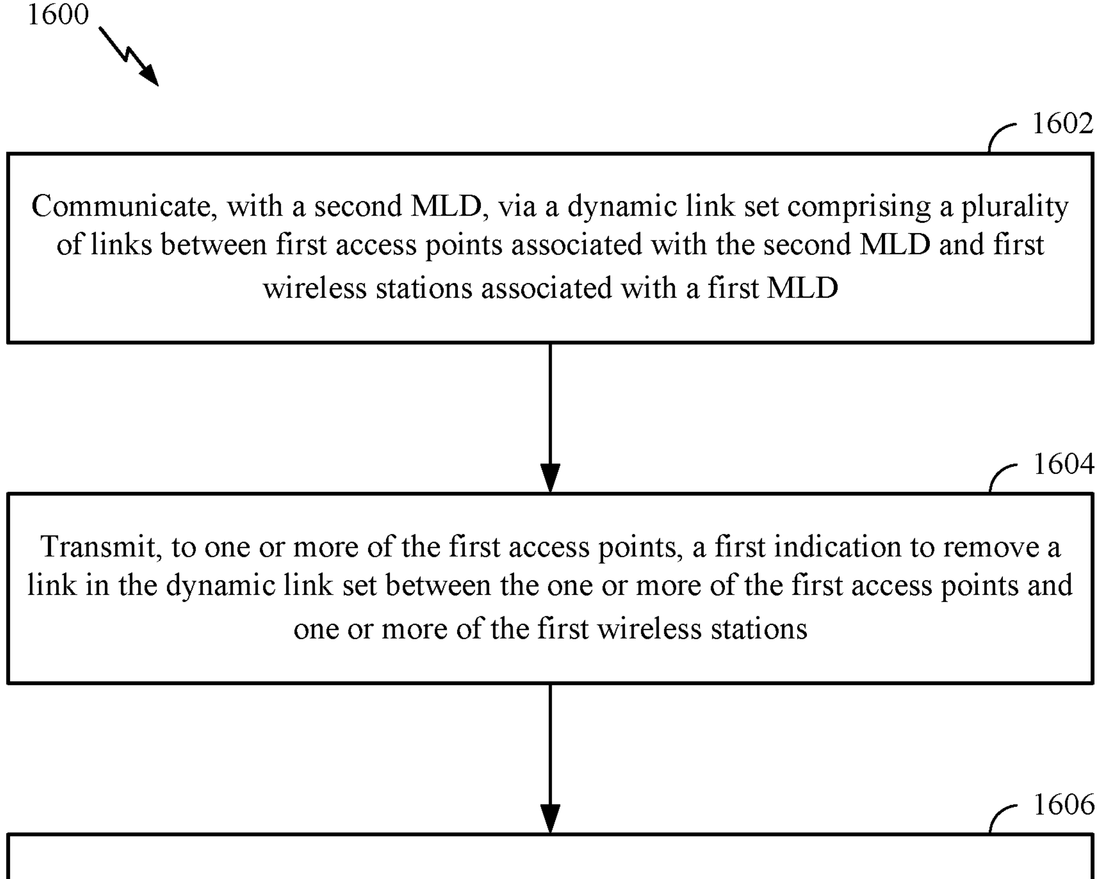
FIG. 16 is a flow diagram illustrating example operations for wireless communication by an MLD (e.g., a non-AP MLD), in accordance with certain aspects of the present disclosure.

FIG. 16 illustrates example operations 1600 of wireless communications, in accordance with certain aspects of the present disclosure. The operations 1600 may be performed, for example, by an MLD (e.g., the non-AP MLD 304).

The operations 1600 may begin at 1602, where a first MLD (e.g., the non-AP MLD 304) may communicate, with a second MLD (e.g., the AP MLD 302), via a dynamic link set comprising a plurality of links between first access points (e.g., the AP 306, 308) associated with the second MLD and first wireless stations (e.g., the STA 310, 312) associated with the first MLD. At 1604, the first MLD may transmit, to one or more of the first access points, a first indication to remove a link in the dynamic link set between the one or more of the first access points and one or more of the first wireless stations. At 1606, the first MLD may communicate, after the transmission of the first indication, with a second wireless station via a direct link between the second wireless station and a third wireless station associated with the first MLD, where the direct link is inoperative for the first MLD while the one or more of the first wireless stations are communicating.

In aspects, the first MLD may re-enable the links dropped from the dynamic link set with the access point when the direct link becomes inoperative. For example, the first MLD may transmit, to the one or more of the first access points, a second indication to add the link between the one or more of the first wireless stations and the one or more of the second wireless stations, when the direct link is inoperative. The first MLD may communicate, with the one or more of the first access points, via the one or more of the first wireless stations after the transmission of the second indication.

In certain aspects, the first MLD may communicate with the second MLD via the updated dynamic link set while the direct link is operative. For example, the first MLD may communicate, with a second access point associated with the second MLD, via a fourth wireless station associated with the first MLD on another link in the dynamic link set while communicating with the second wireless station via the third wireless station. The first access points may include the second access point, and the first wireless stations may include the fourth wireless station.

The communication with the second wireless station via the third wireless station may occur when the first wireless station is not communicating. The communication with the one or more of the first access points via the one or more of the first wireless stations occurs may occur the third wireless station is not communicating.

Figure 17:
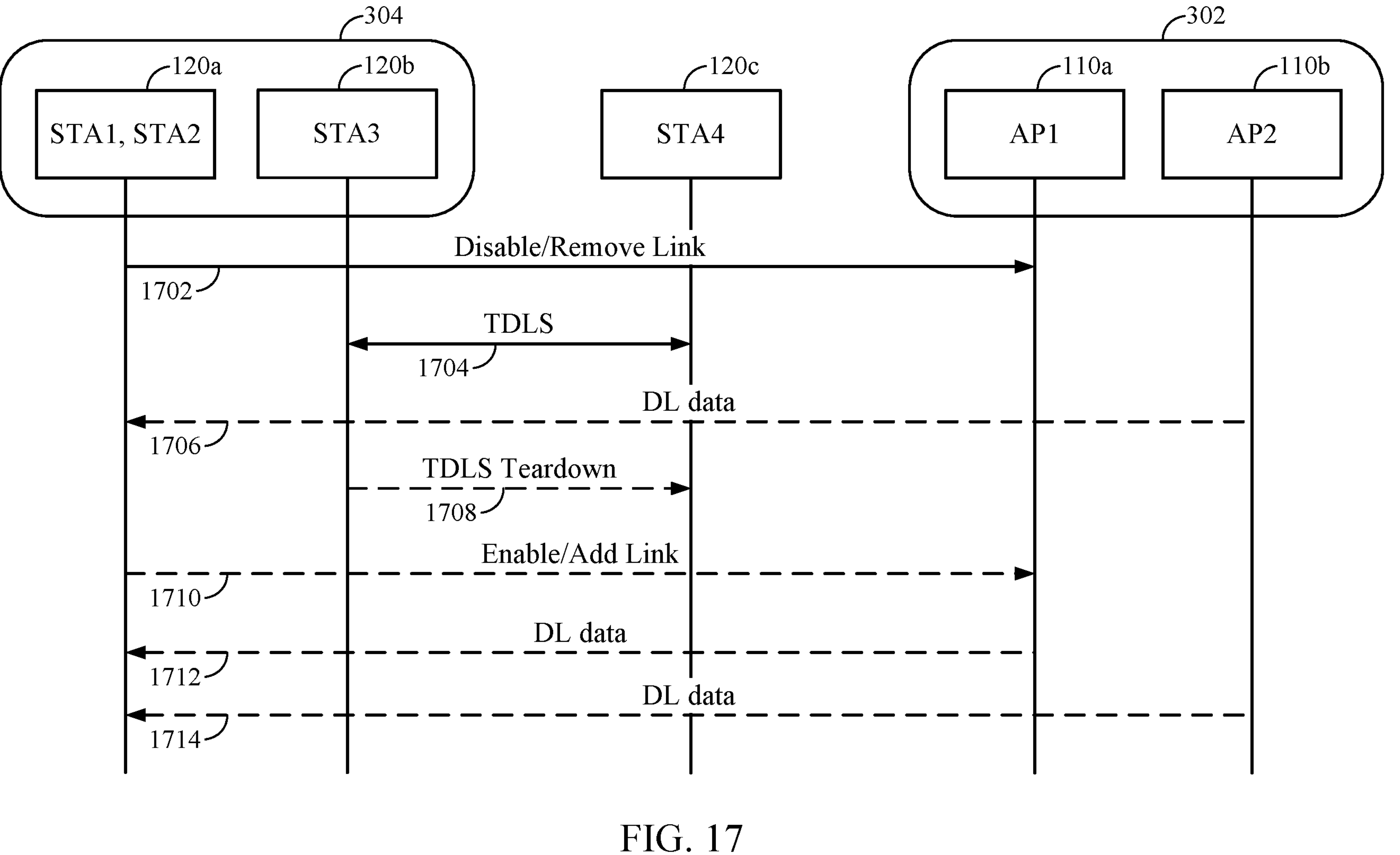
FIG. 17 is a signaling flow diagram illustrating example signaling of disabling/removing a link, in accordance with aspects of the present disclosure.

FIG. 17 is a signaling flow diagram illustrating example signaling of disabling/removing a link to prevent an STR state, in accordance with aspects of the present disclosure. In aspects, a dynamic link set may be formed between the first wireless stations 120*a* (e.g., STA1, STA2) and the first and second access points 110*a*, 110*b* affiliated with the AP MLD 302. STA1 of the first wireless stations 120*a* may be n-STR with the second wireless station 120*b*, and STA2 of the first wireless stations 120*a* may be STR with the second wireless station 120*b*.

At 1702, STA1 of the first wireless stations 120*a* in the dynamic link set may transmit a first indication to disable or remove a link between STA1 of the first wireless stations 120*a* and the first access point 110*a*. At 1704, the second wireless station 120*b* may communicate with the third wireless station 120*c* via a direct link. In certain cases, at 1706, STA2 of the first wireless stations 120*a* may receive DL data from a second access point 110*b* affiliated with the AP MLD 302 in the dynamic link set while the TDLS link is operative. In certain cases, at 1708, the second wireless station 120*b* may transmit a TDLS teardown frame to the third wireless station 120*c* to make the direct link inoperative. At 1710, STA1 of the first wireless stations 120*a* (in the dynamic link set) may transmit a first indication to enable or add the link between STA1 of the first wireless stations 120*a* and the first access point 110*a* after the direct link becomes inoperative. At 1712, STA1 of the first wireless stations 120*a* may receive DL data from the first access point 110*a*, and at 1714, STA2 of the first wireless stations 120*a* may receive DL data from the second access point 110*b*.

In certain cases, during the TDLS discovery and setup process, when an intermediate AP is affiliated with an AP MLD, the Discovery Request frame (relayed via the AP MLD) may be received on the wrong link by the recipient non-AP MLD. For example, suppose a wireless station (e.g., a legacy STA or a STA affiliated with an MLD) transmits a Discovery Request frame on the 5 GHz band, and the AP MLD relays the Discovery Request frame to a non-AP MLD on the 2.4 GHz band or 6 GHz band. Such a scenario may be referred to a cross-over of a request/response at the AP MLD. Similar to the cross-over scenario, an initiator/responder non-AP MLD may transmit a TDLS request/response on a different link than a desired link for direct link communications. Such a scenario may be referred to a link mismatch scenario. It may be unclear to the non-AP MLD which band is intended for the TDLS link between the wireless station and the non-AP MLD, resulting in a failure to setup a TDLS link between the initiator STA and the non-AP MLD.

Certain aspects of the present disclosure provide techniques for identifying/selecting one or more links between TDLS peer STAs during the TDLS discovery and setup process. An initiating MLD may include the multi-link IE in a discovery request frame to indicate that the MLD supports TDLS over multiple links and identify specific link(s) for the TDLS session. In aspects, the multi-link IE in the discovery request frame or lack thereof may indicate if the initiator is an MLD or a legacy STA. That is, the absence of the multi-link IE in the discovery request frame may indicate that the initiator STA is a legacy STA. If the recipient is a legacy STA, the legacy STA may ignore the multi-link IE, and the legacy STA may send a Discovery Response frame directly to the initiator on the same link on which the STA received the Request.

If the TDLS initiator is a legacy STA, the legacy STA may identify a link for direct link communications in the discovery request frame. For example, the BSSID field in the Link Identifier IE may identify the link, or the link identifier IE may include a separate field that identifies the link for direct link communications. An MLD STA may send a Discovery Response frame directly to the initiator STA on the requested link.

The techniques described herein for identifying/selecting TDLS links may enable TDLS communications between MLDs and/or between an MLD and a legacy STA, for example, in cases where the response/request is crossed over at an AP MLD to a non-AP MLD, or where the response/request is transmitted on a different link by the initiator/responder peer STA than the requested/desired link.

Figure 18:
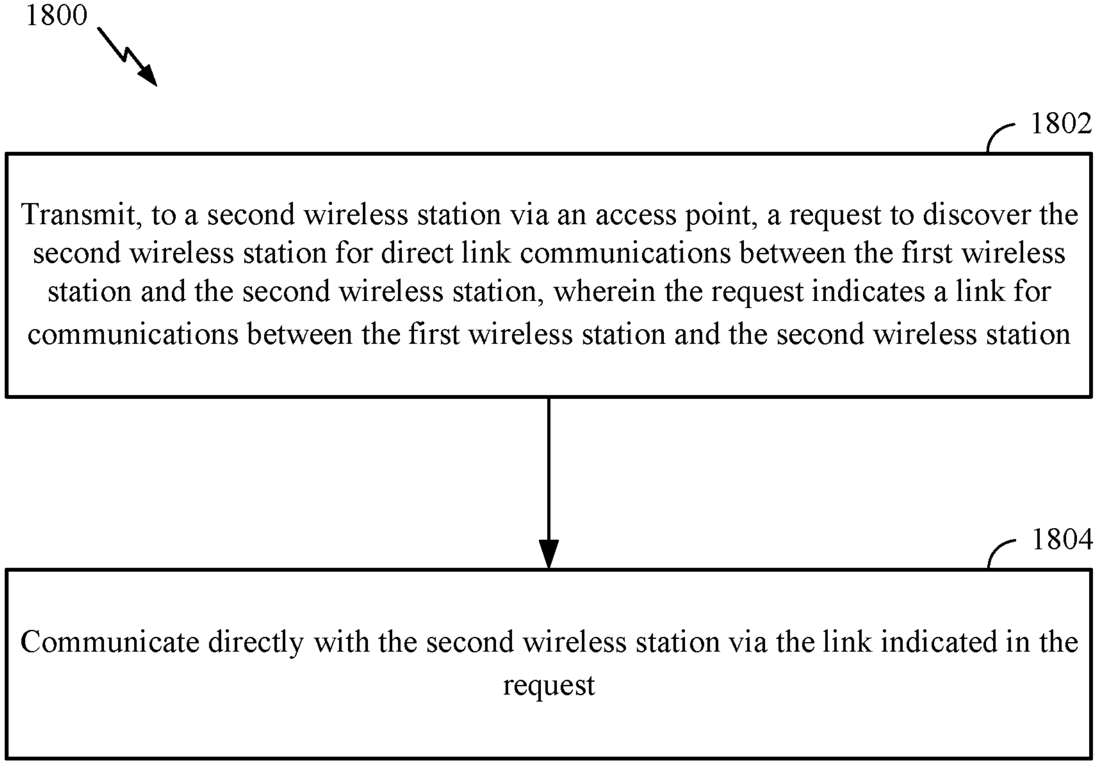
FIG. 18 is a flow diagram illustrating example operations for wireless communication by a wireless station, in accordance with certain aspects of the present disclosure.

FIG. 18 illustrates example operations 1800 of wireless communications, in accordance with certain aspects of the present disclosure. The operations 1800 may be performed, for example, by a wireless station (e.g., the STA 120*a* or the non-AP MLD 304).

The operations 1800 may begin at 1802, where a first wireless station (e.g., the STA_3 in FIG. 5B) may transmit, to a second wireless station (e.g., the STA_1 of MLD_S in FIG. 5B) via an access point (e.g., the MLD_A in FIG. 5B), a request to discover a peer wireless station (such as the second wireless station) for direct link communications between the first wireless station and the second wireless station, wherein the request indicates a link for communications between the first wireless station and the second wireless station. At 1804, the first wireless station may communicate directly with the second wireless station via the link indicated in the request.

In certain aspects, the second wireless station may respond to the request via the link indicated in the request. For example, the first wireless station may receive, from the second wireless station, a response responsive to the request via the link indicated in the request. The response may include a TDLS Discovery Request frame.

In aspects, the request may include a TDLS Discovery Request frame. The request may indicate the link via a link identifier associated with the link. That is, a specific value, which may represent the link as the link identifier, may be associated with the link, and the request may include the link identifier. In aspects, the request may include the link identifier IE (for example, as depicted in FIG. 6), which may include a field that indicates the link. The BSSID field may include (or be set to) a value indicating the link, where the value may be different from one of the BSSIDs in the wireless network or the same as one of the BSSIDs in the wireless network. For example, BSSID field may be set to the BSSID of the corresponding affiliated AP of the AP MLD that is operating on the link where the TDLS direct link was established. In aspects, the link identifier IE may include a separate field (separate from the fields depicted in FIG. 6) that indicates/identifies the link. For example, the link identifier IE may include a link identifier field, which provides unique value associated with the link between the TDLS peer STAs.

In certain aspects, the second wireless station may be associated with an MLD (e.g., the MLD_S in FIG. 5B). That is, the second wireless station may be a STA entity affiliated with an MLD. The indication of the link in the request may enable the second wireless station to setup a direct link on the requested link if the intermediate AP relays the request on a different link than the requested link.

As discussed above, various aspects for identifying/selecting TDLS links may be applied to an MLD. An initiator STA of an MLD may include a multi-link IE (e.g., depicted in FIG. 19) in a discovery request frame to identify requested link(s) for direct link communications.

In certain aspects, if the initiator and the responder in a TDLS discovery/setup process are MLDs and the Discovery Request includes a multi-link IE, the responder MLD may transmit a single Discovery Response frame. The multi-link IE in the request may enable the responder MLD to setup a direct link on the requested link if the intermediate AP relays the request on a different link than the requested link. In aspects, the Discovery Response frame from the responder MLD may have an indication of the requested link. For example, the BSSID field in the Link Identifier element identify the requested link, or a separate field in the Link Identifier element may identify the requested link.

For example, with respect to the operations 400, the first MLD may receive, from the first wireless station (which may be a legacy STA or a STA affiliated with an MLD) via an access point, a request to setup the direct link (e.g., the request to setup may include a Setup Request frame) or to discover a peer wireless station (such as the first MLD) (e.g., the request to discover may include a Discovery Request frame), where the request may indicate a first link for communications between the first wireless station and the second wireless station. The request may indicate the first link via a link identifier associated with the first link. For example, the BSSID field in a link identifier element of the request may include (or may be set to) a value indicating the first link, where the value may be the link identifier. In certain aspects, a multi-link element (e.g., depicted in FIG. 19) indicates one or more links including the first link in the request, for example, the link ID field. The multi-link element may also indicate capability information associated with the first link. An example of capability information may be that the link is n-STR or STR. Capability information may include as one or more fields in the per-STA profile sub-element.

In aspects, the initiator/responder MLD may send a TDLS Setup Request or a Discovery Response frame on the requested link after receiving a Discovery Request/Response frame. For example, with respect to the operations 400, the first MLD may transmit, to the first wireless station, a response responsive to the request via the first link indicated in the request. The communication with the first wireless station may include the first MLD communicating with the first wireless station via the first link indicated in the request. In certain aspects, the response to the discovery/setup request may indicate the desired/requested link for direct link communications. The response may include an indication of the first link or a second link different from the first link. A BSSID field in the Link Identifier element of the Response frame may identify the requested link or a different/separate link. For example, a BSSID field in a link identifier element of the response may include (or be set to) a value indicating the first link or the second link. As an example, the BSSID field may be set to the MAC address of an AP on the channel or band associated with the requested link. That is, a specific AP may be communicating on the same channel or band as the requested/desired link for direct link communications, and the MAC address of that specific AP may be used in the BSSID field in the link identifier element to represent the desired/requested link.

In certain cases, the MLD may receive, from the access point, the request via a different link than the link indicated in the request. For example, the reception of the request may include receiving the request from the access point on a second link, which may be different or separate from the first link. For example, the second link may be on a different channel or a different band than a channel or a band associated with the first link, of the second link may be with a different AP from which received the request from the initiator STA. In other words, the first link may be associated with a specific channel or band in the frequency domain. The initiator STA may transmit the request on a first channel/band associated with the first link to a first AP, and a second AP may relay the request on a second channel/band associated with the second link. In certain aspects, the responder MLD may not respond to a Discovery Request frame if the responder MLD is not operating on the requested link or receives the request on a different link than the requested link. For example, the first MLD may ignore the request based on the request being received on the second link, e.g., a different link, a different channel, or a different band than the requested first link.

In certain aspects, the initiator MLD may receive a Setup Response on a different link than requested, and the various indications of the requested link may enable the initiator MLD to complete the direct link setup. For example, with respect to the operations 400, the first MLD may receive, from the first wireless station via an access point, a response responsive to a request to setup the direct link (e.g., a Setup Response frame), where the request indicates a first link for communications between the first wireless station and the one or more second wireless stations, and where the response is received via a second link, which may be different from the first link. The indication of the first link may include a BSSID field in the link identifier element or a link ID in the multi-link element. The first MLD may identify the first link in the response, and the communication with the first wireless station may include the first MLD communicating with the first wireless station via the first link indicated in the response.

In certain aspects, the initiator/responder MLD may transmit a Setup Request/Response on different link than the desired/request link, and the various indications of the requested link may enable the recipient peer MLD to complete the direct link setup. For example, with respect to the operations 400, the first MLD may transmit, to the first wireless station via an access point, a request to setup the direct link (e.g., a Setup Request frame) or a response to the request (e.g., a Setup Response frame), where the request or the response may indicate a first link for communications between the first wireless station and the one or more second wireless stations, and where the request or the response may be transmitted via a second link. The indication in the response or request may enable the recipient peer MLD to identify the desired/requested link for direct link communications. The indication of the first link may include a BSSID field in the link identifier element or a link ID in the multi-link element. The communication with the first wireless station may include the first MLD communicating with the first wireless station via the first link indicated in the response or the request.

In certain aspects, the initiator non-AP MLD may send more than one Discovery Request frame with the BSSID field in the Link Identifier element set to the BSSID of APs on each link that has an operational link. As an example, the initiator non-AP MLD may transmit more than one TDLS Discovery Request frames, where each Request frame has a different BSSID value (e.g., one of the BSSIDs corresponding to an AP of the AP MLD that is used to establish the link) in the BSSID field Link Identifier element. Transmission of multiple Discovery Request frames to separate links may enable the initiating non-AP MLD to find at least one link common with the responding STA/MLD and to establish a TDLS session with the common link(s). For example, with respect to the operations 400, the first MLD may transmit, to one of the third wireless stations associated with the second MLD via an access point, a first request to discover a peer wireless station for the direct link, where the first request indicates a first link for communications between the one of the third wireless stations and one of the second wireless stations associated with the first MLD. After sending the first request, the first MLD may wait a certain duration and determine that the duration has passed without receiving a response to the first request. The first MLD may transmit, to another one of the third wireless stations associated with the second MLD via the access point, a second request to discover a peer wireless station for the direct link, where the second request indicates a second link for communications between the other one of the third wireless stations and another one of the second wireless stations associated with the first MLD. At 406, the communication with the first wireless station may include the first MLD communicating with the first wireless station via the second link.

In certain aspects, the responder MLD may send multiple discovery responses to a request for a single link. For example, the responder MLD may send a Discovery Response frame on the requested link if operating on that link and send unsolicited discovery responses on other links, which may or may not be already setup for multi-link communications. The links that are already setup may be referred to as overlapping links. Suppose that MLD1 and MLD2 have performed multi-link (ML) setup for a different set of links, such that MLD1 and MLD2 have performed ML setup for 5 and 6 GHz bands, and MLD2 has the 2.4 GHz band setup for the ML communications. In response to a Discovery Request frame on the 5 GHz band, MLD2 may send a Discovery Response frame on the 5 GHz band as well as unsolicited responses on the 2.4 and 6 GHz bands. The initiator STA/MLD (e.g., MLD1) may select one or more links (including the overlapping links) based on certain criteria and send a TDLS setup frame with the selection of links. In the above example, the MLD1 may select links among the 5 and 6 GHz bands as MLD1 is inoperative on the 2.4 GHz band and does not receive that particular unsolicited Discovery Response frame. In aspects, the criteria for link selection may be based on a signal quality associated with the Discovery Response frames, where the signal quality may include signal-to-noise ratio (SNR), signal-to-interference plus noise ratio (SINR), signal-to-noise plus distortion ratio (SNDR), and/or a received signal strength indicator (RSSI) of the Discovery Response frames. The initiator STA may select more than one overlapping link for performing multi-link TDLS.

As an example of the responder MLD sending multiple discovery responses, with respect to the operations 400, the first MLD may transmit directly, to the first wireless station associated with the second MLD, a first response responsive to the request via the first link indicated in the request. The first MLD may transmit directly, to one or more of the third wireless stations associated with the second MLD, a second response responsive to the request via second link. The first MLD may communicate with the one or more third wireless stations via the second link indicated in the second response, and the communication with the first wireless station may include the first MLD communicating with the first wireless station via the first link indicated in the first response.

As an example of the initiator MLD receiving multiple discovery responses, with respect to the operations 400, the first MLD may receive, from the third wireless stations, discovery response frames via one or more of the plurality of links. The first MLD may select a link among a plurality of links between the second wireless stations and the third wireless stations. The selection of the link may be based on a signal quality of the discovery response frames, where signal quality includes an SNR, SINR, SNDR, or RSSI of the discovery response frames. The first MLD may transmit, to one or more of the third wireless stations, a request to setup the direct link on the selected link. In aspects, the selected link may include two or more of the plurality of links.

With respect to the operations 400, the various aspects described herein where the first MLD receives or transmits a Discovery Request/Response frame or a Setup Request/Response frame may be performed at 402.

Figure 19:
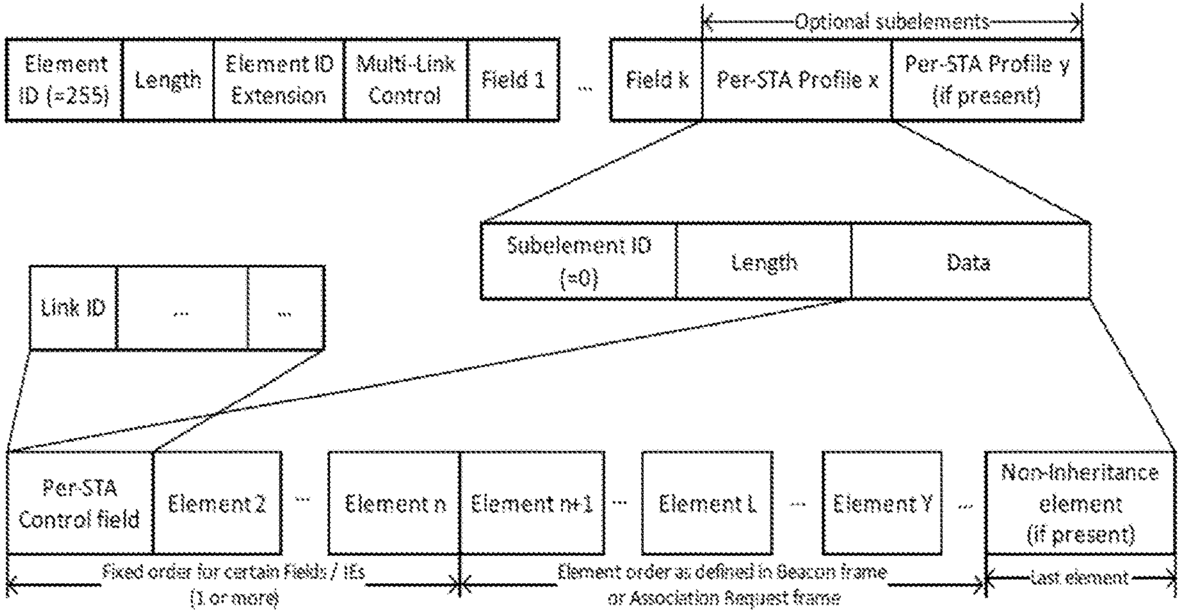
FIG. 19 is a diagram illustrating an example multi-link information element format, in accordance with certain aspects of the present disclosure.

FIG. 19 is a diagram illustrating an example multi-link information element format, in accordance with certain aspects of the present disclosure. As shown, the multi-link information element may include a link identifier (ID) field associated with a per-STA profile sub-element. In aspects, the per-STA sub-elements may be populated for all or some of the STAs affiliated with an MLD, and each of the per-STA sub-elements may identify a link for communications (such as direct link communication) via the link identifier field, which may be set to a unique value for a specific link. The link ID field may be used in the discovery request frame to indicate one or more requested links for direct link communications.

Figure 20:
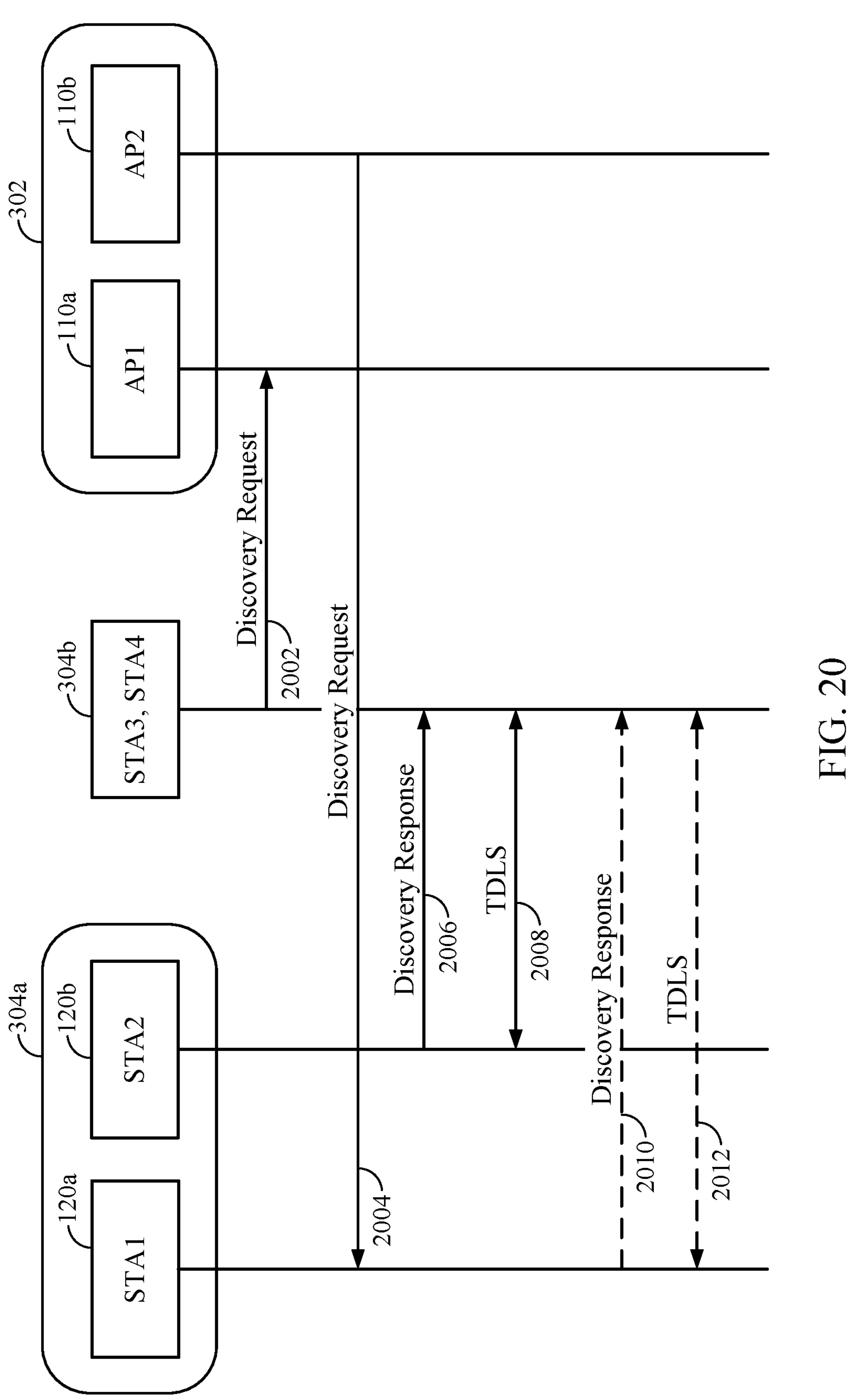
FIG. 20 is a signaling flow diagram illustrating example signaling of cross-over of a discovery request, in accordance with aspects of the present disclosure.

FIG. 20 is a signaling flow diagram illustrating example signaling of cross-over of a discovery request, in accordance with aspects of the present disclosure. At 2002, STA3 of a second MLD 304*b* (e.g., a non-AP MLD) may transmit a discovery request frame to the AP 110*a* of the AP MLD 302, where the discovery request frame indicates a link for communications between the second wireless station 120*b* and STA3. For example, the discovery request frame may include a multi-link element or a link identifier element that identifies the link for direct link communications as described herein. At 2004, the AP 110*b* may relay the discovery request frame to the first wireless station 120*a* of the first MLD 304*a*. At 2006, the first MLD 304*a* may identify the requested link in the discovery request frame for the direct link communications with one of the third wireless stations 120*c* (e.g., STA3), and the second wireless station 120*b* of the first MLD 304*a* may transmit a discovery response frame to STA3 of the third wireless stations 120*c* via the request link indicated in the discovery request. At 2008, the second wireless station 120*b* may communicate directly with STA3 via the requested link.

In certain cases, at 2010, the first wireless station 120*a* may also transmit a discovery response frame to STA4 of the third wireless stations 120*c* to indicate that multiple links can be setup for the direct link. The unsolicited discovery response frame at 2010 may be sent via an overlapping link that is setup for multi-link communications. That is, a multi-link may already be setup between the first wireless station 120*a* and the AP MLD 302 when the first wireless station 120*a* sends the discovery response frame at 2010. At 2012, the first wireless station 120*a* may communicate directly with STA4 via the link indicated in the discovery response frame at 2010. In certain cases, the communications at 2008 and 2012 may be concurrent and/or aggregated with each other to facilitate desirable throughputs and latencies between the MLDs 304*a*, 304*b*.

While the example depicted in FIG. 20 is described herein with respect to establishing a direct link between MLDs 304*a*, 304*b* and a cross-over of a discovery request frame to facilitate understanding, aspects of the present disclosure may also be applied to establishing a direct link between an MLD and a legacy station and handling a cross-over of other TDLS frames (e.g., a Discovery Response frame, a Setup Request frame, or Setup Response frame) at the AP or a link mismatch between MLD peers. The various aspects described herein with respect to handling a cross-over of a Discovery Request frame may also applied to the cross-over/mismatch of a Discovery Response frame, a Setup Request frame, or a Setup Response frame. For example, each of these frames may include an indication of the requested/desired link for direct link communications in case the frame is relayed to a peer STA of an MLD on a different link than the requested/desired link. The indication may include, for example, a BSSID field in a link identifier element or a link ID field in a multi-link element.

While various aspects are described with respect to an MLD communicating with a STA/AP, transmitting a frame to a STA/AP, or receiving a frame from a STA/AP to facilitate understanding, such aspects of the present disclosure may include a STA/AP entity (e.g., the STA 310, 312) affiliated with the MLD communicating with the STA/AP, transmitting a frame to the STA/AP, or receiving a frame from the STA/AP.

Figure 21:
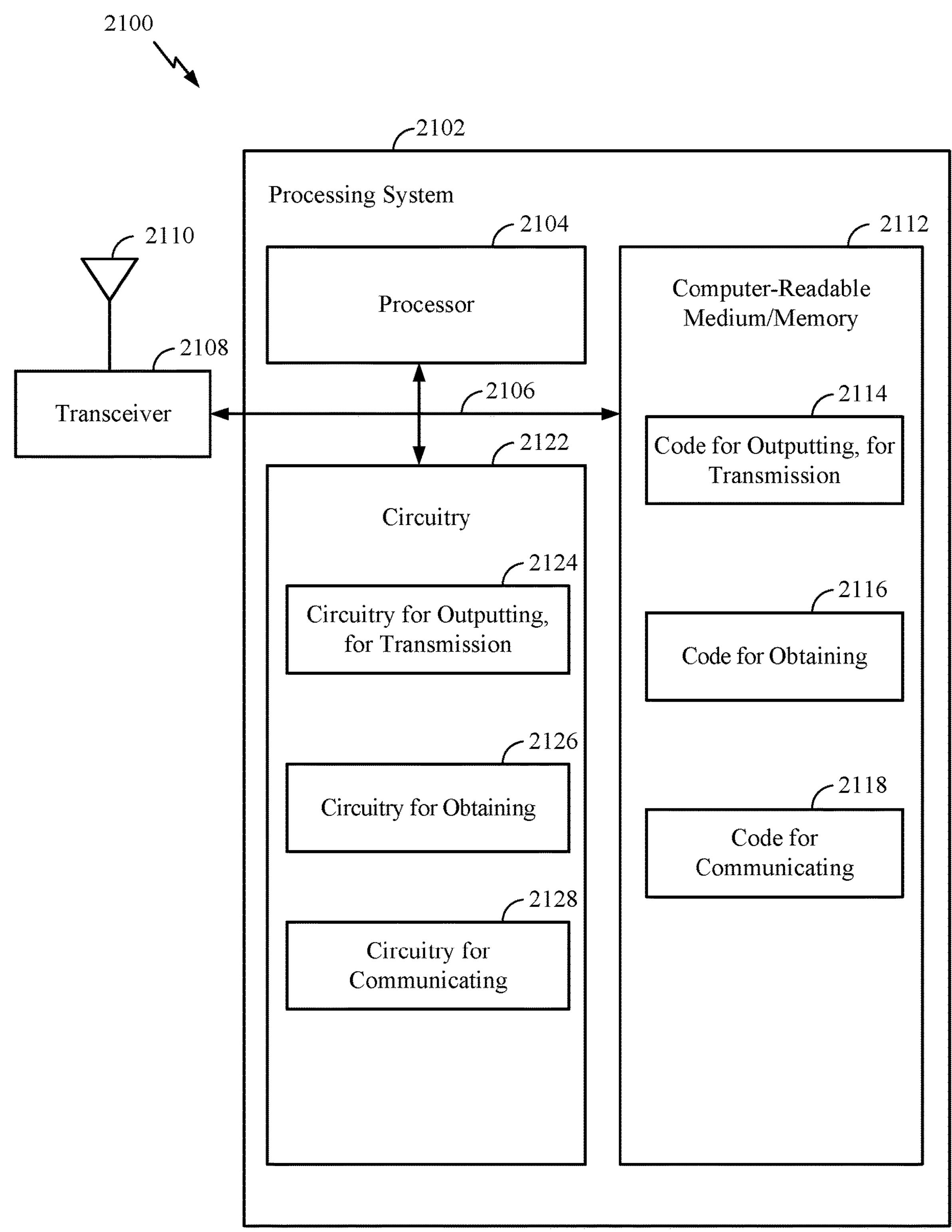
FIG. 21 illustrates a communications device (e.g., a non-AP MLD or wireless station) that may include various components configured to perform operations for the techniques disclosed herein in accordance with aspects of the present disclosure.

FIG. 21 illustrates a communications device (e.g., a non-AP MLD or a STA) 2100 that may include various components (e.g., corresponding to means-plus-function components) configured to perform operations for the techniques disclosed herein, such as the operations illustrated in FIGS. 4, 10, 13, 15, 16, and 18. The communications device 2100 includes a processing system 2102 coupled to a transceiver 2108 (e.g., a transmitter and/or a receiver). The transceiver 2108 is configured to transmit and receive signals for the communications device 2100 via an antenna 2110, such as the various signals as described herein. The processing system 2102 may be configured to perform processing functions for the communications device 2100, including processing signals received and/or to be transmitted by the communications device 2100.

The processing system 2102 includes a processor 2104 coupled to a computer-readable medium/memory 2112 via a bus 2106. In certain aspects, the computer-readable medium/memory 2112 is configured to store instructions (e.g., computer-executable code) that when executed by the processor 2104, cause the processor 2104 to perform the operations illustrated in FIGS. 4, 10, 13, 15, 16, and 18, or other operations for performing the various techniques discussed herein for handling TDLS in MLO. In certain aspects, computer-readable medium/memory 2112 stores code for outputting, for transmission 2114, code for obtaining 2116, and/or code for communicating 2118. In certain aspects, the processing system 2102 has circuitry 2122 configured to implement the code stored in the computer-readable medium/memory 2112. In certain aspects, the circuitry 2122 is coupled to the processor 2104 and/or the computer-readable medium/memory 2112 via the bus 2106. For example, the circuitry 2122 includes circuitry for outputting, for transmission, 2124, circuitry for obtaining 2126, and/or circuitry for communicating 2128.

Figure 22:
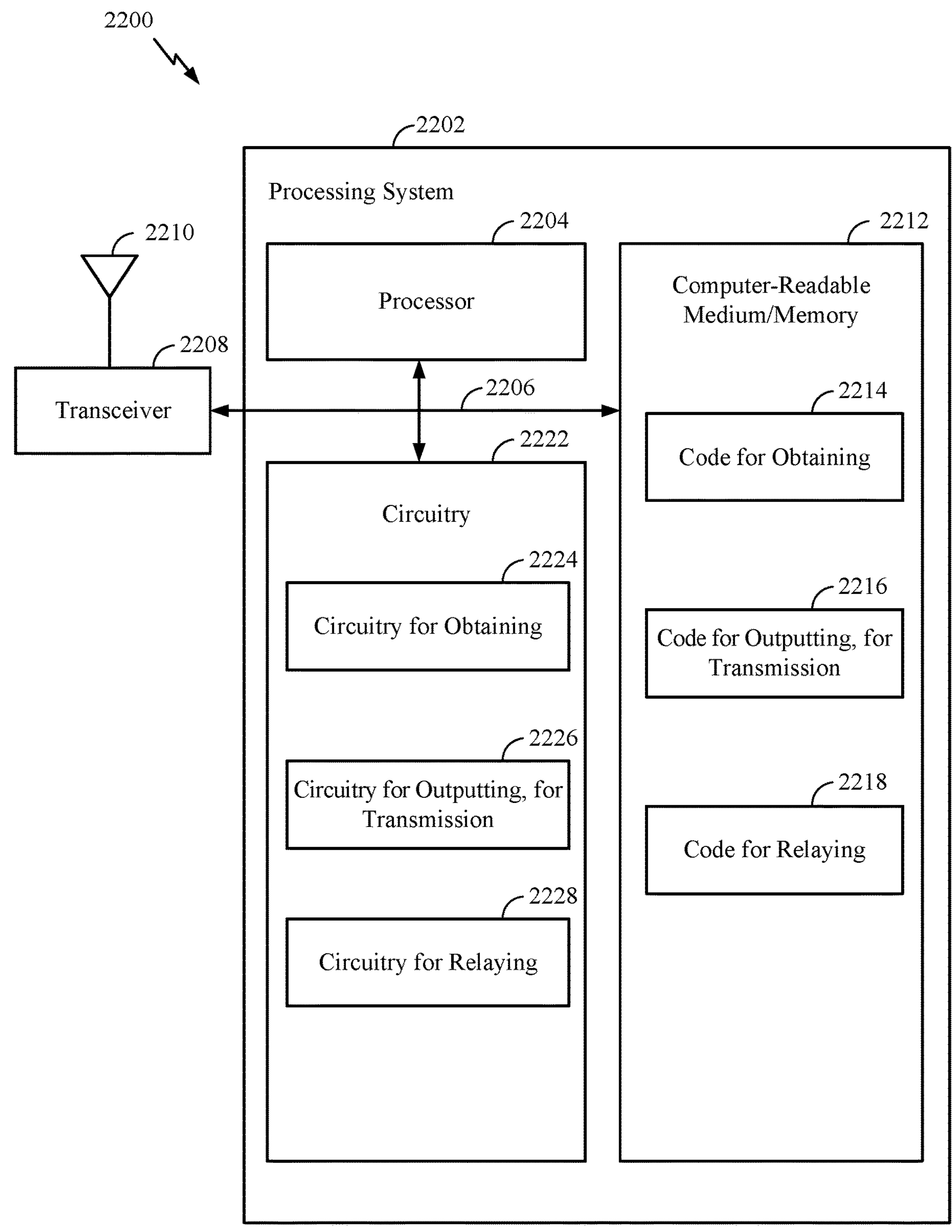
FIG. 22 illustrates a communications device (e.g., an AP MLD) that may include various components configured to perform operations for the techniques disclosed herein in accordance with aspects of the present disclosure.

FIG. 22 illustrates a communications device (e.g., an AP MLD or an AP) 2200 that may include various components (e.g., corresponding to means-plus-function components) configured to perform operations for the techniques disclosed herein, such as the operations illustrated in FIGS. 8 and 11. The communications device 2200 includes a processing system 2202 coupled to a transceiver 2208 (e.g., a transmitter and/or a receiver). The transceiver 2208 is configured to transmit and receive signals for the communications device 2200 via an antenna 2210, such as the various signals as described herein. The processing system 2202 may be configured to perform processing functions for the communications device 2200, including processing signals received and/or to be transmitted by the communications device 2200.

The processing system 2202 includes a processor 2204 coupled to a computer-readable medium/memory 2212 via a bus 2206. In certain aspects, the computer-readable medium/memory 2212 is configured to store instructions (e.g., computer-executable code) that when executed by the processor 2204, cause the processor 2204 to perform the operations illustrated in FIGS. 8 and 11, or other operations for performing the various techniques discussed herein for handling TDLS in MLO. In certain aspects, computer-readable medium/memory 2212 stores code for obtaining 2214, code for outputting, for transmission, 2216, and/or code for relaying 2218. In certain aspects, the processing system 2202 has circuitry 2222 configured to implement the code stored in the computer-readable medium/memory 2212. In certain aspects, the circuitry 2222 is coupled to the processor 2204 and/or the computer-readable medium/memory 2212 via the bus 2206. For example, the circuitry 2222 includes circuitry for obtaining 2224, circuitry for outputting, for transmission, 2226, and/or circuitry for relaying 2228.

EXAMPLE ASPECTS

In addition to the various aspects described above, aspects of specific combinations are within the scope of the disclosure, some of which are detailed below:

Aspect 1: A method of wireless communications by a first multi-link device (MLD), comprising: transmitting, to a first wireless station via a direct link between the first wireless station and one or more second wireless stations associated with the first MLD, a data frame comprising a transmitter address field set to an address of the first MLD, which is one of a plurality of addresses associated with the first MLD and the second wireless stations being associated with the first MLD for multi-link operations; and communicating with the first wireless station via the direct link.

Aspect 2: The method of Aspect 1, wherein the address of the first MLD comprises a multi-link logical medium access control (MAC) address, and the plurality of addresses includes the multi-link logical MAC address and MAC addresses associated with the second wireless stations.

Aspect 3: The method according to any of Aspects 1-2, further comprising transmitting, to the first wireless station via an access point, a request to discover a peer wireless station for the direct link, wherein the request comprises a link identifier element having a direct link initiator address set as the address of the MLD.

Aspect 4: The method according to any of Aspects 1-3, further comprising transmitting, to the first wireless station via an access point, a request to setup the direct link, wherein the request comprises a link identifier element having a direct link initiator address set as the address of the first MLD.

Aspect 5: The method of according to any of Aspects 1-4, further comprising transmitting, to the first wireless station, a response responsive to a request to discover a peer wireless station for the direct link, wherein the response comprises a link identifier element having a direct link responder address set as the address of the MLD.

Aspect 6: The method of according to any of Aspects 1-5, further comprising: transmitting, to the first wireless station via an access point, a response responsive to a request to setup the direct link, wherein the response comprises a link identifier element having a direct link responder address set as the address of the MLD.

Aspect 7: The method according to any of Aspects 1-6, further comprising: transmitting, to the first wireless station, a discovery response comprising the transmitter address field set to the address of the first MLD.

Aspect 8: The method of Aspect 7, further comprising: receiving, from the first wireless station via an access point, a request to discover a peer wireless station for the direct link; and wherein the transmission of the discovery response is responsive to the request.

Aspect 9: The method according to any of Aspects 1-8, wherein the communication with the first wireless station via the direct link comprises: receiving, from the first wireless station via the direct link, a frame comprising a receiver address field set to the address of the first MLD.

Aspect 10: The method according to any of Aspects 1-9, further comprising: transmitting, to a wireless node, a first frame via one of the second wireless stations in a direction away from the first wireless station based on the direct link being operative; and wherein the communication with the first wireless station comprises transmitting, to the first wireless station, a second frame via another one of the second wireless stations in a direction towards the first wireless station.

Aspect 11: The method according to any of Aspects 1-10, further comprising: generating an encryption key based at least in part on the address of the first MLD; transmitting, to the first wireless station, an indication of the encryption key; and wherein the communication with the first wireless station comprises communicating encrypted frames with the first wireless station based on the encryption key.

Aspect 12: The method according to any of Aspects 1-11, wherein the direct link is a tunneled direct link.

Aspect 13: The method according to any of Aspects 1-12, wherein the data frame comprises a MAC header including the transmitter address field.

Aspect 14: The method according to any of Aspects 1-13, wherein the first wireless station is associated with a second MLD for multi-link communications with the first MLD, and the second MLD further has two or more third wireless stations, including the first wireless station, being associated therewith for multi-link communications with the first MLD.

Aspect 15: The method of Aspect 14, wherein: the direct link comprises a plurality of tunneled direct link sessions; and each of the plurality of tunneled direct link sessions is associated with a separate link between one of the second wireless stations and one of the third wireless stations.

Aspect 16: The method of Aspect 14, wherein: the direct link comprises a single tunneled direct link session; and a plurality of links between the second wireless stations and the third wireless stations are associated with the single tunneled direct link session.

Aspect 17: The method according to any of Aspects 1-16, further comprising: transmitting, to the first wireless station, an indication to setup the direct link as a multi-link direct link, wherein the communication with the first wireless station via the direct link comprises communicating with the first wireless station via one or more links of the multi-link direct link based on the indication.

Aspect 18: The method of Aspect 17, wherein the indication comprises at least one of: a basic service set identifier (BSSID) field comprises a value indicating to setup the direct link as the multi-link direct link; or a multi-link element in a direct link discovery frame or a direct link setup frame.

Aspect 19: The method of Aspect 18, wherein the value comprises a link identifier associated with the one or more links.

Aspect 20: The method of Aspect 18, wherein the multi-link element includes: a first indication having an identifier of the direct link in a station profile sub-element associated with at least one of the second wireless stations; or a second indication of one or more capabilities of the second wireless stations associated with links between the second wireless stations and the third wireless stations.

Aspect 21: The method according to any of Aspects 1-20, further comprising: receiving, from the first wireless station via an access point, a request to setup the direct link or to discover a peer wireless station for the direct link, wherein the request indicates a first link for communications between the first wireless station and the one or more second wireless stations.

Aspect 22: The method of Aspect 21, wherein the request indicates the first link via a link identifier associated with the first link.

Aspect 23: The method according to any of Aspects 21-22, wherein a basic service set identifier (BSSID) field in a link identifier element of the request comprises a value indicating the first link.

Aspect 24: The method according to any of Aspects 21-22, wherein a multi-link element indicates the first link in the request.

Aspect 25: The method of Aspect 24, wherein the multi-link element further indicates capability information associated with the first link.

Aspect 26: The method of Aspect 21, further comprising: transmitting, to the first wireless station, a response responsive to the request via the first link indicated in the request; and wherein the communication with the first wireless station comprises communicating with the first wireless station via the first link indicated in the request.

Aspect 27: The method of Aspect 26, wherein the response includes an indication of the first link.

Aspect 28: The method of Aspect 27, wherein a BSSID field in a link identifier element of the response comprises a value indicating the first link.

Aspect 29: The method according to any of Aspects 21-28, wherein the reception of the request comprises receiving the request from the access point on a second link.

Aspect 30: The method of Aspect 29, further comprising ignoring the request based on the request being received on the second link based on the first link being inoperative.

Aspect 31: The method according to any of Aspects 1-30, further comprising: receiving, from the first wireless station via an access point, a response responsive to a request to setup the direct link, wherein the request indicates a first link for communications between the first wireless station and the one or more second wireless stations, wherein the response is received via a second link; and wherein the communication with the first wireless station comprises communicating with the first wireless station via the first link indicated in the response.

Aspect 32: The method according to any of Aspects 1-31, further comprising: transmitting, to the first wireless station via an access point, a request to setup the direct link or a response to the request, wherein the request or the response indicates a first link for communications between the first wireless station and the one or more second wireless stations, wherein the request or the response is transmitted via a second link; and wherein the communication with the first wireless station comprises communicating with the first wireless station via the first link indicated in the response or the request.

Aspect 33: The method of Aspect 21, further comprising: transmitting directly, to the first wireless station associated with the second MLD, a first response responsive to the request via the first link indicated in the request; transmitting directly, to one or more of the third wireless stations associated with the second MLD, a second response responsive to the request via second link; communicating with the one or more third wireless stations via the second link; and wherein the communication with the first wireless station comprises communicating with the first wireless station via the first link indicated in the request.

Aspect 34: The method of Aspect 14, further comprising: selecting at least one link among a plurality of links between the second wireless stations associated with the first MLD and the third wireless stations associated with the second MLD; and transmitting, to one or more of the third wireless stations associated with the second MLD, a request to setup the direct link on the selected at least one link.

Aspect 35: The method of Aspect 34, further comprising: receiving, from the third wireless stations associated with the second MLD, discovery response frames via one or more of the plurality of links; and wherein the selection of the at least one link is based on a signal quality associated with the discovery response frames.

Aspect 36: The method according to any of Aspects 34-35, wherein the selected at least one link includes two or more of the plurality of links.

Aspect 37: The method of Aspect 14, further comprising: transmitting, to one of the third wireless stations associated with the second MLD via an access point, a first request to discover a peer wireless station for the direct link, wherein the first request indicates a first link for communications between the one of the third wireless stations and one of the second wireless stations associated with the first MLD; determining that a duration has passed without receiving a response to the first request; and transmitting, to another one of the third wireless stations associated with the second MLD via the access point, a second request to discover a peer wireless station for the direct link based on the determination, wherein the second request indicates a second link for communications between the other one of the third wireless stations and another one of the second wireless stations associated with the first MLD.

Aspect 38: A method of wireless communications by a multi-link device (MLD), comprising: communicating with a first wireless station via a direct link between the first wireless station and a second wireless station, the second wireless station being associated with the MLD, wherein the direct link is inoperative for the MLD while a third wireless station associated with the MLD is communicating; receiving, from an access point, a request-to-send (RTS) frame requesting to send data to the third wireless station associated with the MLD; and taking one or more actions in response to the RTS frame.

Aspect 39: The method of Aspect 38, wherein taking one or more actions comprises: transmitting, to the access point, a clear-to-send (CTS) frame indicating the access point is free to transmit data to the MLD; and receiving, from the access point, data via the third wireless station based on the transmission of the CTS frame.

Aspect 40: The method of Aspect 38, wherein taking one or more actions comprises: ignoring the RTS frame if the second wireless station is communicating with the first wireless station.

Aspect 41: The method according to any of Aspects 39-40, further comprising: transmitting, to the access point, a first indication to enable transmission of the RTS frame before a transmission from the access point to the MLD.

Aspect 42: The method according to any of Aspects 38-41, further comprising: transmitting, to the access point, a second indication to disable transmission of the RTS frame before a transmission from the access point to the MLD.

Aspect 43: The method according to any of Aspects 41-42, wherein the first or second indication is transmitted via a control field of a MAC frame.

Aspect 44: The method of Aspect 43, wherein the MAC frame comprises a public action frame.

Aspect 45: A method of wireless communications by an access point, comprising: receiving, from a multi-link device (MLD), a first indication to enable transmission of a request-to-send (RTS) frame before a transmission from the access point to the MLD; transmitting, to the MLD, the RTS frame requesting to send data to one or more wireless stations associated with the MLD based on the first indication; and transmitting, to the one or more wireless stations, the data if a clear-to-send (CTS) frame is received by the access point from the MLD.

Aspect 46: The method of Aspect 45, further comprising: receiving, from the MLD, a second indication to disable transmission of the RTS frame before a transmission from the access point to the MLD.

Aspect 47: The method of according to any of Aspects 45-46, wherein the first or second indication is received via a control field of a MAC frame.

Aspect 48: The method of Aspect 47, wherein the MAC frame comprises a public action frame.

Aspect 49: A method of wireless communications by a multi-link device (MLD), comprising: transmitting, to an access point, a first indication that a first wireless station associated with the MLD is in power save mode; and communicating, after transmission of the first indication, with a second wireless station via a direct link between the second wireless station and a third wireless station, the third wireless station being associated with the MLD, wherein the direct link is inoperative for the MLD while the first wireless station is communicating.

Aspect 50: The method of Aspect 49, further comprising: transmitting, to the access point, a second indication that the first wireless station is in active mode after ending the communication with the second wireless station.

Aspect 51: The method of Aspect 50, further comprising: communicating, with the access point, via the first wireless station after the transmission of the second indication.

Aspect 52: The method of any of Aspects 49-51, wherein: the communication with the second wireless station via the third wireless station occurs when the first wireless station is not communicating; or the communication with the access point via the first wireless station occurs when the third wireless station is not communicating.

Aspect 53: A method of wireless communications by a multi-link device (MLD), comprising: transmitting, to an access point, an indication to disable a link to a first wireless station associated with the MLD; and communicating, after the transmission of the indication, with a second wireless station via a direct link between the second wireless station and a third wireless station, the third wireless station being associated with the MLD, wherein the direct link is inoperative for the MLD while the first wireless station is communicating.

Aspect 54: The method of Aspect 53, wherein: the communication with the second wireless station via the third wireless station occurs when the first wireless station is not communicating.

Aspect 55: The method of any of Aspects 53-54, wherein the indication is transmitted via a control field of a medium access control (MAC) frame.

Aspect 56: The method of Aspect 55, wherein the MAC frame comprises a public action frame.

Aspect 57: A method of wireless communications by a first multi-link device (MLD), comprising: communicating, with a second MLD, via a dynamic link set comprising a plurality of links between first access points associated with the second MLD and first wireless stations associated with the first MLD; transmitting, to one or more of the first access points, a first indication to remove a link in the dynamic link set between the one or more of the first access points and one or more of the first wireless stations; and communicating, after the transmission of the first indication, with a second wireless station via a direct link between the second wireless station and a third wireless station associated with the first MLD, wherein the direct link is inoperative for the first MLD while the one or more of the first wireless stations are communicating.

Aspect 58: The method of Aspect 57, further comprising: transmitting, to the one or more of the first access points, a second indication to add the link between the one or more of the first wireless stations and the one or more of the second wireless stations, when the direct link is inoperative.

Aspect 59: The method of Aspect 58, further comprising: communicating, with the one or more of the first access points, via the one or more of the first wireless stations after the transmission of the second indication; and communicating, with a second access point associated with the second MLD, via a fourth wireless station associated with the first MLD on another link in the dynamic link set while communicating with the second wireless station, wherein the first access points comprise the second access point, and the first wireless stations comprise the fourth wireless station.

Aspect 60: The method of any of Aspects 57-59, wherein: the communication with the second wireless station via the third wireless station occurs when the first wireless station is not communicating; or the communication with the one or more of the first access points via the one or more of the first wireless stations occurs when the third wireless station is not communicating.

Aspect 61: A method of wireless communications by a first multi-link device (MLD), comprising: receiving, from a second MLD via a first access point associated with the first MLD, one or more first frames related to establishing a direct link between the second MLD and a first wireless station, wherein the first wireless station does not support multi-link operations; and relaying, to the first wireless station via the first access point, the one or more first frames, wherein the one or more first frames include a source address field set to an address of a second wireless station associated with the second MLD.

Aspect 62: The method of Aspect 61, further comprising: mapping an address of the second MLD to the address of the second wireless station based on the first wireless station not supporting multi-link operations, wherein the transmission of the one or more first frames is based on the mapping between the address of the second MLD and the address of the second wireless station.

Aspect 63: The method of Aspect 62, further comprising: receiving, from the first wireless station via the access point, one or more second frames related to the establishment of the direct link; and relaying, to the second MLD, the one or more second frames, wherein the one or more second frames include a destination address field set to the address of the second wireless station.

Aspect 64: The method of Aspect 63, further comprising: receiving, from a third wireless station associated with the second MLD via a second access point associated with the first MLD, one or more third frames related to establishing the direct link between the second MLD and the first wireless station, wherein the one or more first frames include a transmitter address field set to an address of the third wireless station; relaying, to the first wireless station via the first access point, the one or more third frames, wherein the one or more third frames include a source address field set to the address of the second wireless station; and wherein the reception of the one or more first frames comprises receiving the one or more first frames from the second wireless station associated with the second MLD.

Aspect 65: A method of wireless communications by a first wireless station, comprising: transmitting, to a second wireless station via an access point, a request to discover the second wireless station for direct link communications between the first wireless station and the second wireless station, wherein the request indicates a link for communications between the first wireless station and the second wireless station; and communicating directly with the second wireless station via the link indicated in the request.

Aspect 66: The method of Aspect 65, further comprising: receiving, from the second wireless station, a response responsive to the request via the link indicated in the request.

Aspect 67: The method according to any of Aspects 65-66, wherein the request includes a Discovery Request frame.

Aspect 68: The method according to any of Aspects 65-67, wherein the second wireless station is associated with a multi-link device.

Aspect 69: The method according to any of Aspects 65-68, wherein the request indicates the link via a link identifier associated with the link.

Aspect 70: The method according to any of Aspects 65-69, wherein a basic service set identifier (BSSID) field in a link identifier element of the request comprises a value indicating the link.

Aspect 71: A first multi-link device (MLD), comprising: a transceiver configured to transmit, to a first wireless station via a direct link between the first wireless station and one or more second wireless stations associated with the first MLD, a data frame comprising a transmitter address field set to an address of the first MLD, which is one of a plurality of addresses associated with the first MLD and the second wireless stations being associated with the first MLD for multi-link operations; and communicate with the first wireless station via the direct link.

Aspect 72: A multi-link device (MLD), comprising: a transceiver configured to communicate with a first wireless station via a direct link between the first wireless station and a second wireless station, the second wireless station being associated with the MLD, wherein the direct link is inoperative for the MLD while a third wireless station associated with the MLD is communicating and receive, from an access point, a request-to-send (RTS) frame requesting to send data to the third wireless station associated with the MLD; and a processing system configured to take one or more actions in response to the RTS frame.

Aspect 73: A multi-link device (MLD), comprising: a transceiver configured to: transmit, to an access point, a first indication that a first wireless station associated with the MLD is in power save mode; and communicate, after transmission of the first indication, with a second wireless station via a direct link between the second wireless station and a third wireless station, the third wireless station being associated with the MLD, wherein the direct link is inoperative for the MLD while the first wireless station is communicating.

Aspect 74: A multi-link device (MLD), comprising a transceiver configured to: transmit, to an access point, an indication to disable a link to a first wireless station associated with the MLD; and communicate, after the transmission of the indication, with a second wireless station via a direct link between the second wireless station and a third wireless station, the third wireless station being associated with the MLD, wherein the direct link is inoperative for the MLD while the first wireless station is communicating.

Aspect 75: A first multi-link device (MLD), comprising: a transceiver configured to: communicate, with a second MLD, via a dynamic link set comprising a plurality of links between first access points associated with the second MLD and first wireless stations associated with the first MLD; transmit, to one or more of the first access points, a first indication to remove a link in the dynamic link set between the one or more of the first access points and one or more of the first wireless stations; and communicate, after the transmission of the first indication, with a second wireless station via a direct link between the second wireless station and a third wireless station associated with the first MLD, wherein the direct link is inoperative for the first MLD while the one or more of the first wireless stations are communicating.

Aspect 76: A first multi-link device (MLD), comprising: a receiver configured to receive, from a second MLD via a first access point associated with the first MLD, one or more first frames related to establishing a direct link between the second MLD and a first wireless station, wherein the first wireless station does not support multi-link operations; and a processing system configured to relay, to the first wireless station via the first access point, the one or more first frames, wherein the one or more first frames include a source address field set to an address of a second wireless station associated with the second MLD.

Aspect 77: A first wireless station, comprising a transceiver configured to: transmit, to a second wireless station via an access point, a request to discover the second wireless station for direct link communications between the first wireless station and the second wireless station, wherein the request indicates a link for communications between the first wireless station and the second wireless station; and communicate directly with the second wireless station via the link indicated in the request.

Aspect 78: A first multi-link device (MLD), comprising: means for transmitting, to a first wireless station via a direct link between the first wireless station and one or more second wireless stations associated with the first MLD, a data frame comprising a transmitter address field set to an address of the first MLD, which is one of a plurality of addresses associated with the first MLD and the second wireless stations being associated with the first MLD for multi-link operations; and means for communicating with the first wireless station via the direct link.

Aspect 79: A multi-link device (MLD), comprising: means for communicating with a first wireless station via a direct link between the first wireless station and a second wireless station, the second wireless station being associated with the MLD, wherein the direct link is inoperative for the MLD while a third wireless station associated with the MLD is communicating; means for receiving, from an access point, a request-to-send (RTS) frame requesting to send data to the third wireless station associated with the MLD; and means for taking one or more actions in response to the RTS frame.

Aspect 80: A multi-link device (MLD), comprising: means for transmitting, to an access point, a first indication that a first wireless station associated with the MLD is in power save mode; and means for communicating, after transmission of the first indication, with a second wireless station via a direct link between the second wireless station and a third wireless station, the third wireless station being associated with the MLD, wherein the direct link is inoperative for the MLD while the first wireless station is communicating.

Aspect 81: A multi-link device (MLD), comprising: means for transmitting, to an access point, an indication to disable a link to a first wireless station associated with the MLD; and means for communicating, after the transmission of the indication, with a second wireless station via a direct link between the second wireless station and a third wireless station, the third wireless station being associated with the MLD, wherein the direct link is inoperative for the MLD while the first wireless station is communicating.

Aspect 82: A first multi-link device (MLD), comprising: means for communicating, with a second MLD, via a dynamic link set comprising a plurality of links between first access points associated with the second MLD and first wireless stations associated with the first MLD; means for transmitting, to one or more of the first access points, a first indication to remove a link in the dynamic link set between the one or more of the first access points and one or more of the first wireless stations; and means for communicating, after the transmission of the first indication, with a second wireless station via a direct link between the second wireless station and a third wireless station associated with the first MLD, wherein the direct link is inoperative for the first MLD while the one or more of the first wireless stations are communicating.

Aspect 83: A first multi-link device (MLD), comprising: means for receiving, from a second MLD via a first access point associated with the first MLD, one or more first frames related to establishing a direct link between the second MLD and a first wireless station, wherein the first wireless station does not support multi-link operations; and means for relaying, to the first wireless station via the first access point, the one or more first frames, wherein the one or more first frames include a source address field set to an address of a second wireless station associated with the second MLD.

Aspect 84: A first wireless station, comprising: means for transmitting, to a second wireless station via an access point, a request to discover the second wireless station for direct link communications between the first wireless station and the second wireless station, wherein the request indicates a link for communications between the first wireless station and the second wireless station; and means for communicating directly with the second wireless station via the link indicated in the request.

Aspect 85: An apparatus for wireless communications by a first multi-link device (MLD), comprising: an interface configured to output, for transmission to a first wireless station via a direct link between the first wireless station and one or more second wireless stations associated with the first MLD, a data frame comprising a transmitter address field set to an address of the first MLD, which is one of a plurality of addresses associated with the first MLD and the second wireless stations being associated with the first MLD for multi-link operations; and a processing system configured to communicate with the first wireless station via the direct link.

Aspect 86: An apparatus for wireless communications by a multi-link device (MLD), comprising: a processing system configure to communicate with a first wireless station via a direct link between the first wireless station and a second wireless station, the second wireless station being associated with the MLD, wherein the direct link is inoperative for the MLD while a third wireless station associated with the MLD is communicating; and an interface configured to obtain, from an access point, a request-to-send (RTS) frame requesting to send data to the third wireless station associated with the MLD, wherein the processing system is further configured to take one or more actions in response to the RTS frame.

Aspect 87: An apparatus for wireless communications by a multi-link device (MLD), comprising: an interface configured to output, for transmission to an access point, a first indication that a first wireless station associated with the MLD is in power save mode; and a processing system configured to communicate, after transmission of the first indication, with a second wireless station via a direct link between the second wireless station and a third wireless station, the third wireless station being associated with the MLD, wherein the direct link is inoperative for the MLD while the first wireless station is communicating.

Aspect 88: An apparatus for wireless communications by a multi-link device (MLD), comprising: an interface configured to output for transmission to an access point, an indication to disable a link to a first wireless station associated with the MLD; and a processing system configured to communicate, after the transmission of the indication, with a second wireless station via a direct link between the second wireless station and a third wireless station, the third wireless station being associated with the MLD, wherein the direct link is inoperative for the MLD while the first wireless station is communicating.

Aspect 89: A first multi-link device (MLD), comprising: a processing system configured to communicate, with a second MLD, via a dynamic link set comprising a plurality of links between first access points associated with the second MLD and first wireless stations associated with the first MLD; and an interface configured to output, for transmission to one or more of the first access points, a first indication to remove a link in the dynamic link set between the one or more of the first access points and one or more of the first wireless stations, wherein the processing system is further configured to communicate, after the transmission of the first indication, with a second wireless station via a direct link between the second wireless station and a third wireless station associated with the first MLD, wherein the direct link is inoperative for the first MLD while the one or more of the first wireless stations are communicating.

Aspect 90: A first multi-link device (MLD), comprising: an interface configured to obtain, from a second MLD via a first access point associated with the first MLD, one or more first frames related to establishing a direct link between the second MLD and a first wireless station, wherein the first wireless station does not support multi-link operations; and a processing system configured to relay, to the first wireless station via the first access point, the one or more first frames, wherein the one or more first frames include a source address field set to an address of a second wireless station associated with the second MLD.

Aspect 91: A first wireless station, comprising: an interface configured to output, for transmission to a second wireless station via an access point, a request to discover the second wireless station for direct link communications between the first wireless station and the second wireless station, wherein the request indicates a link for communications between the first wireless station and the second wireless station; and a processing system configured to communicate directly with the second wireless station via the link indicated in the request.

Aspect 92: A computer-readable medium for wireless communications by a first multi-link device (MLD), comprising codes executable to: output, for transmission to a first wireless station via a direct link between the first wireless station and one or more second wireless stations associated with the first MLD, a data frame comprising a transmitter address field set to an address of the first MLD, which is one of a plurality of addresses associated with the first MLD and the second wireless stations being associated with the first MLD for multi-link operations; and communicate with the first wireless station via the direct link.

Aspect 93: A computer-readable medium for wireless communications by a multi-link device (MLD), comprising codes executable to: communicate with a first wireless station via a direct link between the first wireless station and a second wireless station, the second wireless station being associated with the MLD, wherein the direct link is inoperative for the MLD while a third wireless station associated with the MLD is communicating; obtain, from an access point, a request-to-send (RTS) frame requesting to send data to the third wireless station associated with the MLD; and take one or more actions in response to the RTS frame.

Aspect 94: A computer-readable medium for wireless communications by a multi-link device (MLD), comprising codes executable to: output, for transmission to an access point, a first indication that a first wireless station associated with the MLD is in power save mode; and communicate, after transmission of the first indication, with a second wireless station via a direct link between the second wireless station and a third wireless station, the third wireless station being associated with the MLD, wherein the direct link is inoperative for the MLD while the first wireless station is communicating.

Aspect 95: A computer-readable medium for wireless communications by a multi-link device (MLD), comprising codes executable to: output, for transmission to an access point, an indication to disable a link to a first wireless station associated with the MLD; and communicate, after the transmission of the indication, with a second wireless station via a direct link between the second wireless station and a third wireless station, the third wireless station being associated with the MLD, wherein the direct link is inoperative for the MLD while the first wireless station is communicating.

Aspect 96: A computer-readable medium for wireless communications by a first multi-link device (MLD), comprising codes executable to: communicate, with a second MLD, via a dynamic link set comprising a plurality of links between first access points associated with the second MLD and first wireless stations associated with the first MLD; output, for transmission to one or more of the first access points, a first indication to remove a link in the dynamic link set between the one or more of the first access points and one or more of the first wireless stations; and communicate, after the transmission of the first indication, with a second wireless station via a direct link between the second wireless station and a third wireless station associated with the first MLD, wherein the direct link is inoperative for the first MLD while the one or more of the first wireless stations are communicating.

Aspect 97: A computer-readable medium for wireless communications by a first multi-link device (MLD), comprising codes executable to: obtain, from a second MLD via a first access point associated with the first MLD, one or more first frames related to establishing a direct link between the second MLD and a first wireless station, wherein the first wireless station does not support multi-link operations; and relay, to the first wireless station via the first access point, the one or more first frames, wherein the one or more first frames include a source address field set to an address of a second wireless station associated with the second MLD.

Aspect 98: A computer-readable medium for wireless communications by a first wireless station, comprising codes executable to: output, for transmission to a second wireless station via an access point, a request to discover the second wireless station for direct link communications between the first wireless station and the second wireless station, wherein the request indicates a link for communications between the first wireless station and the second wireless station; and communicate directly with the second wireless station via the link indicated in the request.

Aspect 99: A first multi-link device (MLD), comprising: a memory; and a processor coupled to the memory, the processor and the memory being configured to: transmit, to a first wireless station via a direct link between the first wireless station and at least one of a plurality of second wireless stations affiliated with the first MLD, a data frame comprising a transmitter address field set to an address of the first MLD, which is one of a plurality of addresses associated with the first MLD and the second wireless stations being affiliated with the first MLD for multi-link operations, and communicate with the first wireless station via the direct link.

Aspect 100: The first MLD of Aspect 99, wherein the address of the first MLD comprises a multi-link logical medium access control (MAC) address, and the plurality of addresses includes the multi-link logical MAC address and MAC addresses associated with each of the second wireless stations.

Aspect 101: The first MLD according to any of Aspects 99 or 100, wherein the processor and the memory are further configured to transmit, to the first wireless station via an access point, a request associated with the direct link, wherein the request frame comprises a link identifier element having a direct link initiator address set as the address of the first MLD.

Aspect 102: The first MLD according to any of Aspects 99-101, wherein the processor and the memory are further configured to transmit, to the first wireless station, a response associated with the direct link, wherein the response comprises a link identifier element having a direct link responder address set as the address of the first MLD.

Aspect 103: The first MLD according to any of Aspects 99-102, wherein the processor and the memory are further configured to transmit, to the first wireless station, a response associated with the direct link comprising the transmitter address field set to the address of the first MLD.

Aspect 104: The first MLD according to any of Aspects 99-103, wherein the processor and the memory are further configured to receive, from the first wireless station via the direct link, a frame comprising a receiver address field set to the address of the first MLD.

Aspect 105: The first MLD according to any of Aspects 99-104, wherein the processor and the memory are further configured to: cease transmission to the first wireless station via the second wireless stations, except for the at least one of the second wireless stations, based on the direct link being operative.

Aspect 106: The first MLD according to any of Aspects 99-105, wherein the processor and the memory are further configured to: generate an encryption key based at least in part on the address of the first MLD; transmit, to the first wireless station, an indication of the encryption key; and communicate encrypted frames with the first wireless station based on the encryption key.

Aspect 107: The first MLD of Aspect 106, wherein the processor and the memory are further configured to generate the encryption key further based on at least one of an address of an access point MLD or an address of an access point.

Aspect 108: The first MLD according to any of Aspects 99-107, wherein: the direct link is a tunneled direct link; and the data frame comprises a MAC header including the transmitter address field.

Aspect 109: The first MLD of Aspect 108, wherein the first wireless station is affiliated with a second MLD for multi-link communications with the first MLD, and the second MLD further has two or more third wireless stations, including the first wireless station, being affiliated therewith for multi-link communications with the first MLD.

Aspect 110: The first MLD of Aspect 109, wherein: the direct link comprises a plurality of tunneled direct link sessions; and each of the plurality of tunneled direct link sessions is associated with a separate link between one of the second wireless stations and one of the third wireless stations.

Aspect 111: The first MLD of Aspect 109, wherein: the direct link comprises a single tunneled direct link session; and a plurality of links between the second wireless stations and the third wireless stations are associated with the single tunneled direct link session.

Aspect 112: The first MLD according to any of Aspects 99-111, wherein the processor and the memory are further configured to: transmit, to the first wireless station, an indication to setup the direct link as a multi-link direct link, wherein the indication comprises at least one of: a basic service set identifier (BSSID) field comprises a value indicating to setup the direct link as the multi-link direct link, or a multi-link element in a direct link discovery frame or a direct link setup frame; and communicate with the first wireless station via one or more links of the multi-link direct link based on the indication.

Aspect 113: The first MLD of Aspect 112, wherein the value comprises a link identifier associated with the one or more links.

Aspect 114: The first MLD according to any of Aspects 112 or 113, wherein the first wireless station is affiliated with a second MLD for multi-link communications with the first MLD, and the second MLD further has two or more third wireless stations, including the first wireless station, being affiliated therewith for multi-link communications with the first MLD; and wherein the multi-link element includes: a first indication having an identifier of the direct link in a station profile sub-element associated with the at least one of the second wireless stations; or a second indication of one or more capabilities of the second wireless stations associated with links between the second wireless stations and the third wireless stations.

Aspect 115: The first MLD according to any of Aspects 99-114, wherein the processor and the memory are further configured to: receive, from the first wireless station via an access point, a request associated with the direct link, wherein the request indicates a first link for communications between the first wireless station and the at least one of the second wireless stations, wherein the request indicates the first link via a link identifier element having a basic service set identifier (BSSID) field, which includes a value indicating the first link.

Aspect 116: The first MLD according to any of Aspects 99-115, wherein the processor and the memory are further configured to: transmit, from the first wireless station, a plurality of requests associated with the direct link, wherein each of the requests has a different value for a BSSID field in a link identifier element.

Aspect 117: The first MLD of Aspect 115, wherein a multi-link element indicates one or more links including the first link in the request.

Aspect 118: The first MLD of Aspect 117, wherein the multi-link element further indicates capability information associated with the first link.

Aspect 119: The first MLD according to any of Aspects 115-118, wherein the first wireless station is affiliated with a second MLD for multi-link communications with the first MLD, and the second MLD further has two or more third wireless stations, including the first wireless station, being affiliated therewith for multi-link communications with the first MLD; and wherein the processor and the memory are further configured to: transmit directly, to the first wireless station affiliated with the second MLD, a first response responsive to the request via the first link indicated in the request; transmit directly, to one or more of the third wireless stations affiliated with the second MLD, a second response responsive to the request via a second link; communicate with the one or more third wireless stations via the second link; and communicate with the first wireless station via the first link indicated in the request.

Aspect 120: The first MLD according to any of Aspects 99-119, wherein: the first wireless station is affiliated with a second MLD for multi-link communications with the first MLD, and the second MLD further has two or more third wireless stations, including the first wireless station, being affiliated therewith for multi-link communications with the first MLD; and the processor and the memory are further configured to: select at least one link among a plurality of links between the second wireless stations affiliated with the first MLD and the third wireless stations affiliated with the second MLD, and transmit, to one or more of the third wireless stations affiliated with the second MLD, a request to setup the direct link on the selected at least one link.

Aspect 121: The first MLD of Aspect 120, wherein the processor and the memory are further configured to: receive, from the third wireless stations affiliated with the second MLD, discovery response frames via one or more of the plurality of links; and wherein the selection of the at least one link is based on a signal quality associated with the discovery response frames.

Aspect 122: The first MLD according to any of Aspects 120 or 121, wherein the selected at least one link includes two or more of the plurality of links.

Aspect 123: The first MLD according to any of Aspects 99-122, wherein: the first wireless station is affiliated with a second MLD for multi-link communications with the first MLD, and the second MLD further has two or more third wireless stations, including the first wireless station, being affiliated therewith for multi-link communications with the first MLD; and the processor and the memory are further configured to: transmit, to one of the third wireless stations affiliated with the second MLD via an access point, a first request to discover a peer wireless station for the direct link, wherein the first request indicates a first link for communications between the one of the third wireless stations and one of the second wireless stations affiliated with the first MLD, determine that a duration has passed without receiving a response to the first request, and transmit, to another one of the third wireless stations affiliated with the second MLD via the access point, a second request to discover a peer wireless station for the direct link based on the determination, wherein the second request indicates a second link for communications between the other one of the third wireless stations and another one of the second wireless stations affiliated with the first MLD.

Aspect 124: A method of wireless communication by a first multi-link device (MLD), comprising: transmitting, to a first wireless station via a direct link between the first wireless station and at least one of a plurality of second wireless stations affiliated with the first MLD, a data frame comprising a transmitter address field set to an address of the first MLD, which is one of a plurality of addresses associated with the first MLD and the second wireless stations being affiliated with the first MLD for multi-link operations, and communicating with the first wireless station via the direct link.

Aspect 125: The method of Aspect 124, wherein the address of the first MLD comprises a multi-link logical medium access control (MAC) address, and the plurality of addresses includes the multi-link logical MAC address and MAC addresses associated with each of the second wireless stations.

Aspect 126: The method according to any of Aspects 124 or 125, further comprising transmitting, to the first wireless station via an access point, a request associated with the direct link, wherein the request frame comprises a link identifier element having a direct link initiator address set as the address of the first MLD.

Aspect 127: The method according to any of Aspects 124-126, further comprising transmitting, to the first wireless station, a response associated with the direct link, wherein the response comprises a link identifier element having a direct link responder address set as the address of the first MLD.

Aspect 128: The method according to any of Aspects 124-127, further comprising ceasing transmission to the first wireless station via the second wireless stations, except for the at least one of the second wireless stations, based on the direct link being operative.

Aspect 129: A multi-link device (MLD), comprising: a memory; and a processor coupled to the memory, the processor and the memory being configured to: establish a direct link between a first wireless station and a second wireless station affiliated with the MLD; and communicate with the first wireless station via the direct link, wherein the direct link is inoperative for the MLD while a third wireless station affiliated with the MLD is communicating.

Aspect 130: The MLD of Aspect 129, wherein the processor and the memory are further configured to transmit to an access point (AP) MLD with which the MLD has performed association, an indication of a state associated with the MLD or one or more wireless stations affiliated with the MLD.

Aspect 131: The MLD according to any of Aspects 129 or 130, wherein the third wireless station is inoperative while the direct link is communicating.

Aspect 132: The MLD according to any of Aspects 129-131, wherein the processor and the memory are further configured to: receive, from an access point affiliated with an AP MLD, a first frame requesting to send data to the third wireless station affiliated with the MLD in response to the indication of the state; and take one or more actions in response to the first frame.

Aspect 133: The MLD according to any of Aspects 129-132, wherein the processor and the memory are further configured to: transmit, to the access point affiliated with the AP MLD, a second frame indicating the access point affiliated with an AP MLD is free to transmit data to the MLD; and receive, from the access point affiliated with an AP MLD, data via the third wireless station based on the transmission of the second frame.

Aspect 134: The MLD according to any of Aspects 132 or 133, wherein the processor and the memory are further configured to: receive the first frame via the third wireless station on a channel in which the access point affiliated with the AP MLD is communicating with the third wireless station; and transmit the second from via the third wireless station on the channel.

Aspect 135: The MLD according to any of Aspects 132-134, wherein the processor and the memory are further configured to ignore the first frame if the second wireless station is communicating with the first wireless station.

Aspect 136: The MLD according to any of Aspects 132-135, wherein the state indicates to enable transmission of the first frame before a transmission from the AP MLD to the third wireless affiliated with the MLD.

Aspect 137: The MLD according to any of Aspects 132-136, wherein the processor and the memory are further configured to transmit, to the access point or the AP MLD, an update to the state indicating to disable transmission of the first frame before a transmission from the AP MLD to the third wireless station affiliated with the MLD.

Aspect 138: The MLD according to any of Aspects 129-137, wherein the indication is transmitted via a control field of a medium access control (MAC) header of a frame, a management frame, or a control frame.

Aspect 139: An access point, comprising: a memory; and a processor coupled to the memory, the processor and the memory are further configured to: receive, from a multi-link device (MLD), an indication of a state associated with the MLD or one or more wireless stations affiliated with the MLD, transmit, to the MLD, a first frame requesting to send data to the one or more wireless stations affiliated with the MLD based on the state, and transmit, to the one or more wireless stations, the data if a second frame granting permission to send the data is received by the access point from the MLD.

Aspect 140: The access point of Aspect 139, wherein the MLD has performed association with an access point (AP) MLD with which the access point is affiliated, and the state indicates to enable transmission of the first frame before a transmission from the AP MLD to the one or more wireless stations affiliated with the MLD.

Aspect 141: The access point according to any of Aspects 139 or 140, wherein the MLD has performed association with an AP MLD with which the access point is affiliated, and wherein the processor and the memory are further configured to receive, from the MLD, an update to the state indicating to disable transmission of the first frame before a transmission from the AP MLD to the one or more wireless stations affiliated with the MLD.

Aspect 142: The access point of Aspect 141, wherein the processor and the memory are further configured to: transmit the first frame to the one or more wireless stations on a channel in which the access point affiliated with the AP MLD is communicating with the one or more wireless stations; and receive the second from the one or more wireless stations on the channel.

Aspect 143: The access point according to any of Aspects 139-142, wherein the indication is received via a control field of a medium access control (MAC) header of a frame, a management frame, or a control frame.

Aspect 144: A multi-link device (MLD), comprising: a memory; and a processor coupled to the memory, the processor and the memory being configured to: transmit, to an access point or an access point (AP) MLD, a first indication associated with a first wireless station affiliated with the MLD, and communicate, after transmission of the first indication, with a second wireless station via a direct link between the second wireless station and a third wireless station, the third wireless station being affiliated with the MLD, wherein the direct link is inoperative for the MLD while the first wireless station is communicating.

Aspect 145: The MLD of Aspect 144, wherein the processor and the memory are further configured to: transmit, to the access point or the AP MLD, a second indication that the first wireless station is in active mode after ending the communication with the second wireless station.

Aspect 146: The MLD of Aspect 145, wherein the processor and the memory are further configured to: communicate, with the access point, via the first wireless station after the transmission of the second indication.

Aspect 147: The MLD according to any of Aspects 144-146, wherein:

the communication with the second wireless station via the third wireless station occurs when the first wireless station is not communicating; or the communication with the access point via the first wireless station occurs when the third wireless station is not communicating.

Aspect 148: The MLD according to any of Aspects 144-147, wherein the first indication includes at least one of: an indication that the first wireless station is in power save mode; an indication to disable a first link to the first wireless station; or an indication to remove a second link in a dynamic link set to the first wireless station.

Aspect 149: The MLD according to any of Aspects 144-148, wherein the first indication is transmitted via a control field of a medium access control (MAC) header of a frame, a management frame, or a control frame.

Aspect 150: A method of wireless communication by a multi-link device (MLD), comprising: establishing a direct link between a first wireless station and a second wireless station affiliated with the MLD; and communicating with the first wireless station via the direct link, wherein the direct link is inoperative for the MLD while a third wireless station affiliated with the MLD is communicating.

Aspect 151: The method of Aspect 150, further comprising transmitting, to an access point (AP) MLD with which the MLD has performed an association, an indication of a state associated with the MLD or one or more wireless stations affiliated with the MLD.

Aspect 152: The method of Aspect 151, wherein the third wireless station is inoperative while the direct link is communicating.

Aspect 153: The method according to any of Aspects 151 or 152, further comprising: receiving, from an access point affiliated with the AP MLD, a first frame requesting to send data to the third wireless station affiliated with the MLD in response to the indication of the state; and taking one or more actions in response to the first frame.

Aspect 154: The method of Aspect 153, further comprising: transmitting, to the access point affiliated with the MLD, a second frame indicating the access point is free to transmit data to the MLD; and receiving, from the access point affiliated with the MLD, data via the third wireless station based on the transmission of the second frame.

Aspect 155: The method of Aspect 154, further comprising: receiving the first frame via the third wireless station on a channel in which the access point affiliated with the AP MLD is communicating with the third wireless station; and transmitting the second from via the third wireless station on the channel.

Aspect 156: The method according to any of Aspects 154-155, further comprising ignoring the first frame if the second wireless station is communicating with the first wireless station.

Aspect 157: The method according to any of Aspects 154-156, wherein the state indicates to enable transmission of the first frame before a transmission from the AP MLD to the third wireless station affiliated with the MLD.

Aspect 158: The method according to any of Aspects 154-157, further comprising transmitting, to the access point or the AP MLD, an update to the state indicating to disable transmission of the first frame before a transmission from the AP MLD to the third wireless station affiliated with the MLD.

Aspect 159: An apparatus, comprising: a memory comprising executable instructions; one or more processors configured to execute the executable instructions and cause the apparatus to perform a method in accordance with any of Aspects 1-70, 124-128, or 150-158.

Aspect 160: An apparatus, comprising means for performing a method in accordance with any of Aspects 1-70, 124-128, or 150-158.

Aspect 161: A computer-readable medium comprising executable instructions that, when executed by one or more processors of an apparatus, cause the apparatus to perform a method in accordance with any of Aspects 1-70, 124-128, or 150-158.

Aspect 162: A computer program product embodied on a computer-readable storage medium comprising code for performing a method in accordance with any of Aspects 1-70, 124-128, or 150-158.

Techniques described herein provide various advantages to direct link communications in multi-link applications. For example, the various techniques for handling TDLS with MLO may enable an MLD to setup a TDLS session with a legacy STA or another MLD, which may provide desirable latencies and/or throughputs between the TDLS peer STAs.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for communicating, means for generating, means for taking one or more actions, means for selecting, means for determining, means for ignoring, means for mapping and means for relaying may include a processing system, which may include one or more processors, such as processors 260*m*, 270*m*, 288*m*, and/or 290*m* of the STA 120*m* and/or processors 210, 220, 240, and/or 242 of the AP 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, aabb, aabbcc, bb, bbcc, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless station 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a wireless station and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless station and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A multi-link device (MLD), comprising:

one or more memories; and one or more processors coupled to the one or more memories, the one or more processors and the one or more memories being configured to cause the MLD to:

establish a communication link between a first wireless station that is not affiliated with the MLD and a second wireless station that is affiliated with the MLD;

communicate, via the second wireless station, with the first wireless station via the communication link, wherein the communication link is a non-simultaneous transmit and receive (n-STR) link that is inoperative for the MLD while a third wireless station affiliated with the MLD is communicating via another communication link, wherein the communication link is between non-access point (AP) stations including the first wireless station and the second wireless station; and transmit, to an access point (AP) MLD with which the MLD has performed association, an indication of a state associated with the MLD or one or more wireless stations affiliated with the MLD, wherein the state corresponds to a constraint due to the communication link being the n-STR link and the third wireless station communicating, wherein the state is configured to enable transmission from the AP MLD of a first frame requesting to send data; and receive the first frame requesting to send data in response to the indication of the state.

2. The MLD of claim 1, wherein the third wireless station is inoperative while the communication link is not idle.

3. The MLD of claim 1, wherein the one or more processors and the one or more memories are configured to cause the MLD to:

receive, from an access point affiliated with the AP MLD, the first frame requesting to send data to the third wireless station affiliated with the MLD in response to the indication of the state; and take one or more actions in response to the first frame.

4. The MLD of claim 3, wherein the one or more processors and the one or more memories are further configured to cause the MLD to:

transmit, to the access point affiliated with the AP MLD, a second frame indicating the access point affiliated with the AP MLD is free to transmit data to the MLD; and receive, from the access point affiliated with the AP MLD, data via the third wireless station based on the transmission of the second frame.

5. The MLD of claim 4, wherein the one or more processors and the one or more memories are further configured to cause the MLD to:

receive the first frame via the third wireless station on a channel in which the access point affiliated with the AP MLD is communicating with the third wireless station; and transmit the second frame via the third wireless station on the channel.

6. The MLD of claim 3, wherein the one or more processors and the one or more memories are further configured to cause the MLD to ignore the first frame when the second wireless station is communicating with the first wireless station.

7. The MLD of claim 3, wherein the state indicates to enable transmission of the first frame before another transmission from the AP MLD to the third wireless station affiliated with the MLD.

8. The MLD of claim 3, wherein the one or more processors and the one or more memories are further configured to cause the MLD to transmit, to the access point affiliated with the AP MLD, an update to the state indicating to disable the transmission of the first frame before another transmission from the AP MLD to the third wireless station affiliated with the MLD.

9. The MLD of claim 1, wherein the one or more processors and the one or more memories are configured to cause the MLD to transmit the indication via a control field of a medium access control (MAC) header of a frame, a management frame, or a control frame.

10. An access point, comprising:

one or more memories; and one or more processors coupled to the one or more memories, the one or more processors and the one or more memories being configured to cause the access point to:

receive, from a multi-link device (MLD), an indication of a state associated with the MLD or one or more wireless stations affiliated with the MLD, wherein the MLD is a non-simultaneous transmit and receive (n-STR) MLD, transmit, to the MLD, a first frame requesting to send data to the one or more wireless stations affiliated with the MLD based on the state, wherein the state indicates to enable transmission of the first frame before another transmission from an access point (AP) MLD to the one or more wireless stations affiliated with the MLD, the state corresponding to a constraint due to the MLD being the n-STR MLD and another wireless station affiliated with the MLD communicating, and transmit, to the one or more wireless stations, the data when the access point receives a second frame granting permission to send the data from the MLD.

11. The access point of claim 10, wherein the MLD has performed association with the AP MLD with which the access point is affiliated.

12. The access point of claim 10, wherein the MLD has performed association with an AP MLD with which the access point is affiliated, and wherein the one or more processors and the one or more memories are further configured to cause the access point to receive, from the MLD, an update to the state indicating to disable the transmission of the first frame before a transmission from the AP MLD to the one or more wireless stations affiliated with the MLD.

13. The access point of claim 12, wherein the one or more processors and the one or more memories are further configured to cause the access point to:

transmit the first frame to the one or more wireless stations on a channel in which the access point affiliated with the AP MLD is communicating with the one or more wireless stations; and receive the second frame from the one or more wireless stations on the channel.

14. The access point of claim 10, wherein the one or more processors and the one or more memories are further configured to cause the access point to receive the indication via a control field of a medium access control (MAC) header of a frame, a management frame, or a control frame.

15. A method of wireless communication by a multi-link device (MLD), comprising:

establishing a communication link between a first wireless station that is not affiliated with the MLD and a second wireless station affiliated with the MLD, wherein the communication link is between non-access point (AP) stations including the first wireless station and the second wireless station;

communicating, via the second wireless station, with the first wireless station via the communication link, wherein the communication link is a non-simultaneous transmit and receive (n-STR) link that is inoperative for the MLD while a third wireless station affiliated with the MLD is communicating via another communication link; and transmitting, to an access point (AP) MLD with which the MLD has performed association, an indication of a state associated with the MLD or one or more wireless stations affiliated with the MLD, wherein the state corresponds to a constraint due to the communication link being the n-STR link and the third wireless station communicating, wherein the state is configured to enable transmission from the AP MLD of a first frame requesting to send data; and receiving the first frame requesting to send data in response to transmission of the indication of the state.

16. The method of claim 15, wherein the third wireless station is inoperative while the communication link is not idle.

17. The method of claim 15, wherein:

the first frame is received, from an access point affiliated with the AP MLD, requesting to send data to the third wireless station affiliated with the MLD in response to the indication of the state; and taking one or more actions in response to the first frame.

18. The method of claim 17, further comprising:

transmitting, to the access point affiliated with the AP MLD, a second frame indicating the access point affiliated with the AP MLD is free to transmit data to the MLD; and receiving, from the access point affiliated with the AP MLD, data via the third wireless station based on the transmission of the second frame.

19. The method of claim 18, further comprising:

receiving the first frame via the third wireless station on a channel in which the access point affiliated with the AP MLD is communicating with the third wireless station; and transmitting the second frame via the third wireless station on the channel.

20. The method of claim 18, further comprising ignoring the first frame when the second wireless station is communicating with the first wireless station.

21. The method of claim 18, wherein the state indicates to enable the transmission of the first frame before a transmission from the AP MLD to the third wireless station affiliated with the MLD.

22. The method of claim 18, further comprising transmitting, to the access point affiliated with the AP MLD, an update to the state indicating to disable the transmission of the first frame before a transmission from the AP MLD to the third wireless station affiliated with the MLD.

23. The MLD of claim 1, wherein request to send (RTS) and clear to send (CTS) exchanges between the MLD and the AP MLD are disabled before receiving the indication of the state, and wherein the indication of the state is configured to enable the RTS and CTS exchanges, the first frame requesting to send data being received in response to the RTS and CTS exchange being enabled.

24. The MLD of claim 23, wherein, to transmit the indication of the state, the one or more processors and the one or more memories are configured to cause the MLD to transmit a frame including a field configured to enable the RTS and CTS exchange.

25. A method of wireless communication by an access point, comprising:

receiving, from a multi-link device (MLD), an indication of a state associated with the MLD or one or more wireless stations affiliated with the MLD, wherein the MLD is a non-simultaneous transmit and receive (n-STR) MLD, transmitting, to the MLD, a first frame requesting to send data to the one or more wireless stations affiliated with the MLD based on the state, wherein the state indicates to enable transmission of the first frame before another transmission from an access point (AP) MLD to the one or more wireless stations affiliated with the MLD, the state corresponding to a constraint due to the MLD being the n-STR MLD and another wireless station affiliated with the MLD communicating, and transmitting, to the one or more wireless stations, the data when the access point receives a second frame granting permission to send the data from the MLD.

26. The method of claim 25, wherein the MLD has performed association with the AP MLD with which the access point is affiliated.

27. The method of claim 25, wherein the MLD has performed association with an AP MLD with which the access point is affiliated, and wherein the method further comprises receiving, from the MLD, an update to the state indicating to disable the transmission of the first frame before a transmission from the AP MLD to the one or more wireless stations affiliated with the MLD.

28. The method of claim 27, further comprising:

transmitting the first frame to the one or more wireless stations on a channel in which the access point affiliated with the AP MLD is communicating with the one or more wireless stations; and receiving the second frame from the one or more wireless stations on the channel.

29. The method of claim 25, further comprising receiving the indication via a control field of a medium access control (MAC) header of a frame, a management frame, or a control frame.

* * * * *